United States Patent [19]
Garcia

[11] Patent Number: 5,870,572
[45] Date of Patent: Feb. 9, 1999

[54] UNIVERSAL BUFFERED INTERFACE FOR COUPLING MULTIPLE PROCESSORS, MEMORY UNITS, AND I/O INTERFACES TO A COMMON HIGH-SPEED INTERCONNECT

[75] Inventor: Armando Garcia, Yorktown Heights, N.Y.

[73] Assignee: International Business Machines Corporation, Armonk, N.Y.

[21] Appl. No.: 798,186

[22] Filed: Dec. 23, 1996

Related U.S. Application Data

[62] Division of Ser. No. 260,107, Jun. 15, 1994, Pat. No. 5,588,122, which is a continuation of Ser. No. 734,206, Jul. 22, 1991, abandoned.

[51] Int. Cl.⁶ ................................................ G06F 15/16
[52] U.S. Cl. ............................................................ 395/309
[58] Field of Search ........................ 395/200.43, 200.75, 395/291, 200.3, 309

[56] References Cited

U.S. PATENT DOCUMENTS

| | | | |
|---|---|---|---|
| 4,032,899 | 6/1977 | Jenny | 395/311 |
| 4,075,686 | 2/1978 | Calle | 395/465 |
| 4,085,448 | 4/1978 | Kogge | 395/287 |
| 4,281,380 | 7/1981 | DeMesa et al. | 395/299 |
| 4,320,452 | 3/1982 | Kempf et al. | 395/287 |
| 4,424,565 | 1/1984 | Larson | 395/200.07 |
| 4,442,504 | 4/1984 | Dummermuth et al. | 395/737 |
| 4,470,114 | 9/1984 | Gerhold | 395/325 |
| 4,493,021 | 1/1985 | Agrawal et al. | 395/200.16 |
| 4,545,068 | 10/1985 | Tabata | 382/307 |
| 4,562,535 | 12/1985 | Vincent et al. | 395/284 |
| 4,591,976 | 5/1986 | Webber et al. | 395/182.18 |
| 4,630,193 | 12/1986 | Kris | 395/550 |
| 4,639,860 | 1/1987 | Peters | 395/309 |
| 4,660,141 | 4/1987 | Ceccon et al. | 395/829 |
| 4,672,570 | 6/1987 | Benken | 395/200.02 |
| 4,736,319 | 4/1988 | DasGupta et al. | 395/290 |
| 4,755,930 | 7/1988 | Wilson, Jr. et al. | 395/449 |
| 4,799,186 | 1/1989 | Ployette | 395/479 |
| 4,805,169 | 2/1989 | Asselt | 370/85 |
| 4,839,800 | 6/1989 | Barlow et al. | 395/737 |
| 4,847,757 | 7/1989 | Smith | 395/294 |
| 4,862,350 | 8/1989 | Orr et al. | 395/250 |
| 4,870,704 | 9/1989 | Matelan et al. | 395/800 |
| 4,896,266 | 1/1990 | Klashka et al. | 395/865 |
| 4,901,226 | 2/1990 | Barlow | 395/302 |
| 4,905,145 | 2/1990 | Sauber | 395/200.01 |
| 4,928,224 | 5/1990 | Zulian | 395/309 |
| 4,935,894 | 6/1990 | Ternes et al. | 395/309 |
| 5,050,072 | 9/1991 | Earnshaw et al. | 369/182.18 |
| 5,136,717 | 8/1992 | Morley | 345/800 |
| 5,163,151 | 11/1992 | Branikorski | 395/725 |
| 5,418,952 | 5/1995 | Morley | 395/800.14 |
| 5,463,755 | 10/1995 | Dumarot et al. | 395/200.52 |

FOREIGN PATENT DOCUMENTS

0513519A1  11/1992  European Pat. Off. .

*Primary Examiner*—David Y. Eng
*Attorney, Agent, or Firm*—Perman & Green, LLP

[57] ABSTRACT

A multiprocessor data processing system includes a group of computational data processor nodes including at least one communication data processor node, at least one shared global memory with memory banks, and a number of bus interfaces each coupled between one of a set of local buses and a global bus. Each interface includes a number of input queues and output queues coupled between the local bus and the global bus. The interface supports the use of an interprocessor communication (IPC) mechanism that allows any processor to send an interrupt to any other processor in the system during a single global bus cycle. An interrupt mask is transferred over the address bus during a specially marked bus cycle, with the interrupt mask identifying the processor or processors to be interrupted for interprocessor communication.

14 Claims, 33 Drawing Sheets

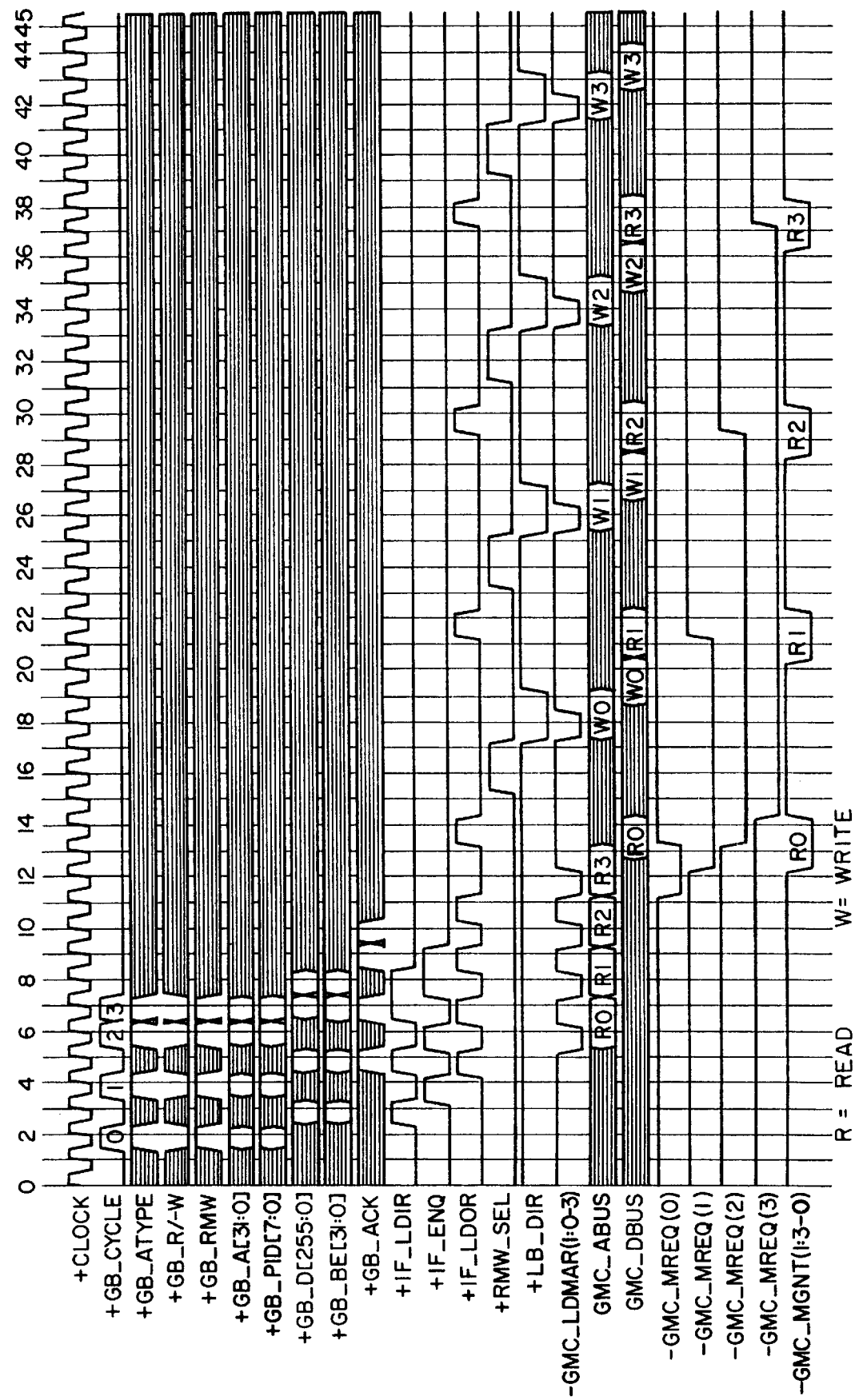

UBIF CONTROL (PROCESSOR MODE)

UBIF CONTROL (MEMORY MODE)

UBIF-A (PROCESSOR MODE) ADDRESS
SECTION BLOCK DIAGRAM
34a

UBIF-A (MEMORY MODE) ADDRESS
SECTION BLOCK DIAGRAM
34a

UBIF-A (PROCESSOR MODE) MISC ADDRESS SECTION BLOCK DIAGRAM

UBIF-A (MEMORY MODE) MISC ADDRESS SECTION BLOCK DIAGRAM

UBIF-A (PROCESSOR MODE) MID SECTION BLOCK DIAGRAM
34a

UBIF-D DATA OUTPUT SECTION BLOCK DIAGRAM 34b

UBIF-D INPUT DATA SECTION BLOCK DIAGRAM

UNIVERSAL BUFFERED INTERFACE FOR COUPLING MULTIPLE PROCESSORS, MEMORY UNITS, AND I/O INTERFACES TO A COMMON HIGH-SPEED INTERCONNECT

This is a division of application Ser. No. 07/260,107 filed on Jun. 15, 1994, now U.S. Pat. No. 5,588,122, issued on Dec. 24, 1996 which is a continuation of Ser. No. 07/734,206 filed Jul. 22, 1991, now abandoned.

CROSS REFERENCE TO RELATED PATENT APPLICATIONS

This patent application is related to the following commonly assigned U.S. patent applications: Ser. No. 07/734,432, filed Jul. 22, 1991, entitled "Scientific Visualization System", D. Foster et al. now U.S. Pat. No. 5,327,570 Ser. No. 07/733,563, filed Jul. 22, 1991, entitled "A Centralized Backplane Bus Arbiter for Multiprocessor Systems" A. Garcia et al. now U.S. Pat. No. 5,280,591; Ser. No. 07/733,517, filed Jul. 22,1991, entitled "A Processor Buffered Interface for Multiprocessor Systems" D. Foster et al. now U.S. Pat. No. 5,410,654; Ser. No. 07/734,359, filed Jul. 22, 1991, entitled "High Performance I/O Processor", R. Pearson now U.S. Pat. No. 5,276,684 Ser. No. 07/733,950, filed Jul. 22, 1991, entitled "A Serial Diagnostic Interface Bus for Multiprocesor Systems", D. Foster et al. now U.S. Pat. No. 5,469,542; and Ser. No. 07/733,950, filed Jul. 22, 1991, entitled "High Definition Multimedia Display" S. Choi et al.

FIELD OF THE INVENTION

This invention relates generally to data processing apparatus and method and, in particular, to a buffered interface for coupling multiple data processors and other components to a high speed system bus.

BACKGROUND OF THE INVENTION

System requirements needed to interact with and visualize large, time-dependent data sets include a large, high-bandwidth disk array to store the entire data set being processed, a high speed network to download a problem set, a large, high-speed memory to buffer all data required to process a single simulation time step, computational power that is adequate to manipulate, enhance, and visualize the data sets, and a real-time, high resolution visual display. Furthermore, it is important that these functions be provided within a highly programmable and flexible user environment.

One fundamental problem encountered in multiprocessor systems is the interconnection of a collection of processors and/or I/O devices to a common Global Memory. Typical shared bus solutions limit the number of devices that can be attached to the bus, as determined by the electrical characteristics of the bus interface logic and the total bandwidth limitation of the bus. Electrical factors which limit the maximum number of devices that can be supported on a shared bus include the total distributed capacitance, the loading presented by the attached interface logic, and bus termination logic relative to the maximum drive capability of the bus drivers. Factors limiting the total bandwidth of the shared bus include the operating clock speed and the width of the data paths.

Given the existing state of technology, known types of high-speed, shared buses typically limit the total number of bus loads (i.e., processor cards, memory cards, and I/O interface cards) to less than 20. Thus, assuming that each processor, I/O interface, and memory card represents one bus load, these multiprocessor systems are typically limited to less than ten processor nodes in order to support a complementary mix of memory and I/O devices.

It is one object of the invention to provide a Universal Buffered Interface (UBIF) for coupling multiple data processors, memory units, and I/O interfaces to a common high-speed interconnect, such as a shared system bus.

It is another object of the invention to provide a mechanism for one data processor of a multiprocessor system to rapidly communicate with any other data processor or group of data processors in the data processing system.

SUMMARY OF THE INVENTION

The foregoing and other problems are overcome and the objects of the invention are realized by a multi-processor data processing system including a set of local buses as well as a global bus. The processors in the system are divided into groups, and within each group the processors are coupled together by a local bus. The groups of processors are interconnected by the global bus, also known as a high speed interconnect. The global bus includes a number of signal lines to transmit data, address and control information. In accordance with the invention a method of communication between data processors is disclosed in which a data processor is enabled to initiate communication with another data processor or data processors. A data processor mask encodes information that identifies another data processor. The data processor mask is set by a first data processor and is transmitted over the global bus via certain signal lines that transmit address information and control information. An identifier is also generated and transmitted by the data processor. All of the other data processors that are coupled to the global bus receive the data processor mask and decode the received data processor mask as well as a bus transaction identifier. An identified data processor or processors are then interrupted so as to initiate interprocessor communication. A set of interfaces couples each group's local bus to the global bus. Any one of the data processors can arbitrate for the privilege to access the global bus address signal lines and control signal lines. An inter-processor communication (IPC) mechanism that enables any processor to send an interrupt to any other processor or processors in the system during a single global bus cycle is achieved.

In accordance with a presently preferred embodiment of the invention the multiprocessor data processing system includes a group of computational data processors with its proprietary memory coupled together by a first local bus. Another group of communication data processors with its proprietary memory coupled together by a second local bus. A set of global memory banks coupled together by a third local bus. The above three local buses are interfaced with the global bus by an interface. The interface includes a number of multiple element input queues and output queues which are coupled between the local bus and the global bus, with an input queue and an output queue being associated with each data processor of the group.

BRIEF DESCRIPTION OF THE DRAWING

The above set forth and other features of the invention are made more apparent in the ensuing Detailed Description of the Invention when read in conjunction with the attached Drawing, wherein:

FIG. 25b illustrates four global memory read-modify-write operations, each directed to a different global memory bank;

DETAILED DESCRIPTION OF THE INVENTION

Figure 1:
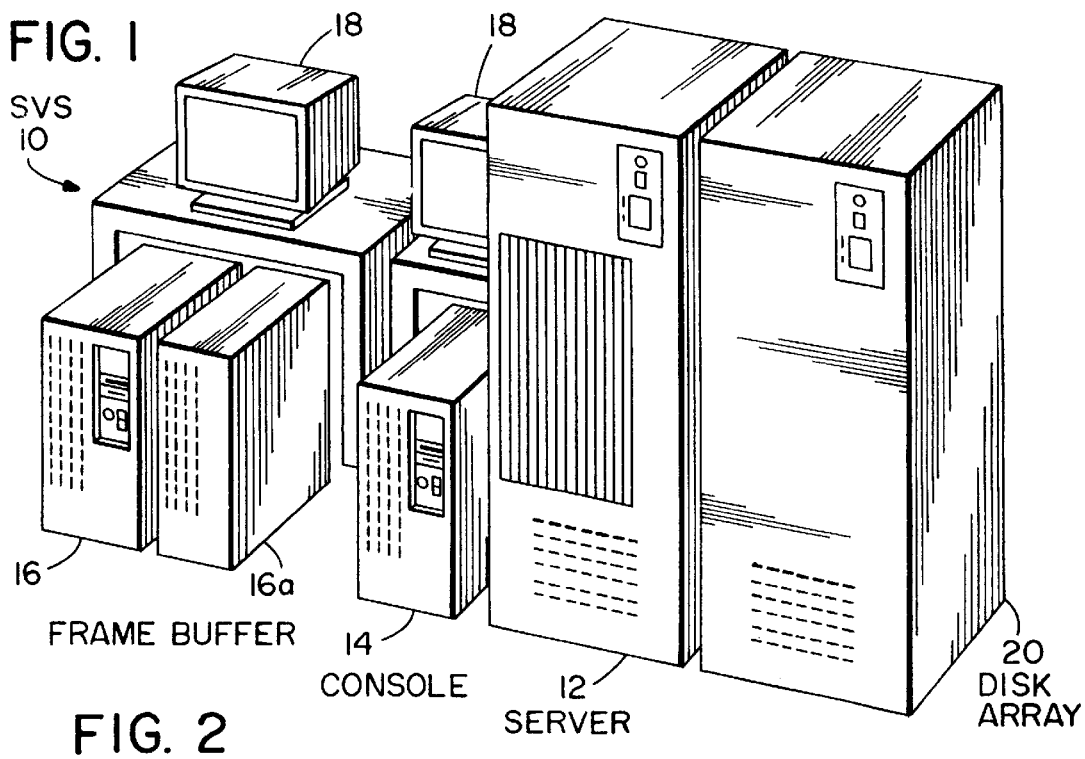
FIG. 1 illustrates the system components of a scientific visualization system.

Referring to FIG. 1 there is illustrated a multiprocessor system that employs a Universal Buffered Interface (UBIF) that is constructed and operated in accordance with the invention. Specifically, there are illustrated components of a Scientific Visualization System (SVS) 10. A purpose of the SVS 10 is to process, manipulate, and visualize complex data sets at interactive speeds, although the use of the system 10 is not limited to only this one important application. Furthermore, and as will become apparent, the use of the UBIF is not restricted to only this particular system. That is, the UBIF may be employed to advantage in a number of different types of data processing systems.

The SVS 10 includes several major components. A first component is a server 12 embodied within a data processing system that provides large-scale computational power, high-speed memory, and intelligent I/O processors, all of which are interconnected by a high speed global bus. The terms global bus, shared bus, and common interconnect are used interchangeably herein.

A second component is a console 14 embodied in, by example, a RISC System/6000 (RS/6000) data processing system manufactured by the International Business Machines Corporation (RISC System/6000 is a Trademark of the International Business Machines Corporation). The console 14 provides network access from remote workstations (not shown).

A third component is a Frame buffer 16 that includes a RS/6000 data processor that provides console functions therefore. The frame buffer 16 includes interface and image buffering hardware 16a attached via an ANSI standard High Performance Parallel Interface (HIPPI) interface for providing real-time display capability to high-resolution displays 18. A further component of the system 10 is a disk array 20. Disk array 20 may embodied within a storage system having 21 GByte capacity with 55 MByte/second transfer rate, via a HIPPI interface.

It should be realized that the exact configuration of the system 10 varies depending on the intended use and that the configuration of FIG. 1 is not intended to represent a limitation upon the practice of the invention.

Figure 2:
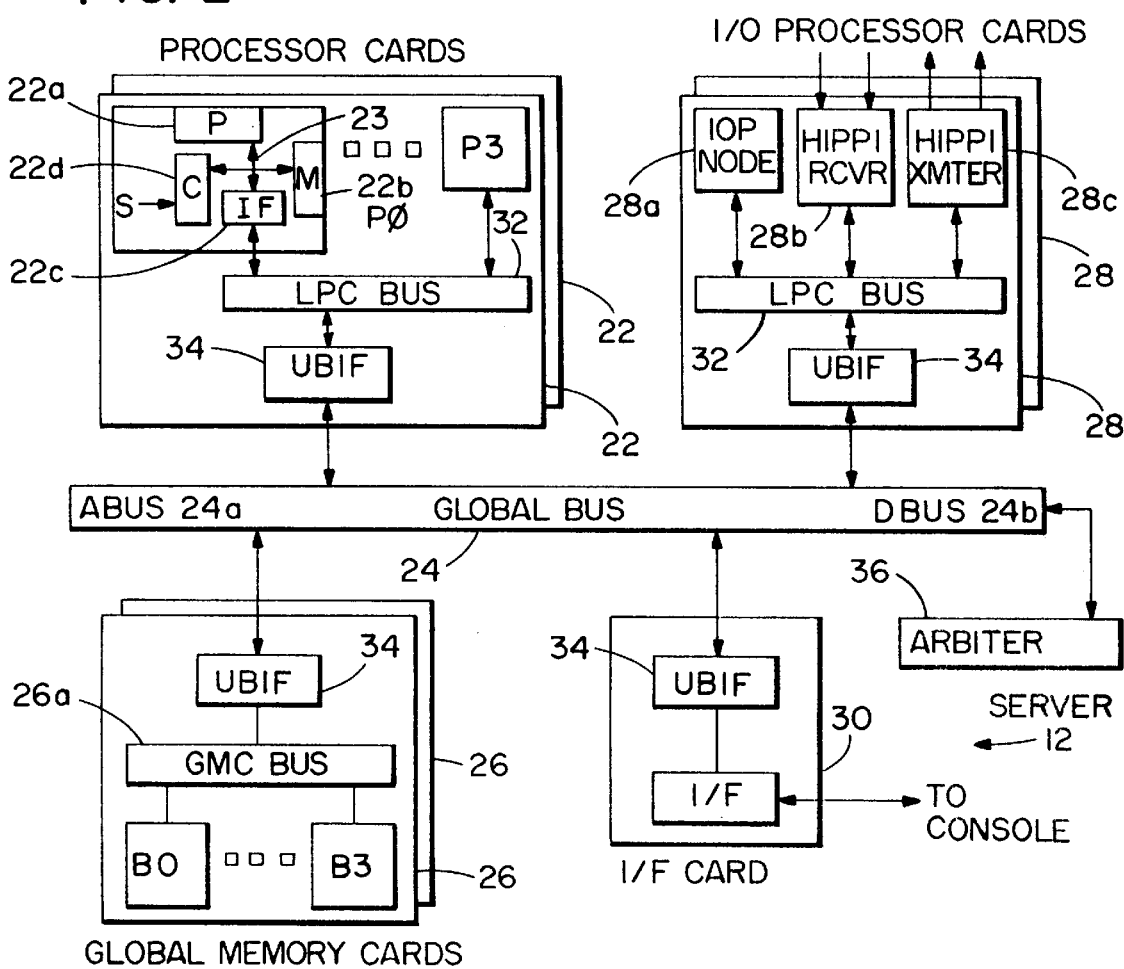
FIG. 2 is a block diagram of the system server component of FIG. 1.

Referring to FIG. 2 there is illustrated in block diagram form the server 12 of the SVS 10. Server 12 is comprised of a plurality of individual processors 22a organized as four processors (P0–P3) per printed circuit card 22. The server 12 may include up to eight cards for a total of 32 processors. Each processor card 22 includes a universal bus interface (UBIF) 34 for coupling a Local Processor Card (LPC) bus 32 to a SVS global bus 24. Also coupled to the SVS global bus 24 are a plurality of Global Memory cards 26, a plurality of I/O processor cards 28, and an interface 30 to the console 14.

More specifically, each processor card 22 includes up to four processor nodes each having a microprocessor 22a. In a present embodiment each microprocessor 22a is an i860-type (80860) microprocessor manufactured by Intel Corporation (i860 is a Trademark of the Intel Corporation). Coupled to each microprocessor 22a through a node bus 23 is a local node memory 22b providing, in this embodiment, 16 megabytes (MB) of storage. Each processor node also includes a buffered interface 22c to the LPC bus 32. The LPC bus 32 connects multiple processor nodes to the UBIF 34 and also permits access to further shared resources. Additionally, each processor node includes an interface 22d to a serial bus (S). Details of the serial bus interface are set forth in commonly assigned U.S. patent application Ser. No. 07/773,767, filed Jul. 22, 1991, entitled "A Serial Diagnostic Interface Bus For Multiprocessor Systems" by A. Garcia et al. now U.S. Pat. No. 5,469,542.

In a present embodiment one of the processor cards 22 is capable of a peak performance of 160 million instructions per second (MIPS), or 320 million single precision floating point operations per second (MFLOPS). A fully configured system of eight processor cards 22 provides a peak performance approaching 1.28 billion instructions per second (BIPS) or 2.56 GFLOPS, assuming 40 MHz operation.

In a present embodiment each of the Global Memory cards 26 is configured with either 128 MB or 256 MB of random access memory with ECC. The server 12 may include up to four Global Memory cards 26. Each of the Global Memory cards 26 provides a data bandwith of 640 MB/second in a manner that reduces a memory access latency seen by each user of the system 10. This is accomplished by partitioning the Global Memory on each memory card 26 into four memory banks (B0–B3), each of which is capable of independently performing block read cycles, page mode read or write cycles and random read or write cycles. A Global Memory Card (GMC) bus 26a enables each of the banks (B0–B3) to operate independently, while utilizing common global bus resources.

The I/O processor cards 28 each include a processor node 28a, similar to the processor mode 22a on the processor card 22, two HIPPI receivers 28b, and two HIPPI transmitters 28c. Each IOP 28 thus provides four HIPPI interfaces, each of which is capable of operation at a transfer rate of 100 MB/second. The HIPPI interfaces are employed to support high speed disk arrays, provide real-time images to HIPPI-attached frame buffers, and realize high speed communication with external devices, such as supercomputers.

The Console interface 30 is partitioned into two cards, one which is found within the server 12 and one which resides in the console 14. The link between the two cards allows access to the server global memory and serial bus, which in turn allows access to each processor's local memory and PBIF.

The Global Bus 24 is implemented with Emitter Coupled Logic (ECL) technology for interconnecting these various components and providing a 1.28 GByte/sec transfer rate, assuming 40 MHz operation.

Each SVS 10 server 12 supports up to 12 master devices (i.e. processor cards 22, I/O processor cards 28, or console Interface card 30), and up to four memory cards 26. One possible configuration includes the console Interface card 30, eight processor cards 22 (or 32 processors), four Global Memory cards 26, each with 256 MBytes of storage for a total of 1024 MB of high speed shared memory, and one I/O processor 28 to support the high speed disk array 20, receive data from a HIPPI source, and distribute image data to HIPPI attached frame buffers 16. The console workstation 14 provides a user interface to the SVS 10 as well as support for standard I/O devices such as LAN adapters and disk controllers.

As can be seen in FIG. 2 each component card of the system 10 includes one of the UBIFs 34, all of which are of identical construction. The UBIF 34 presents a shared, synchronous, decoupled interface to the Global Bus 24, provides local arbitration on the LPC bus 32 or GMC bus 26a, and performs all necessary handshaking and retry sequencing with the Global bus 24. In a present embodiment the UBIF 34 provides bidirectional, pipelined buffering to support up to four local master devices, such as processors 22a, or up to four slave devices, such as the memory banks B0–B3. The UBIF 34 supports unlimited data bus widths in multiples of 32-bits and provides a peak data transfer rate of 640 Mbytes/second between the Local Bus 32 and the Global Bus 24, assuming 40 MHz bus operation and a 256-bit wide data path.

A further description of the UBIF 34 is now provided.

Figure 3A:
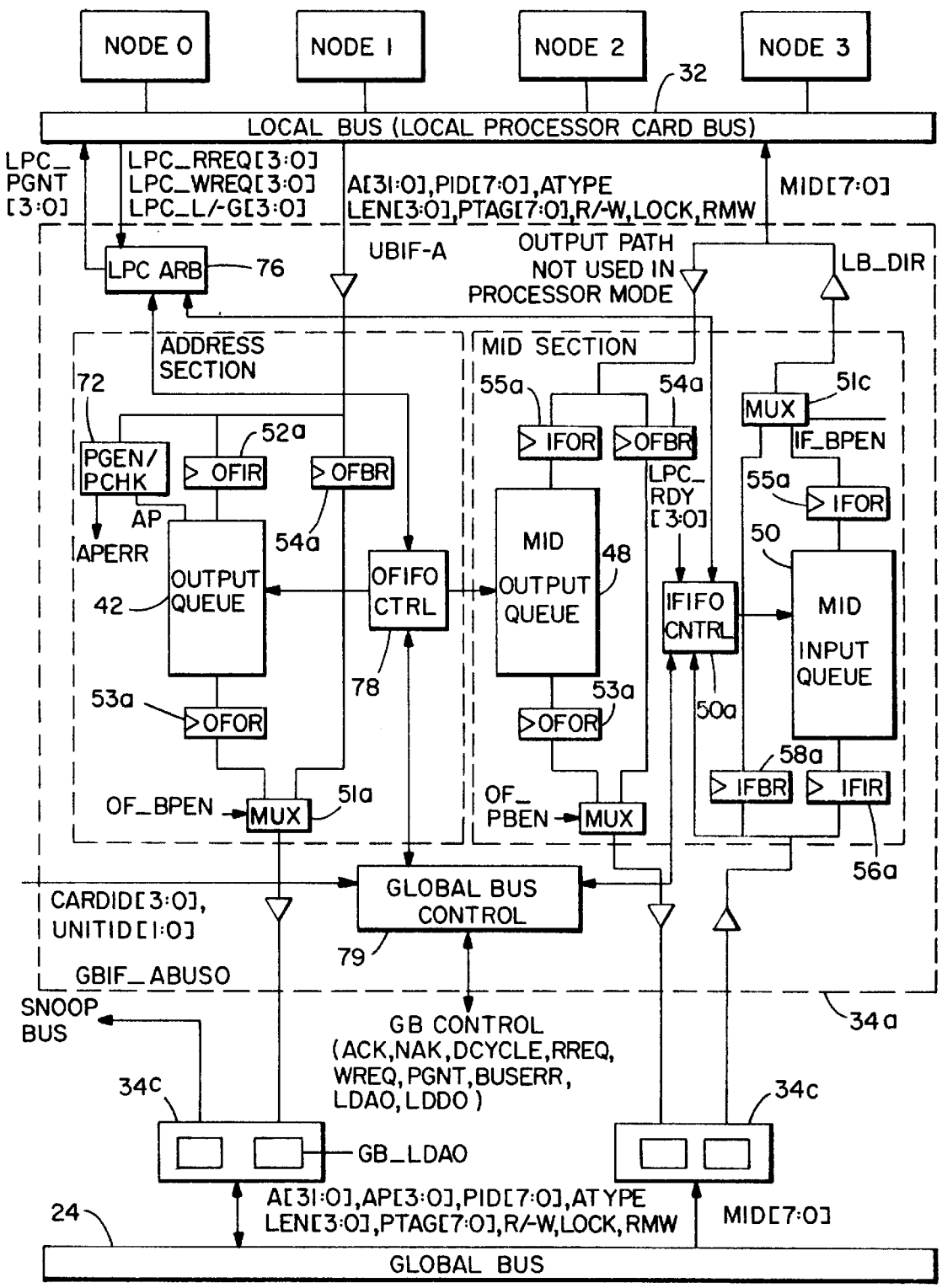
FIG. 3a is a block diagram showing an address portion of a Universal Buffered Interface (UBIF-A) coupled to processor nodes or I/O interface nodes.
Figure 3B:
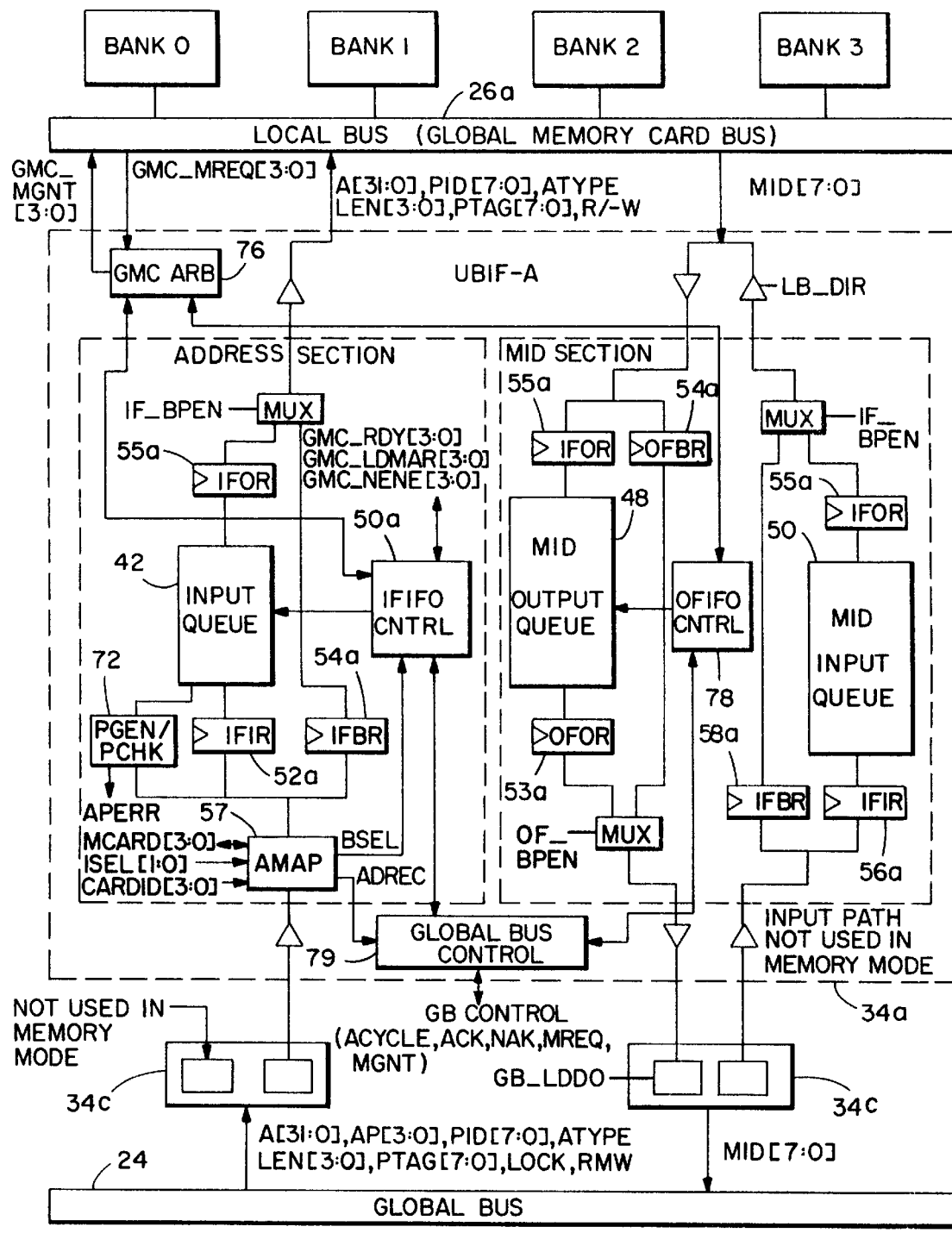
FIG. 3b is a block diagram showing an address portion of the Universal Buffered Interface (UBIF-A) when coupled to memory bank nodes.
Figure 4:
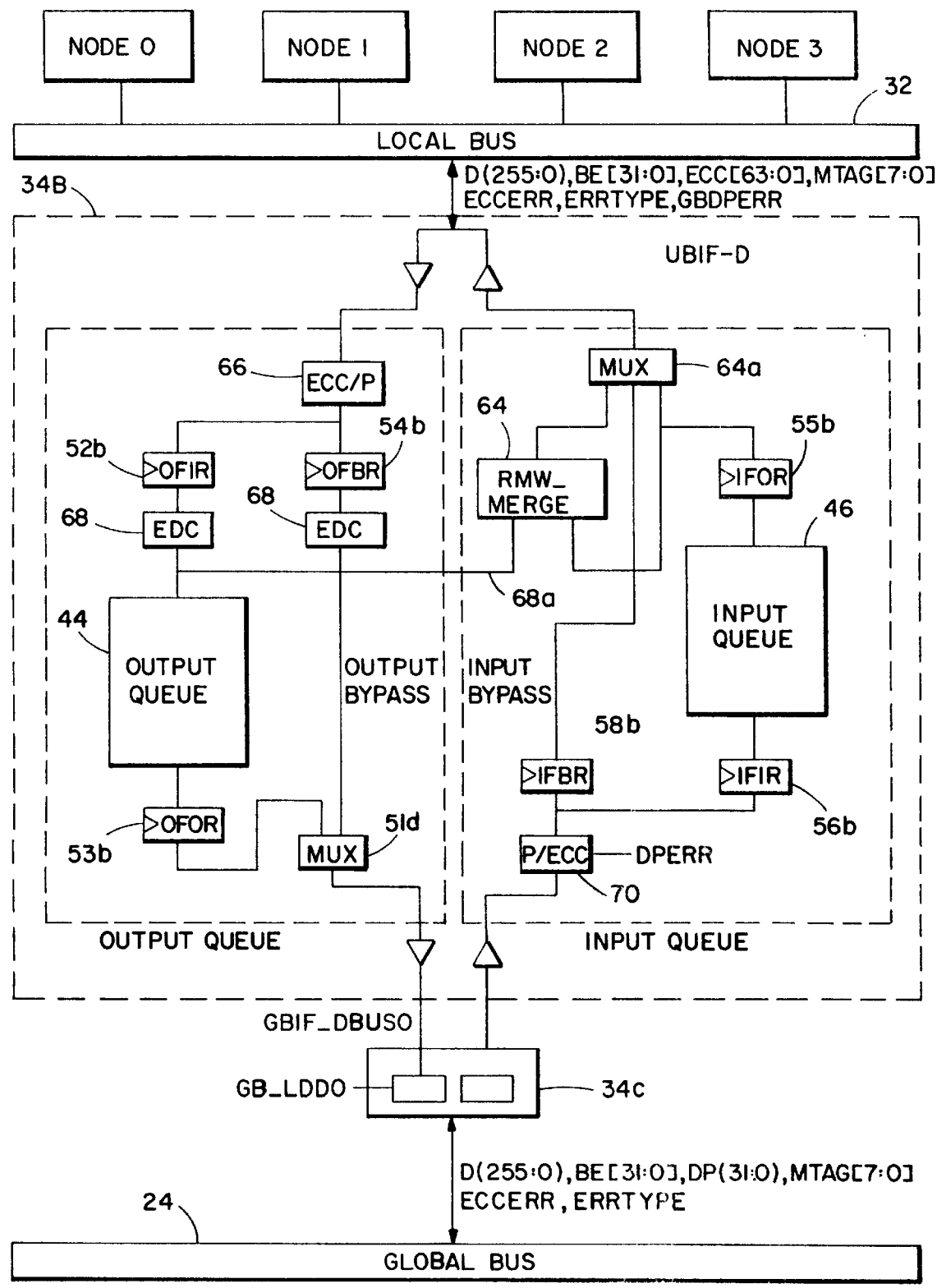
FIG. 4 is a block diagram showing a data portion of the Universal Buffered Interface (UBIF-D)

FIG. 3a and FIG. 4 depict the architecture of UBIF-A (address) 34a and UBIF-D (data) 34b modules, respectively. FIG. 3a shows the UBIF-A for use on processor cards 22, I/O processor cards 28, or the console I/F card 30. FIG. 3b, described below, shows the UBIF-A for use on Global Memory cards 26. The UBIF-A 34a includes a local bus arbiter (LPC ARB) 76, bidirectional address and control queues for each of the four local devices, output FIFO controls (OFIFO_CTRL 78), input FIFO controls (IFIFO_CNTRL) 50a) and GB 24 interface control logic (Global Bus Control 79). The UBIF-A 34a also provides high-level control of the eight independent UBIF-D 34b modules, which contain bidirectional data queues for each of the four local devices. In a current embodiment each UBIF-D 34b supports a 32-bit data section with associated byte enables, parity bits, and ECC bits. A detailed architect description of the UBIF 34 functional modules is provided below.

Figure 26A:
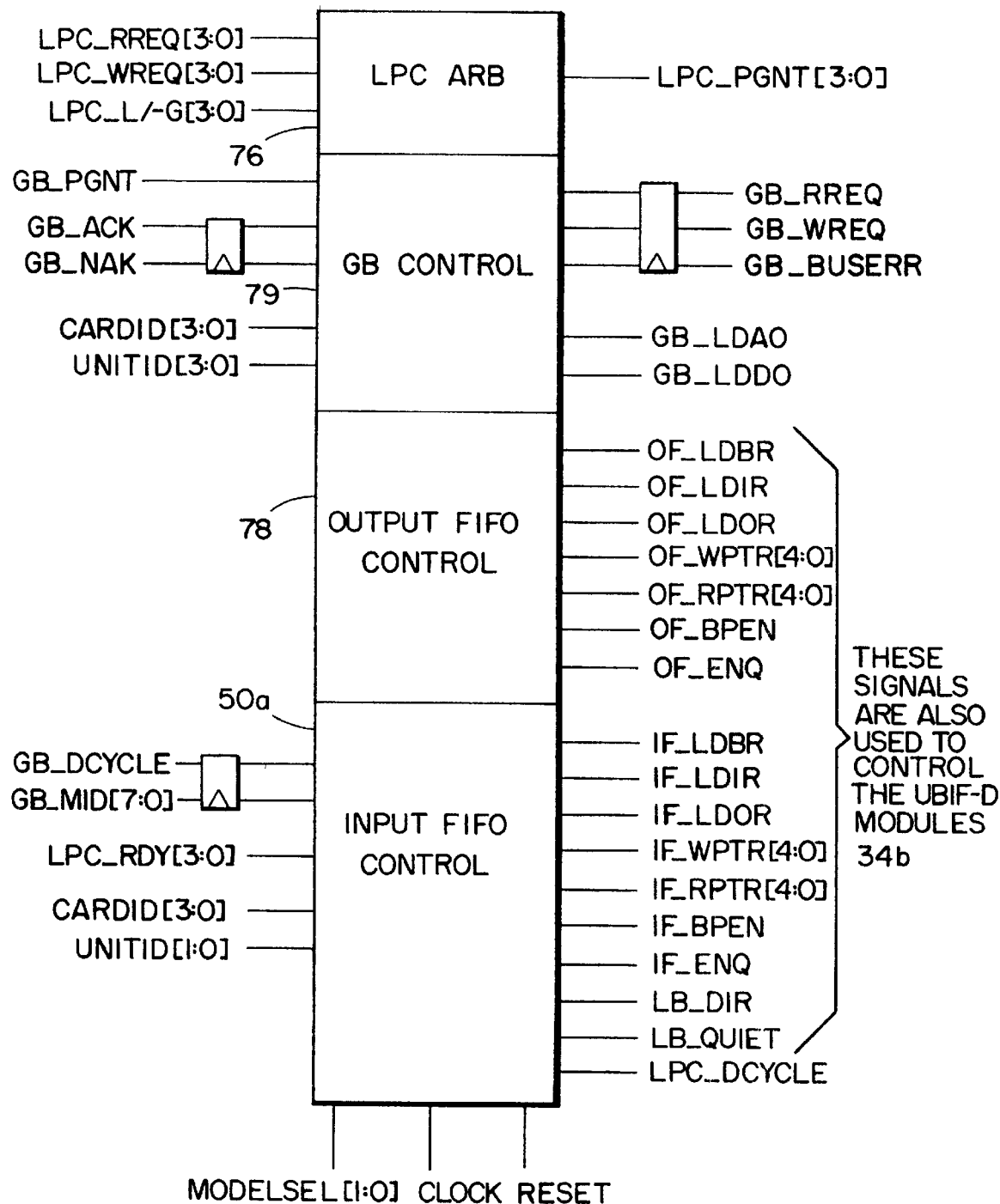
FIG. 26a shows the input and output signals for UBIF control when used in a processor mode.
Figure 26B:
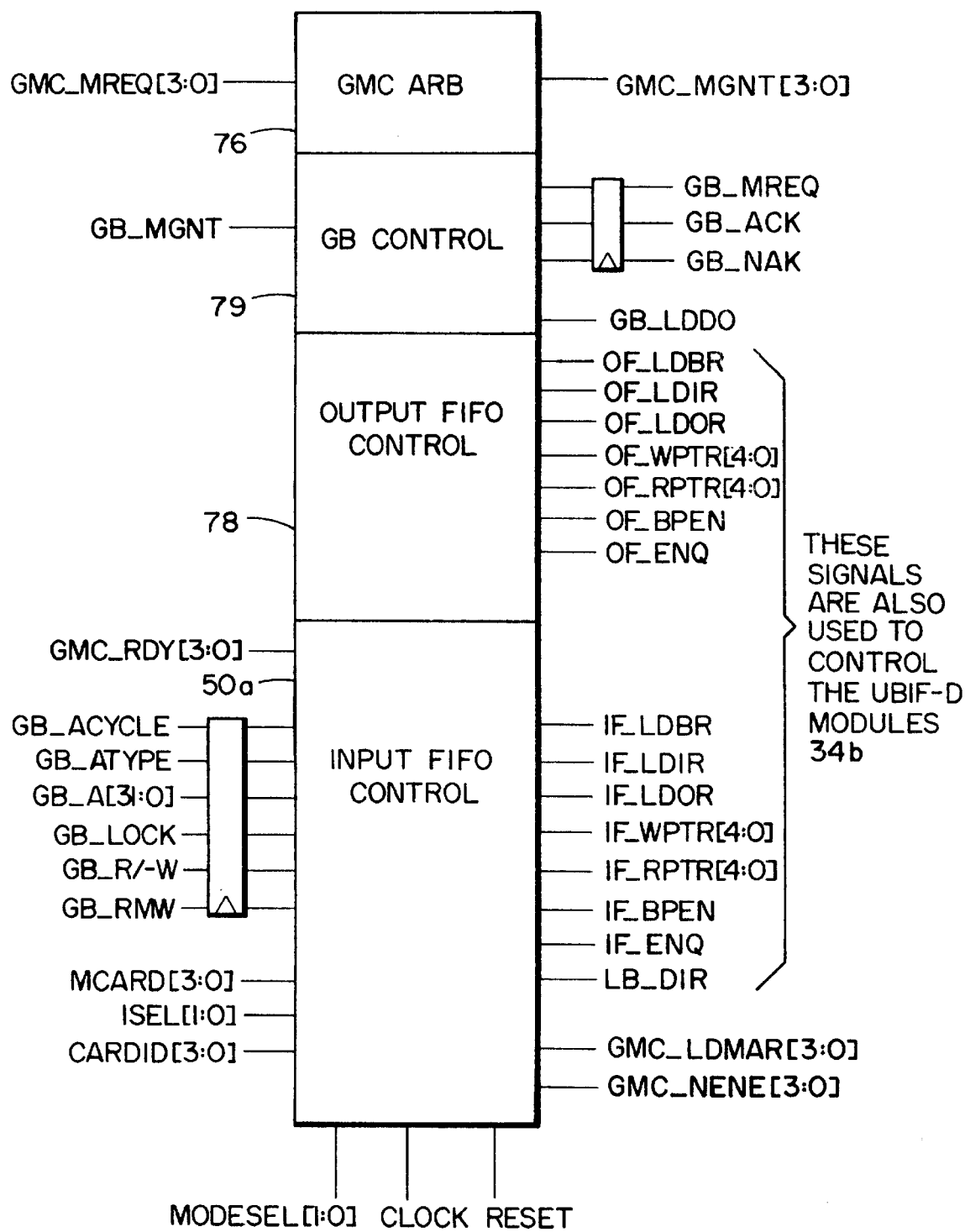
FIG. 26b shows the input and output signals for UBIF control when used in a memory mode.
Figure 27:
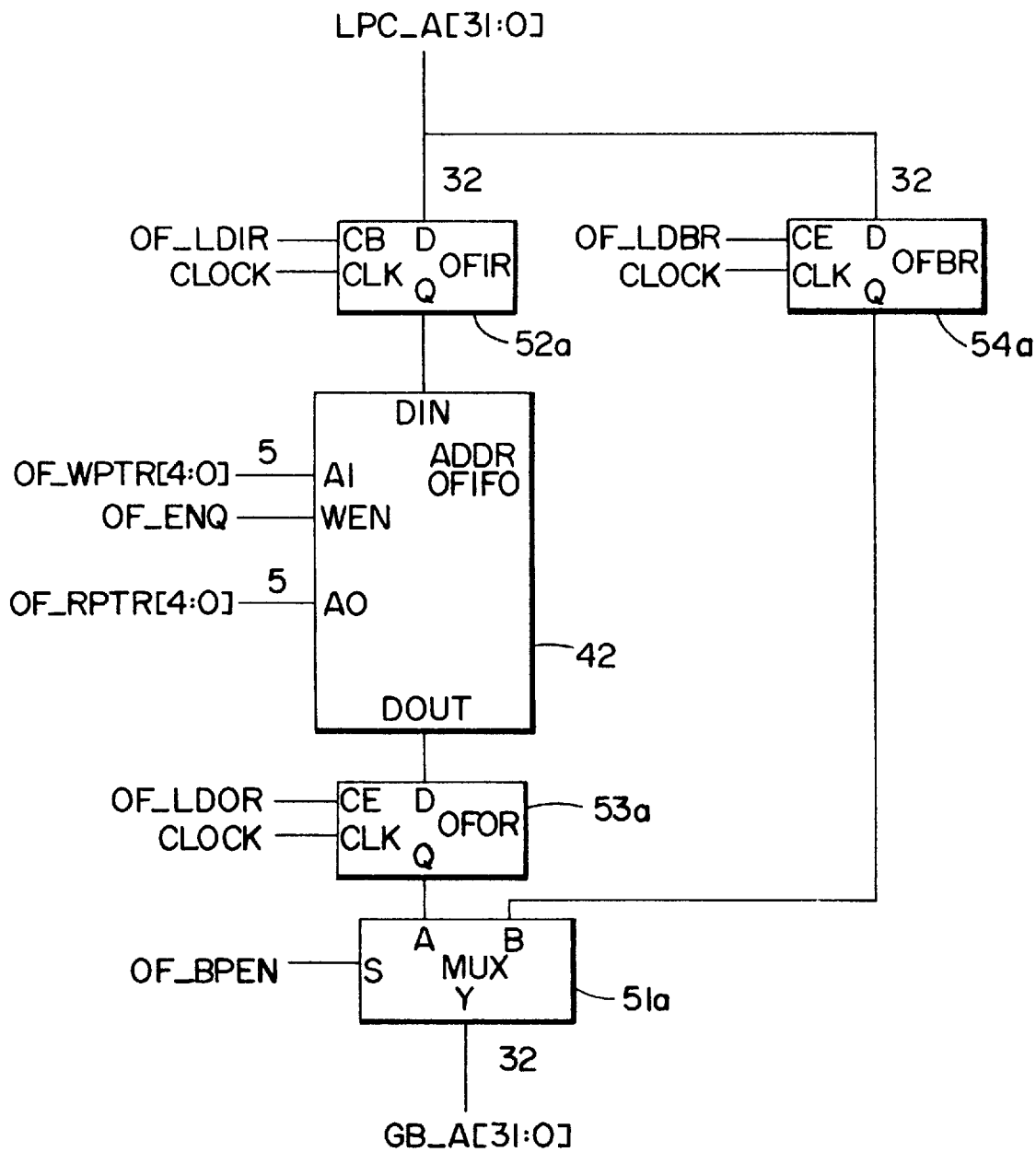
FIG. 27 is a block diagram showing in greater detail the UBIF-A address selection circuitry for use in a processor mode of operation.
Figure 28:
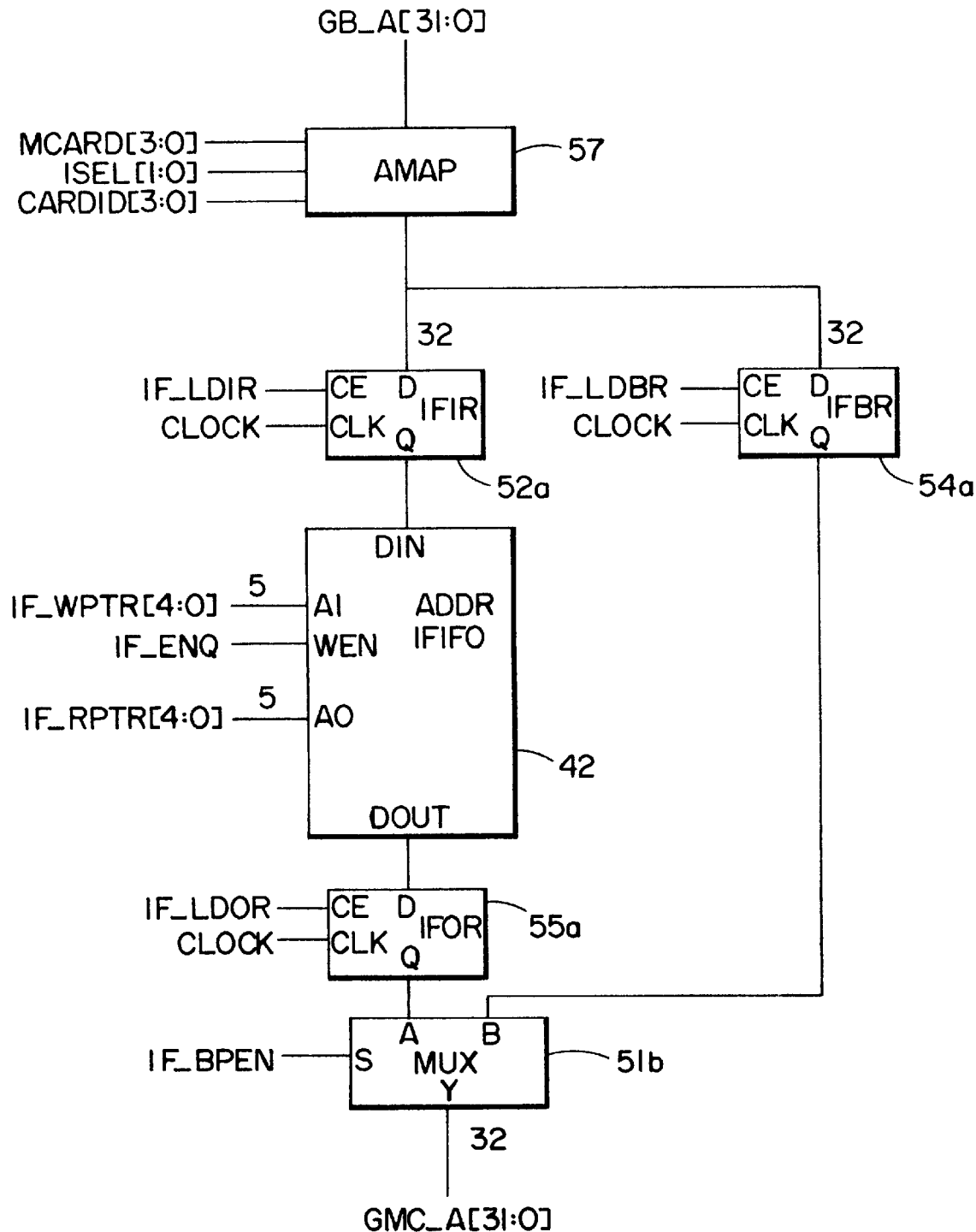
FIG. 28 is a block diagram showing in greater detail the UBIF-A address selection circuitry for use in a memory mode of operation.
Figure 29:
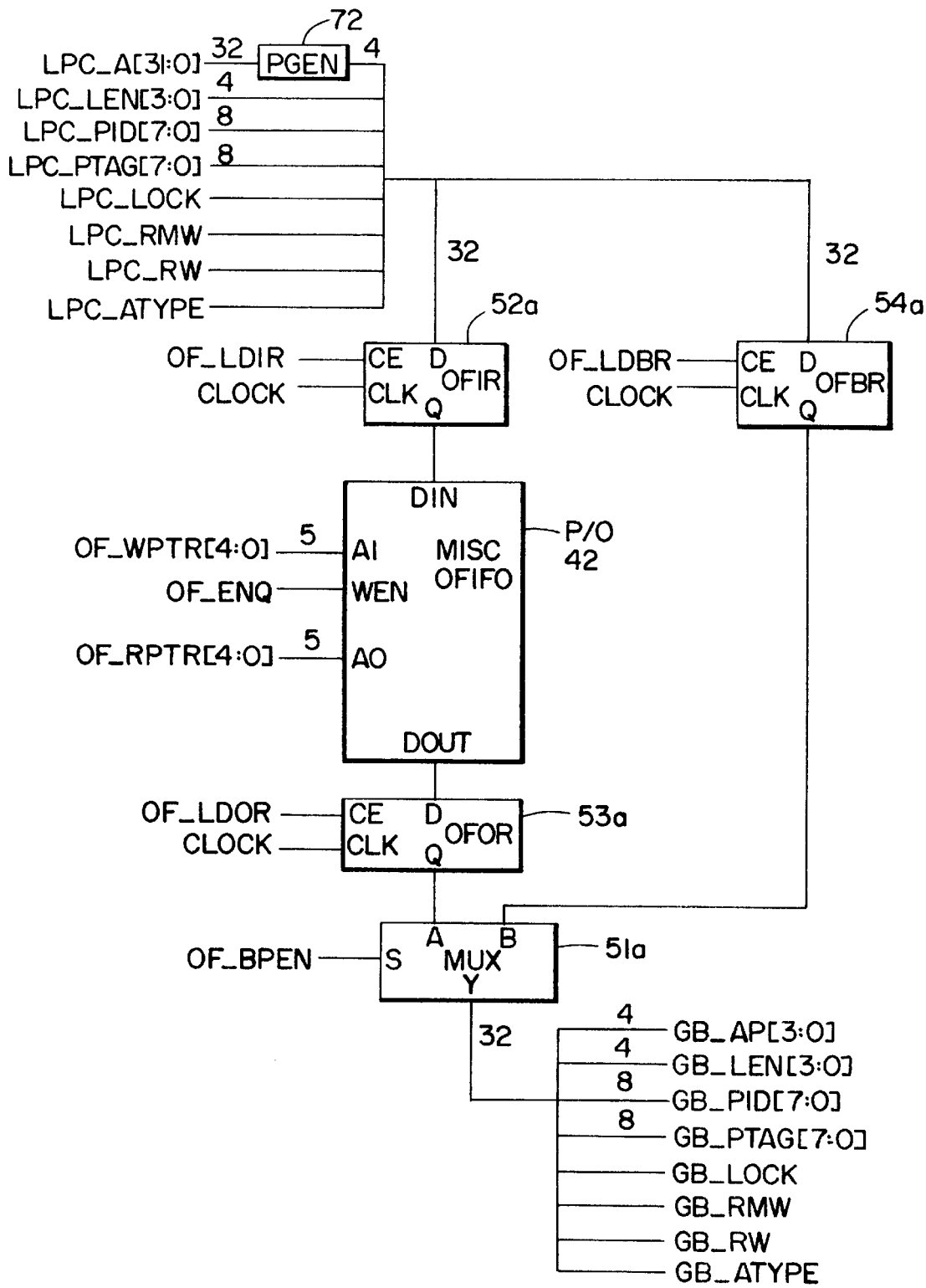
FIG. 29 is a block diagram showing in greater detail additional UBIF-A address selection circuitry for use in a processor mode of operation.
Figure 30:
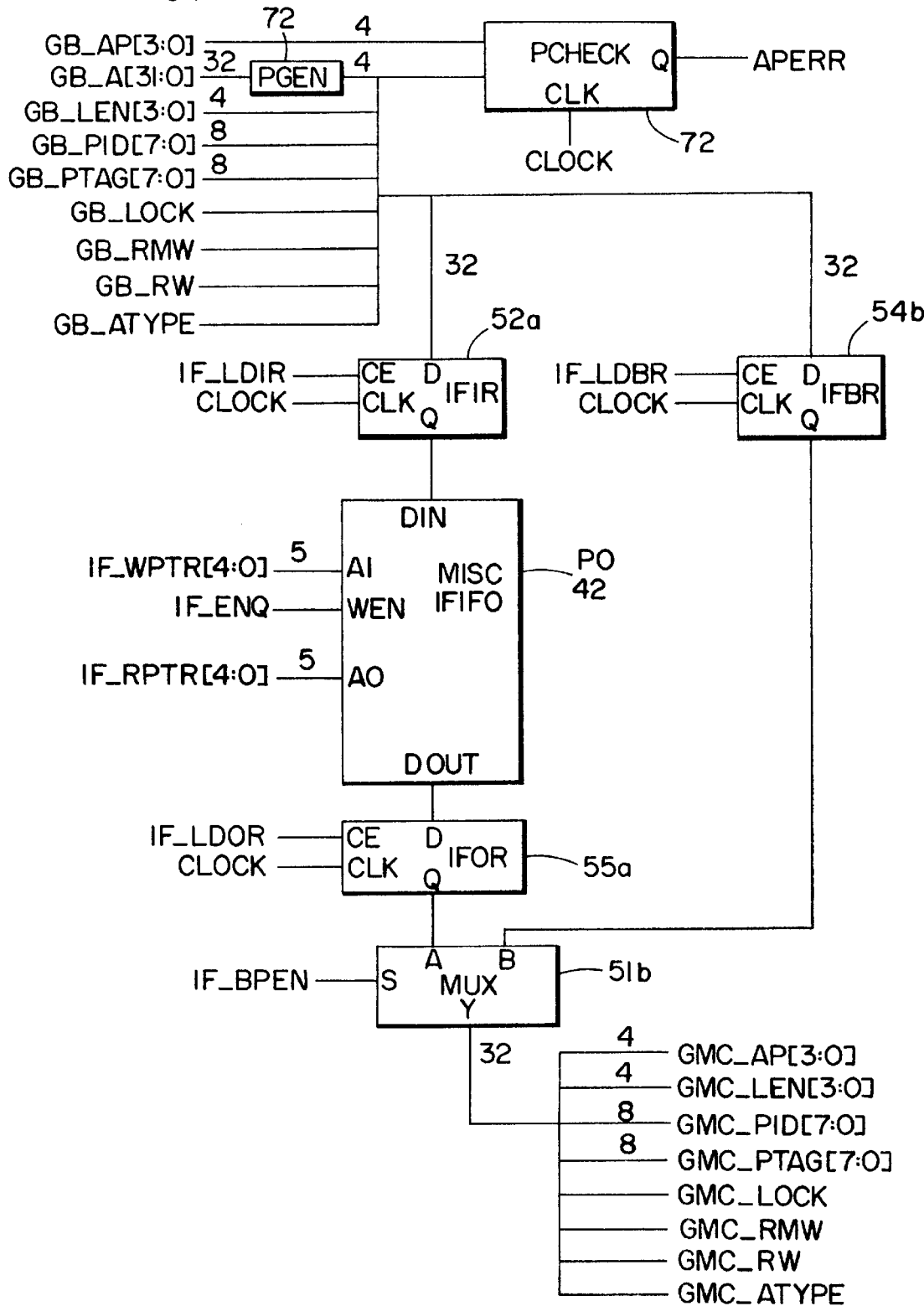
FIG. 30 is a block diagram showing in greater detail additional UBIF-A address selection circuitry for use in a memory mode of operation.
Figure 31:
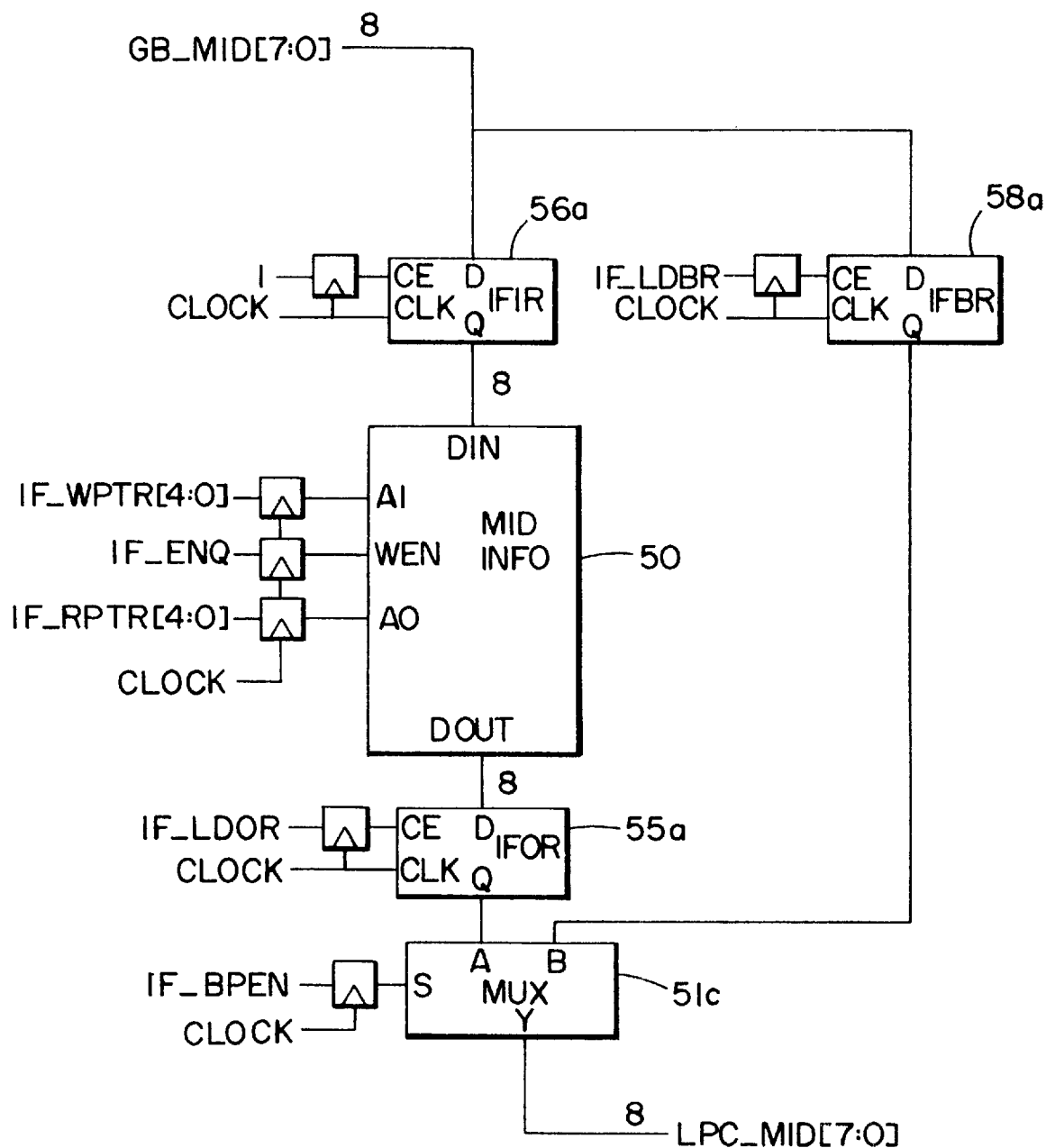
FIG. 31 is a block diagram showing in greater detail UBIF-A MID circuitry for use in a processor mode of operation.
Figure 32:
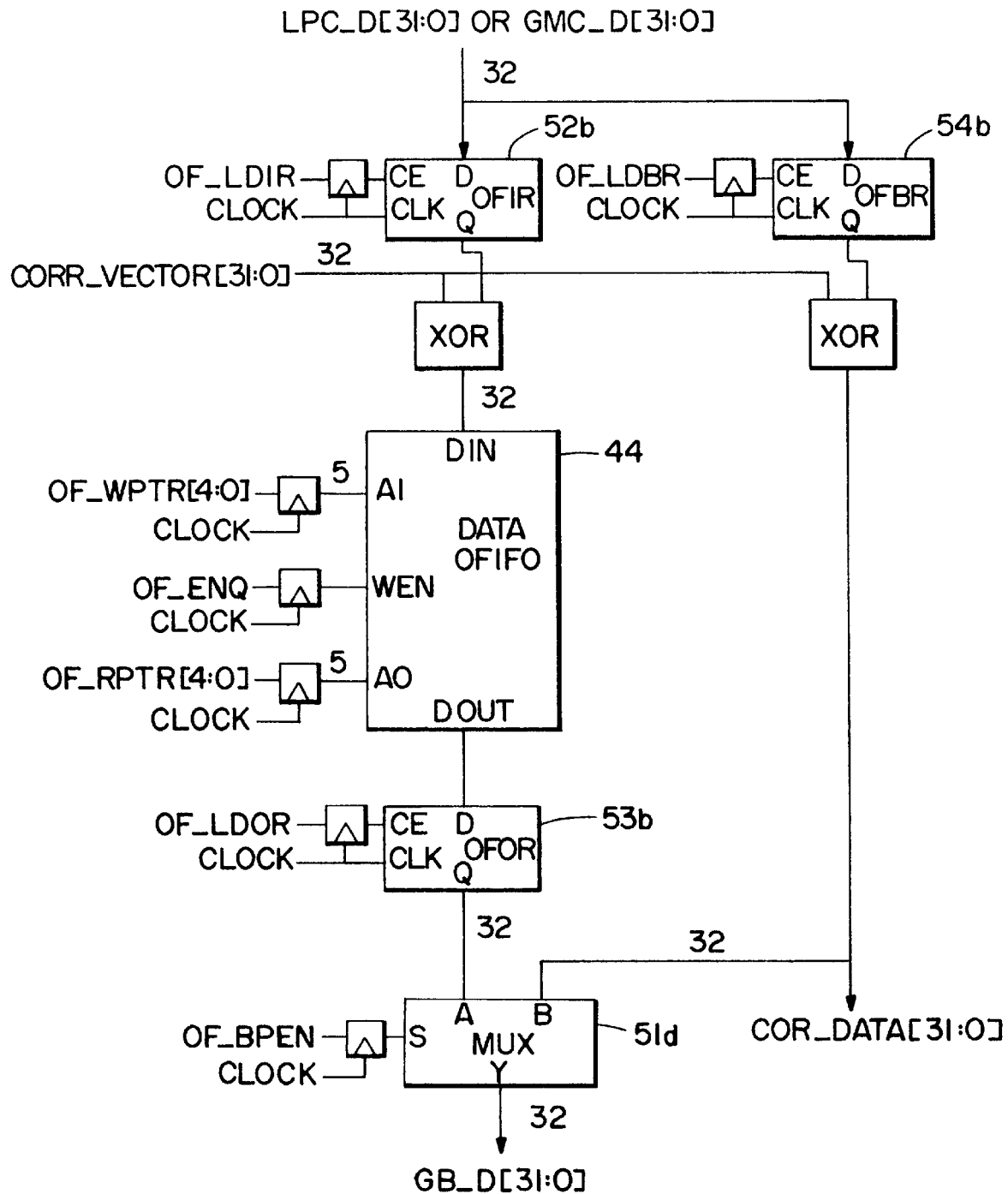
FIG. 32 is a block diagram showing in greater detail the UBIF-D output circuitry.

The following defines the various components of the UBIF-A 34a and UBIF-D 34b functional blocks. In addition, Appendix A provides a signal definition of the Global Bus (GB 24), Appendix B provides a signal definition of the Local Processor Card (LPC) bus 32, and Appendix C provides a signal definition of the Global Memory Card (GMC 26a) bus, as implemented in the SVS 10. In addition, FIG. 26a shows the input and output signals for the UBIF controls when used in a processor mode; and FIG. 26b shows the input and output signals for UBIF controls when used in a memory mode. It should be noted that all control signals labeled OF_, IF_, LB_DIR and LB_QUIET are generated by the UBIF_A control sections and are registered internally by the eight UBIF_D modules, as well as by the UBIF_A to control the MID queues. This conforms to the LPC bus 32, GMC bus 26a and GB 24 architecture in so far as which defines pipelined address/data cycles are concerned.

OUTPUT QUEUES 42 and 44: These blocks each contain four independent output queues. Each of the four queues provides eight entries of buffering per local node.

INPUT QUEUES 46: This block contains four independent input queues. Each of the four queues provides eight entries of buffering per Local node.

MID OUTPUT QUEUES 48: This block contains four independent MID output queues. Each of the four queues provides eight entries of buffering per local node. As indicated in Appendix A, GB 24 signal lines GB_MID(7:0) convey the returned processor identification (PID) during Global Memory 26 reply cycles and indicate the destination for the returned data. The MID output queues 48 are only used in memory mode, as will be described.

MID INPUT QUEUES 50: This block contains four independent MID input queues. Each of the four queues provides eight entries of buffering per local node. The MID Input queues are only used in processor mode.

Output FIFO Input Register (OFIR) 52: This register (52*a*) samples valid local address bus cycles on the UBIF-A 34*a*, and valid local data bus cycles on the UBIF-D 34*b* (register 52*b*). Registers 52*a* and 52*b* drive the four output queues contained within blocks 42 and 44, respectively.

Output FIFO bypass register (OFBR) 54: This register samples valid local address bus cycles on the UBIF-A 34*a* (register 54*a*), and valid local data bus cycles on the UBIF-D 34*b* (register 54*b*). This register is used to bypass the output queues 42 and 44 when an output bypass path is enabled.

Output FIFO Output Register (OFOR) 53: This register latches the selected output from the output queues for transfer to the global bus transceiver 34*c*.

Input FIFO input register (IFIR) 56: This register samples valid global address bus cycles on the UBIF-A 34*a* (register 56*a*), and valid global data bus cycles on the UBIF-D 34*b* (register 56*b*). Registers 56*a* and 56*b* drive the four input queues contained within blocks 50 and 46, respectively.

Input FIFO bypass register (IFBR) 58: This register samples valid global address bus cycles on the UBIF-A 34*a* (register 58*a*), and valid global data bus cycles on the UBIF-D 34*b* (register 58*b*) Registers 58*a* and 58*b* bypass the input queues 50 and 46, respectively, when an input bypass path is enabled.

Input FIFO Output Register (IFOR) 55: This register latches the selected output from the input queues for transfer to the LPC bus 32.

Input FIFO next-near register (INFR) 60: (UBIF-A 34*a* only). This register saves, when the UBIF 34 is employed on a Global Memory card 26, the last valid ROW address to a Global Memory bank for comparison with the subsequent ROW address to be issued. The result of this comparison generates GMC_NENE(3:0), which is used to enable fast page-mode DRAM cycles.

Last address register (3:0) (LAR(3:0)) 62: (UBIF-A 34*a* only). These registers save the current read-lock address and processor identifier, PID(7:0), for each Global Memory bank and are employed to support atomic read-modify-write cycles in Global Memory 26, implemented as read-lock/write-unlock cycles.

Read/modify/write register (RMWR) 64: (UBIF-D 34*b* only). This register stores Global Memory 26 read data for merging with supplied write data for partial write cycles, as indicated by GB_RMW.

ECC Parity generation (ECC/P) 66: (UBIF-D 34*b* only). For a UBIF 34 employed with a Global Memory card 26 this logic section computes ECC and byte parity for each of the 32-bit data slices returned from a Global Memory 26 read operation. The computed ECC is registered, along with the Global Memory read data and the supplied ECC, for error detection and correction during a subsequent clock cycle.

Address Map (AMAP) 57: This block takes as input the supplied GB 24 address GB_A [31:0], along with an interleave factor, ISEL [1:0], CARDID [3:0], and MCARD [3:0] lines, and produces a remapped flat address (RAS/CAS), bank select, and address recognize (ADREC) signal to the GB Control 79. This block is only used in memory -mode.

Error detection and correction (EDC) 68: (UBIF-D 34*b* only). This circuitry inputs a computed ECC and a supplied ECC and generates ECCERR, ERRTYPE, and a 32-bit correction vector which is used to correct any single-bit data errors in each 32-bit data slice section.

Parity/ECC generation (P/ECC) 70: (UBIF-D 34*b* only). This circuitry computes ECC and byte parity on the incoming global bus data. The computed parity is compared with a supplied parity to check for GB 24 data parity errors. GB_DPERR is generated whenever a data parity error is detected. For a UBIF 34 employed with a Global Memory card 26 the computed ECC is stored, along with the supplied data, into a selected Global Memory 26 bank.

Parity generation/checking (PGEN/PCHK) 72: (UBIF-A 34*a* only). This circuitry computes parity on an incoming address, and compares the computed parity with the supplied address parity. GB_APERR is generated whenever an address parity error is detected.

The following describes the use of the UBIF 34 for each of the card-types in the SVS 10.

Processor Card and I/O Processor Card Support

Figure 5:
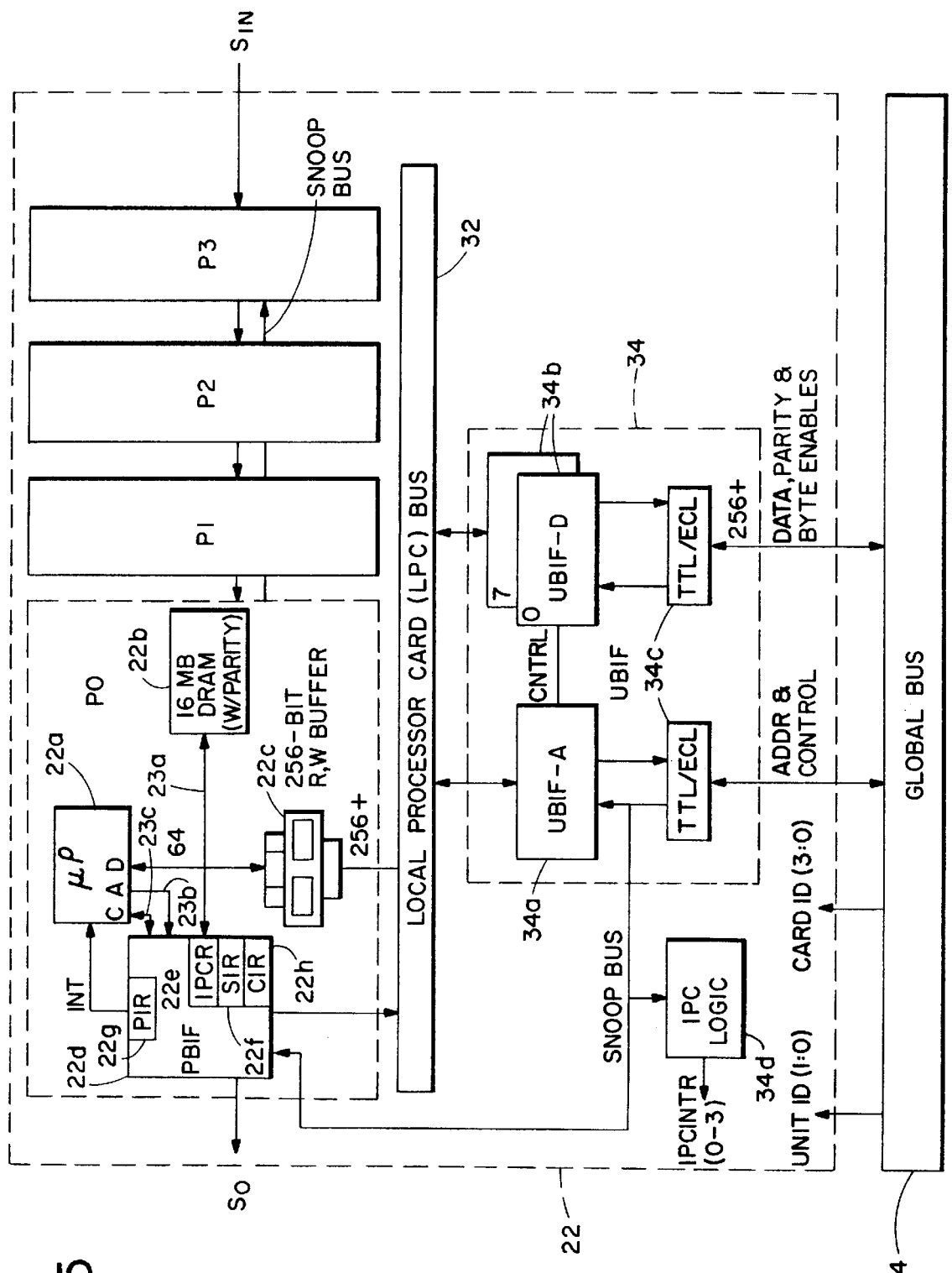
FIG. 5 is a block diagram depicting a SVS processor card architecture.
Figure 6:
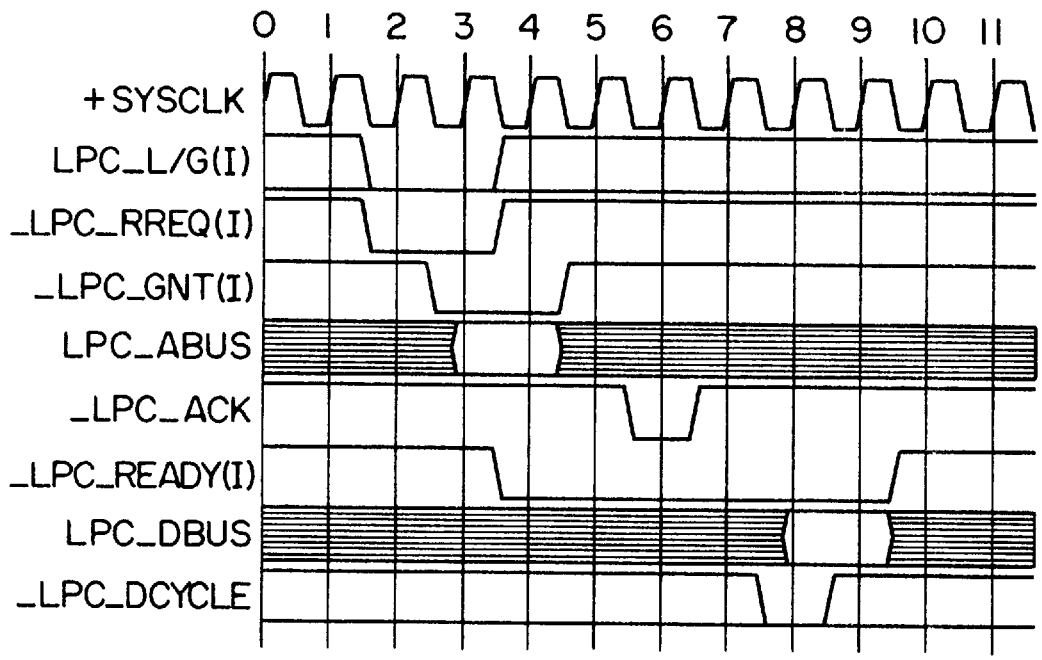
FIG. 6 is a timing diagram depicting local-to-global bus read request timing.
Figure 7:
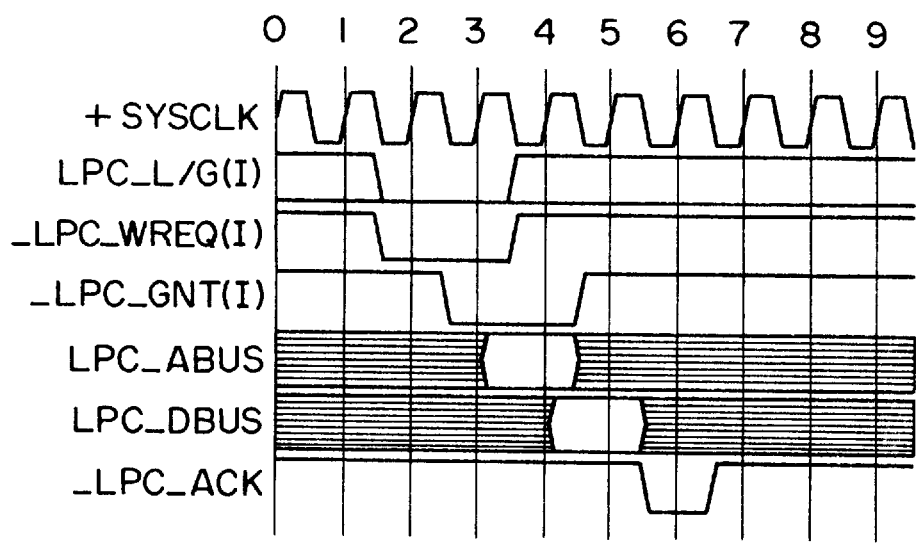
FIG. 7 is a timing diagram depicting local-to-global bus write request timing.
Figure 8:
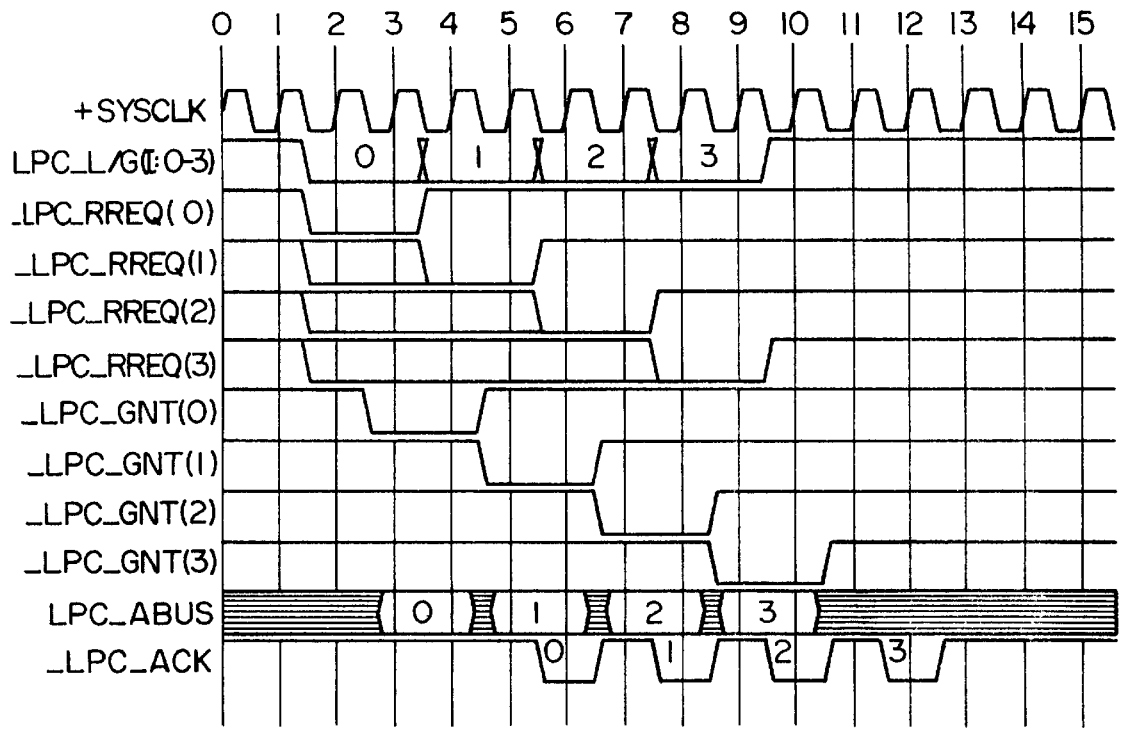
FIG. 8 is a timing diagram depicting a four processor local-to-global bus read request timing.
Figure 9:
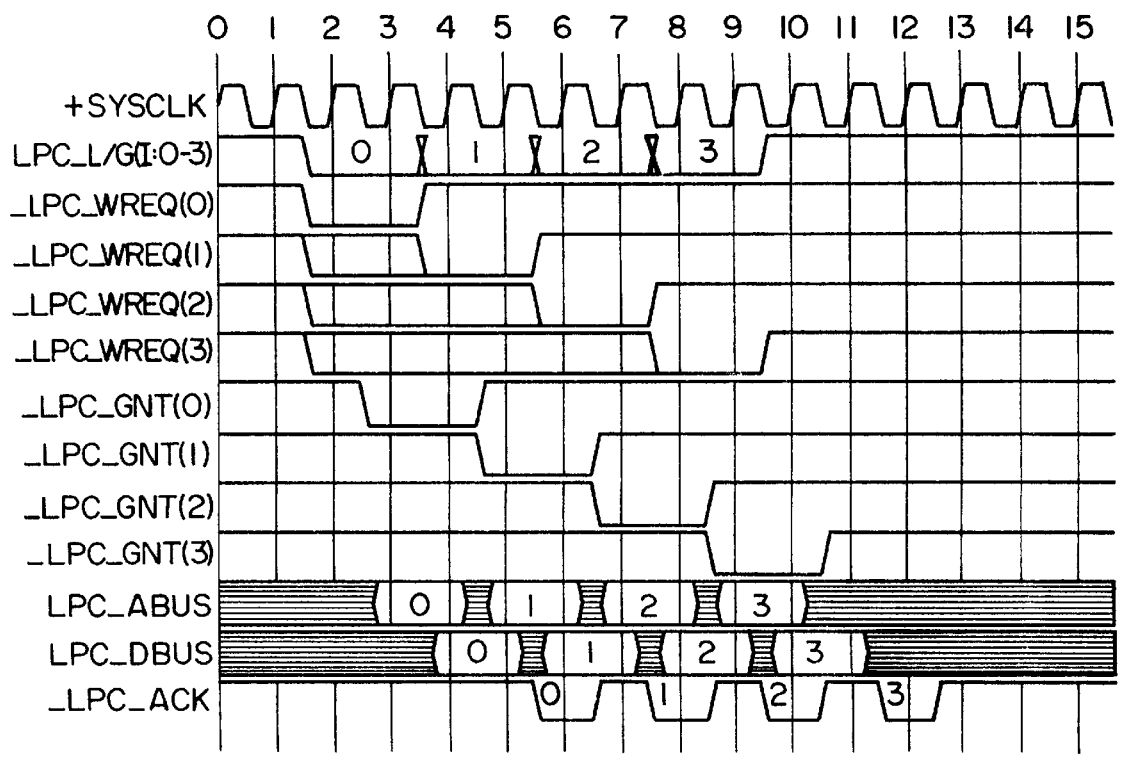
FIG. 9 is a timing diagram depicting a four processor local-to-global bus write request timing.
Figure 10:
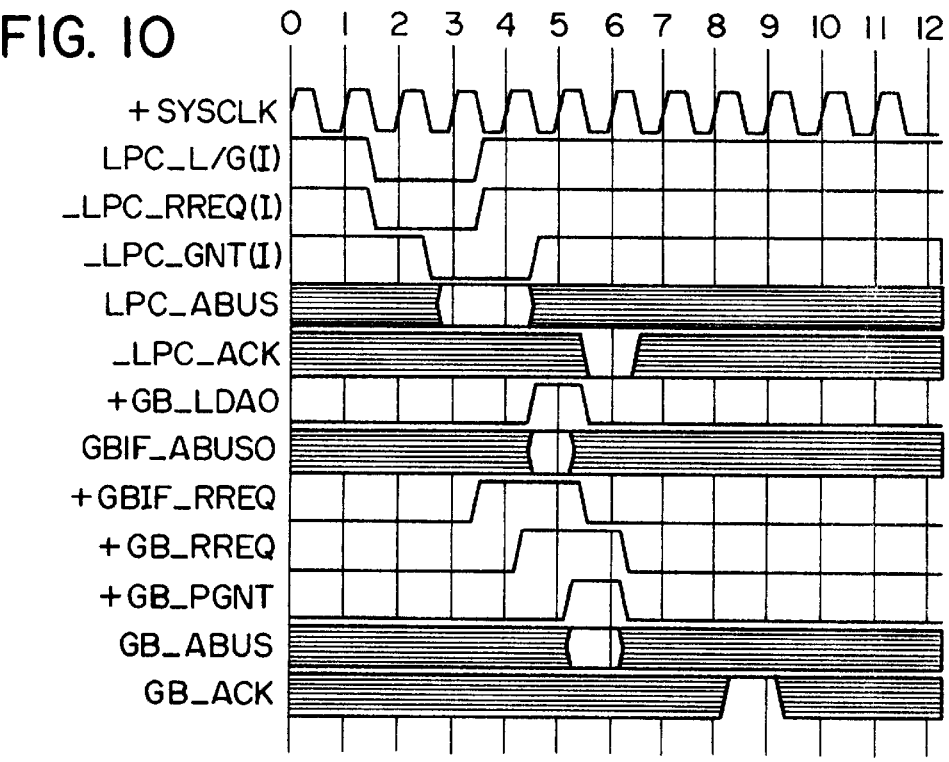
FIG. 10 is a timing diagram depicting local-to-global bus read timing.
Figure 11:
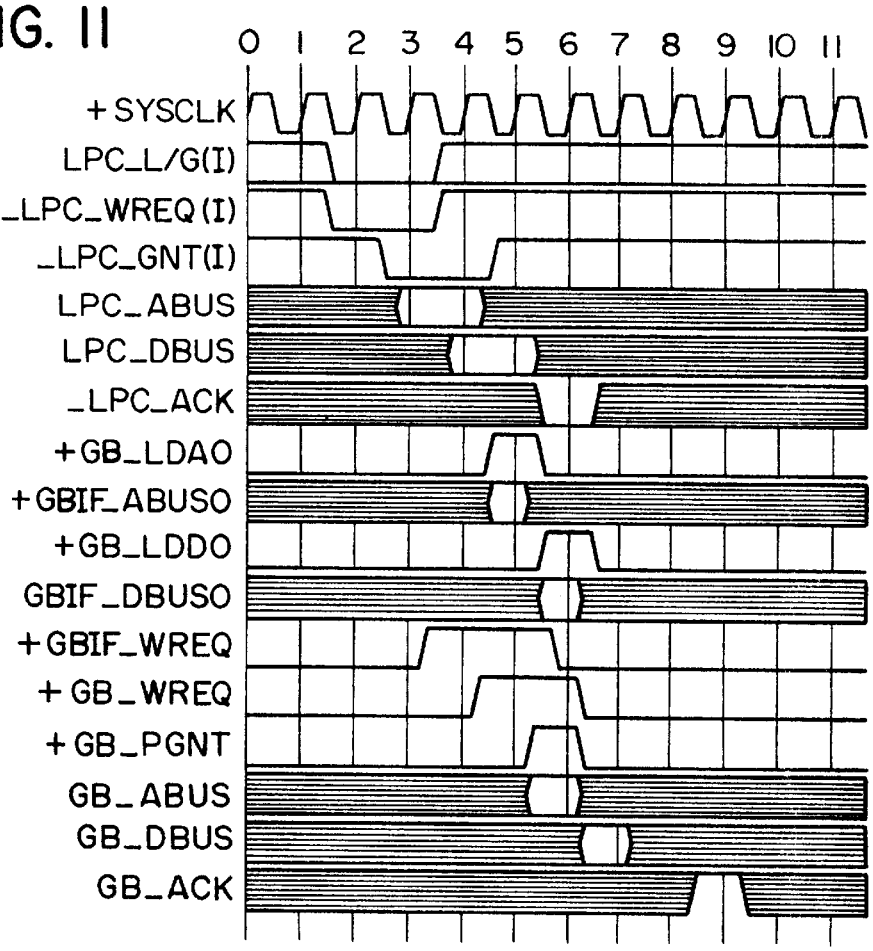
FIG. 11 is a timing diagram depicting local-to-global bus write timing.

The following describes the function of the UBIF 34 when employed on the four processor node SVS 10 processor card 22, the I/O Processor Card 28, or the console I/F card 30. FIG. 5 shows a block diagram of the SVS 10 Processor Card 22. The Processor Card 22 includes four identical processor nodes (P0–P3), each including the microprocessor 22*a*, 16 MB of local, private memory 22*b*, the interface 22*c* to the common LPC 32, and a processor bus interface device (PBIF 22*d*). PBIF 22*d* is coupled to a local processor node data bus 23*a* and also receives the processor address bus 23*b* and the control bus 23*c*. The PBIF 22*d* includes a number of registers, the operation of which will be discussed below. The PBIF 22*d* is described in detail in commonly assigned U.S. patent application Ser. No. 07/733,517, filed Jul. 22, 1991, entitled "A Processor Buffered Interface for Multiprocessor Systems" D. Foster et al. now U.S. Pat. No. 5,410,654.

The four processor nodes (P0–P3) share the UBIF 34 through the LPC bus 32. The UBIF 34 provides a common interface to the GB 24. All global read, write, and interprocessor interrupt requests pass through the common UBIF 34.

The sections below describe the functions provided by the UBIF 34 for the four node processor card. Reference is also made to FIGS. 27, 29, 31, 32 and 33 for showing in greater detail the circuitry depicted in the block diagrams of FIG. 3*a* and 4.

UBIF 34 Output Section

The UBIF 34 provides independent buffering for each of the four local processors 22*a*. The UBIF-A 34*a* (FIG. 3) output queue 42 provides buffering, for each of the four processor nodes, for up to eight processor read, write, or inter-processor interrupt (IPC) requests. The UBIF-A 34*a* (FIGS. 27 and 29) provides buffering for all address bus (ABUS) signals, including ATYPE, A(31:0), AP(3:0), LEN (3:0,) PID(7:0), PTAG(7:0), R/-W, LOCK and RMW. The UBIF-A 34*a* also buffers MID(7:0) (FIG. 31), and supplies all necessary bus control and handshaking signals on the LPC 32 and GB 24. The eight UBIF-D 34*b* modules (FIGS. 32 and 33) provide buffering for each of the four processor nodes, for data bus (DBUS) signals D(255:0), DP(31:0), BE(31:0), MTAG(7:0), ECCERR, ERRTYPE, and GBDPERR. Each UBIF-D 34*b* supports a 32-bit data slice, D(31:0), with associated parity, DP(3:0), byte enables BE(3:0), MTAG bit, ECCERR, ERRTYPE, and GBDPERR.

A unique processor identifier PID(7:0), is supplied by a requesting processor 22*a* to the UBIF 34. PID(7:0) is formed by concatenating HWID(5:0) with the local processor number, LPN(1:0). HWID(5:0) is formed by concatenating a unique UNITID(1:0) and CARDID(3:0), which are supplied to each card from the system backplane. A requesting processor 22*a* may also tag multiple outstanding read requests using PTAG(7:0), which is subsequently employed to reorder the reply data in that the reply data may return out-of-order. The UBIF 34 passes the supplied PID and PTAG, along with the remaining address bus signals, to the GB 24.

For the illustrated embodiment, each processor 22*a* may have only one outstanding read request (a limitation imposed by the processor and not by the UBIF 34), but may have multiple outstanding write requests. Each output queue 42 and 44 typically contains zero to some small number of Global Memory 26 write requests, followed by at most one Global Memory 26 read request. Once there is at least one pending r/w request in any of the output queues 42 and 44, the UBIF 34 output controller 78 requests the GB 24 to dispatch the buffered requests.

Local Bus Arbiter

The LPC 32 arbiter (LPC ARB) 76 supports up to four local devices requiring access to the LPC 32 for request or response cycles to other devices on the LPC 32 or the GB 24. On the processor card 22, the four processors 22*a* issue requests to the LPC 32 arbiter 76 for sending read/write (r/w) requests to the Global Memory 26 subsystem.

Normally, the UBIF 34 is the master of the LPC bus 32, and has the highest priority for regaining access to the LPC 32 Data Bus (LPC-D) for returning Global Memory 26 read data to a processor 22*a*. Thus, the UBIF 34 typically immediately returns read data to a processor 22*a*, but grants the LPC-D to a processor 22*a* to issue write data to a local I/O device or to the GB 24. The LPC 32 address bus (LPC-A) is driven only by local master devices, and not by the UBIF 34.

The LPC ARB 76 employs a round-robin arbitration technique to grant access to the LPC bus 32, but gives a top priority to the UBIF 34 when the UBIF 34 requires use of the LPC bus 32. As with the GB 24, the LPC-D and LPC-A buses are decoupled and pipelined, which implies that during any given LPC 32 cycle, the address bus may be used by a master device, while the data bus may be used by slave devices. Thus, the LPC ARB 76 may grant the LPC-A to a processor 22*a* to issue a read request while the UBIF 34 is returning global read data to another local processor 22*a* via the LPC-D.

The LPC ARB 76 also monitors the state of the UBIF 34 output queues 42 and 44 so as not to grant the LPC 32 to a processor 22*a* wishing to issue a GB 24 r/w cycle when the processor's output queue is full. The LPC ARB 76 grants the LPC 32 to a processor 22*a* to issue local r/w request cycles, even though the corresponding Global Bus output queue is full.

Output Queue Control

Each output queue 42 and 44 is controlled by an independent input stage controller and output stage controller. The input stage controller, embodied within the IFIFO_CNTRL 50*a*, awaits a processor 22*a* r/w request and enqueues the request onto its associated output queue. The LPC ARB 76 grants the LPC bus 32 to a requesting device only if there is an open entry in the corresponding output queue to store the request. The output stage controller arbitrates for the UBIF 34 outgoing bus whenever there is a pending request in its queue and waits, if necessary, for a GB 24 acknowledge before proceeding to process another pending request.

Given that an acknowledgement is required in response to a read or write request, multiple buffered write requests from any particular processor 22*a* are prevented from appearing on the GB 24 as consecutive cycles.

Output Dequeue Control

Each output queue 42 and 44 also has a corresponding dequeue controller embodied within the OFIFO_CNTRL 78, which is responsible for dequeueing processor 22*a* requests from the output queues 42 and 44 after the requests are successfully transferred to a destination device on the GB 24. A four way round-robin arbitration technique is employed to select which processor 22*a* queue is chosen for dispatch to the GB 24. Processor 22*a* r/w requests are dequeued after receiving a valid ACK signal from a destination device. Requests are also dequeued if no ACK/NAK signal is received from any destination device, thus indicating an unrecognized address. The processor 22*a* r/w request is retried so long as a valid NAK signal is received. However, processor 22*a* IPC interrupt cycles, destined for the local SVS 10 system unit (as determined by the state of LEN(2:1)) do not require ACK/NAK handshaking and are dequeued once transferred to the output register (OFOR). As will be described below, Interprocessor Communication (IPC) interrupt cycles that are destined for a remote SVS 10 system unit use the same ACK/NAK, retry, and abort mechanism as normal GB 24 processor 22*a* request cycles.

Output Bypass Path

A bypass path is provided in the UBIF 34 output to allow processor 22*a* r/w requests to flow directly from the LPC 32 to the GB 24, passing only through the OFBRs 54*a*, 54*b* and the TTL/ECL registered transceiver 34*c*. This bypass path is enabled when the corresponding output queue 42 or 44 is empty, for the given processor 22*a*, and when there are no pending requests in any other processor's output queue which are also waiting for access to the GB 24. It is noted that there may be other processor 22*a* requests in the output queues 42 and 44 pending an ACK/NAK indication. However, these other requests may not be waiting for access to the GB 24, thus enabling the use of bypass path for the given processor 22*a*. However, the bypass path cannot be used by a processor 22*a* having any pending request in its output queue, in order to preserve sequential order. Also, all processor 22*a* requests are stored in their corresponding output queue pending an ACK/NAK indication, since a NAK indication implies a retry. Thus all processor 22*a* r/w requests are stored in their corresponding output queues 42 and 44 until successfully accepted by the destination device, or until aborted due to an error condition (i.e., a bus timeout or unrecognized GB 24 address).

Global Bus Parity Protection

Parity protection is used on the GB 24 address bus, A(31:0), and data bus, D(255:0). The UBIF 34 output stage generates data parity with ECC/P 66 when driving the GB 24, while the UBIF 34 input stage checks data parity with P/ECC 70 when receiving from the GB 24. GB_APERR is issued by the UBIF-A 34*a* upon detecting bad parity on A(31:0), as compared to the received address parity bits AP(3:0). GB_DPERR is issued by the UBIF-D 34*b* modules upon detecting bad parity on D(255:0), as compared to the received data parity bits, DP(31:0). These GB 24 parity error signals are monitored by the console processor interface. During Global Memory 26 reply cycles, LPC_GBPERR is returned to the requesting processor 22a, along with the read data, and reflects the parity status of the data received from the GB 24.

Global Bus 24 Retry Timing

Figure 14:
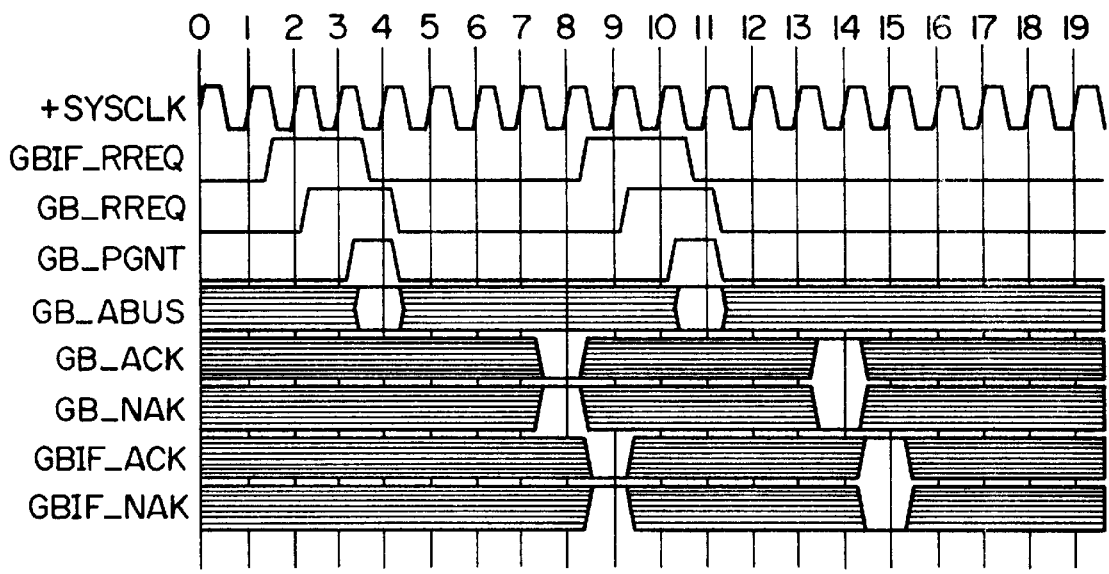
FIG. 14 is a timing diagram depicting global bus retry timing.

FIG. 14 illustrates a typical read-retry timing sequence on the GB 24, as viewed by the requesting UBIF 34. As shown, the maximum bus retry frequency per processor is seven cycles (or 182 MB/second assuming 40 MHz). Also shown is the maximum data rate at which back-to-back requests from a single processor 22a may be output to the GB 24, which is eight cycles (or 160 MB/second assuming 40 Mhz). The extra cycle, as compared with the retry timing, is a result of dequeuing the previous request and accessing the next processor 22a request in the output queue. The UBIF 34 advances the dequeue pointer after receiving an ACK or bus timeout indication.

Mixed Mode Processor Requests

Figure 15:
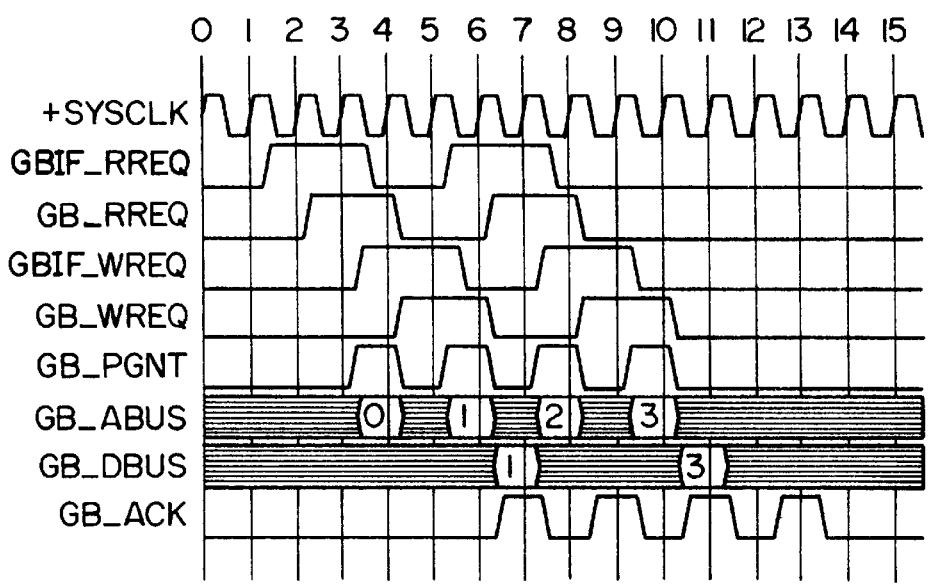
FIG. 15 is a timing diagram depicting global bus mixed mode timing.

FIG. 15 illustrates a timing sequence on the GB 24 bus for issuing back-to-back, mixed mode processor 22a request cycles from a single UBIF 34. In this timing sequence, it is assumed that the UBIF 34 has one (or more) processor 22a request(s) from each of the four local processors 22a and that the UBIF 34 is given immediate access to the GB 24. As shown on this timing diagram, a read-request is issued for a first processor 22a (P0), followed by a write request from P1, a read request from P2, and a write request from P3. Should any of the issued processor 22a requests be NAKed, the UBIF 34 re-issues the appropriate request.

IPC Interrupt Support

Inter-processor interrupt cycles are supported though the use of IPC-specific LPC bus 32 and GB 24 cycles. From the point of view of the UBIF 34 output section, processor 22a r/w cycles and IPC interrupt cycles are indistinguishable. A processor 22a node generates an IPC interrupt cycle by requesting the local processor card 22 address bus (i.e., issuing LPC_RREQ(i) with LPC_L/-G(i)=0) and tagging the ABUS type as an IPC interrupt cycle. For IPC interrupt cycles, LPC LPC_ATYPE=0,LPC_A(31:0) specifies a processor 22a select mask, and LPC_LEN(3:0) specifies a processor 22a group select. LPC_R/-W, LPC_LOCK, and LPC_RMW are not defined for the IPC interrupt cycle. The UBIF 34 enqueues IPC interrupt cycles as normal processor 22a r/w request cycles. The UBIF 34 input section, however, decodes and interprets IPC interrupt cycles differently from normal processor 22a r/w request cycles.

Processor IPC interrupt cycles destined for the local SVS 10 system unit (as determined by LEN(2:1)=00) do not require ACK/NAK handshaking and are dequeued once transferred to the UBIF 34 output register 32c. However, IPC interrupt cycles destined for a remote SVS 10 system unit use the same ACK/NAK, retry, and abort mechanism as do other GB 24 processor 22a request cycles.

UBIF 34 Input Section

The UBIF 34 input section (FIGS. 31 and 33) on the four node processor 22a card is employed to buffer reply data returned by the Global Memory 26 subsystem. The UBIF 34 input section monitors the GB 24 on a cycle-by-cycle basis whenever it has any pending read requests for any of the four associated local master devices. Thus, given any pending global read cycle, the input queue input registers, IFIR 56a and 56b, respectively, sample the GB 24 D-bus on every cycle and conditionally store the registered data into the appropriate input queues whenever a match occurs. Decoding is performed by matching the most significant memory identifier bits, MID(7:2) with the UBIF's hardware ID, HWID(5:0), which is formed from UNITID(1:0) and CARDID(3:0), and then employing MID(1:0) to select the local node.

Global Bus Data Parity Checking

As was stated, the UBIF 34 input section computes parity for the data received D(255:0) and compares the computed parity, with the received data bus parity DP(31:0), for errors. Each UBIF-D 34b checks the validity of its corresponding 32-bit data slice and generates a data parity status signal, GBDPERR, on every GB 24 cycle. The eight GB 24 data parity error lines, GBDPERR(7:0) are ORed together to form a composite GB_DPERR signal which is driven to the system backplane for error reporting. The eight UBIF-D 34b modules also return their corresponding GBDPERR signal along with the reply data during LPC 32 bus reply cycles, which are ORed together to produce the composite LPC_GBDPERR signal. This composite data parity status signal is employed to generate an interrupt to the processor 22a accepting the returned data.

UBIF 34 Input Bypass Path

The UBIF 34 input bypass (IFBR 58a and 58b) enables Global Memory 26 reply cycles to bypass the input queue 46 for a particular processor 22a whenever the processor's corresponding input queue is empty and the LPC bus 32 is available to the UBIF 34. Otherwise, reply data is enqueued into the corresponding processor 22a input queue 46 for subsequent transfer over the LPC 32 bus.

Reply Cycle ACK/NAK handshaking

It should be noted that there is no ACK/NAK handshaking involved for GB 24 or LPC 32 bus reply cycles, in that it is assumed that the requesting processor 22a may always accept read data once the processor 22a asserts the LPC bus 32 ready line, LPC_RDY(i).

Input Queue Control

Each UBIF 34 input queues 46 and 50 are independently controlled by an input stage controller and an output stage controller. The input stage controller monitors the GB 24 for valid memory reply cycles which match a corresponding hardware ID. A match occurs when a valid GB_MID(7:2), conditioned by GB_DCYCLE, equals HWID(5:0), while the least significant two MID bits, GB_MID(1:0), select one of the four processor 22a input queues 46. Assuming that the input bypass path is enabled and no other replies exist in the processor's input queue, a valid GB 24 reply is passed on to the LPC 32 bus. Otherwise, the input stage controller enqueues the received reply into the corresponding input queues 46 and 50 for subsequent transfer to the LPC 32 bus. The result of the received data parity error status is also returned along with the reply data. The UBIF-D 34b modules buffer D(255:0), MISC, ECCERR, and ERRTYPE, while the UBIF-A 34a buffers MID(7:0). All UBIF 34 modules independently monitor the GB 24 data bus signals, GB_DCYCLE,GB_MID(7:0), and their corresponding reply bits and perform the same control functions in parallel.

The output stage controller is responsible for returning enqueued reply cycles to the local devices. Given any enqueued reply, the output stage controller arbitrates for the LPC bus 32, if necessary, and returns memory replies to processors 22a that are ready, as indicated by ILPC_RDY (i). A round-robin arbitration technique is used to issue replies to each local device whenever multiple input queues contain data. The UBIF 34 has a highest priority for the LPC 32 data bus.

Typical Processor 22a R/W Timing Sequences

FIGS. 6–13 illustrate processor 22a read and write timing sequences on the LPC 32, UBIF 34 output bus, and GB 24.

Figure 12:
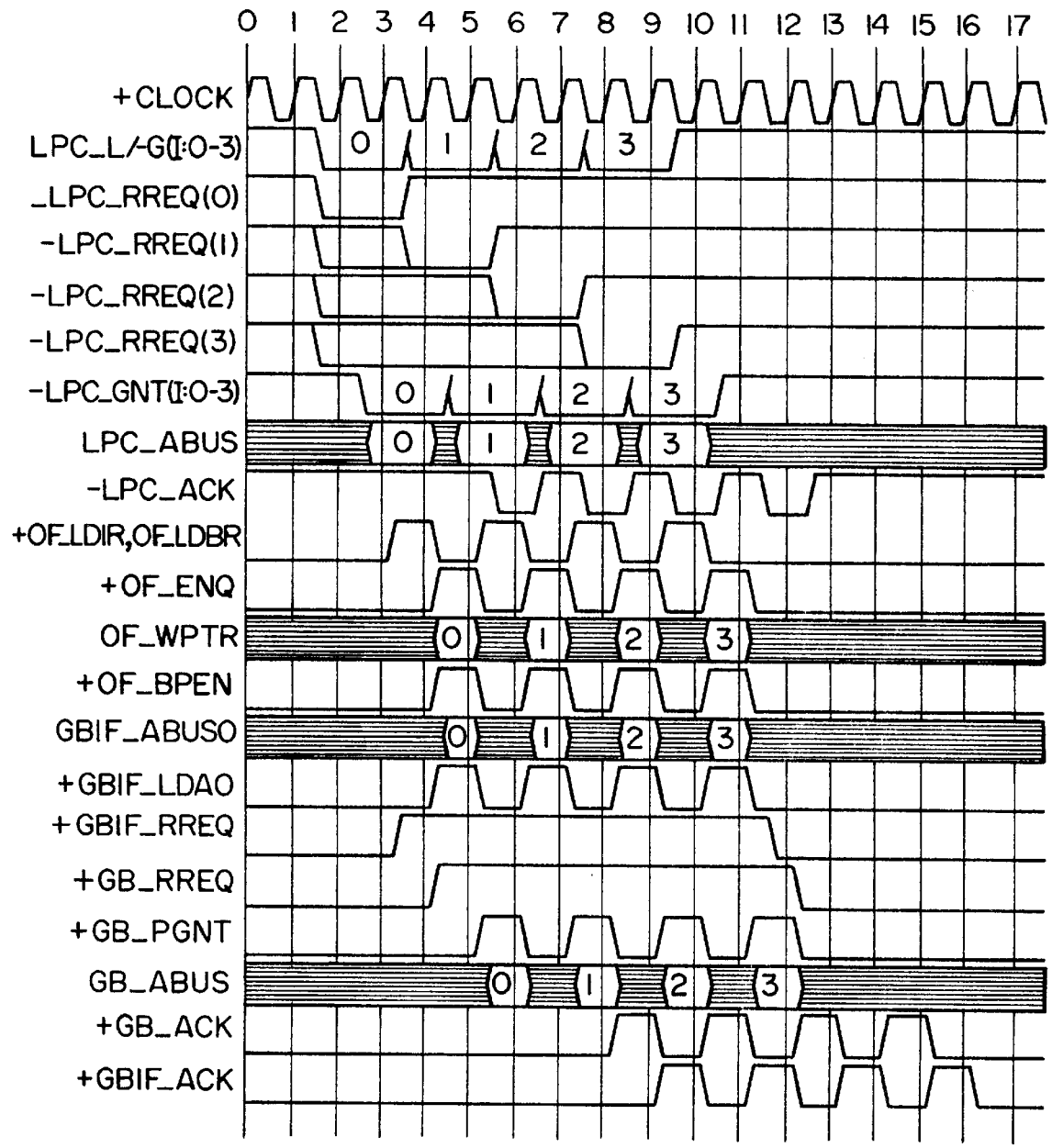
FIG. 12 is a timing diagram depicting a four processor local-to-global bus read timing.
Figure 13:
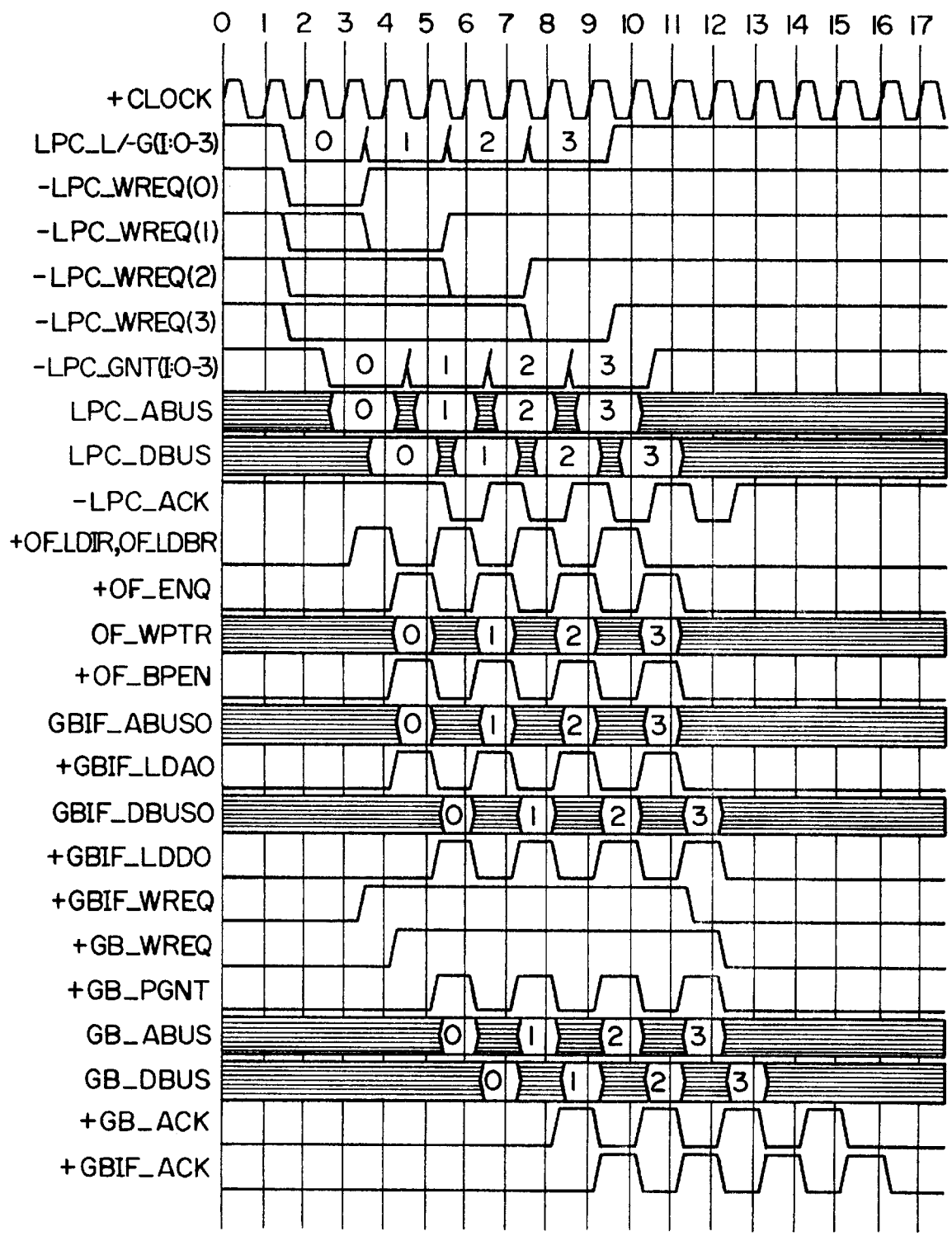
FIG. 13 is a timing diagram depicting a four processor local-to-global bus write timing.
Figure 34:
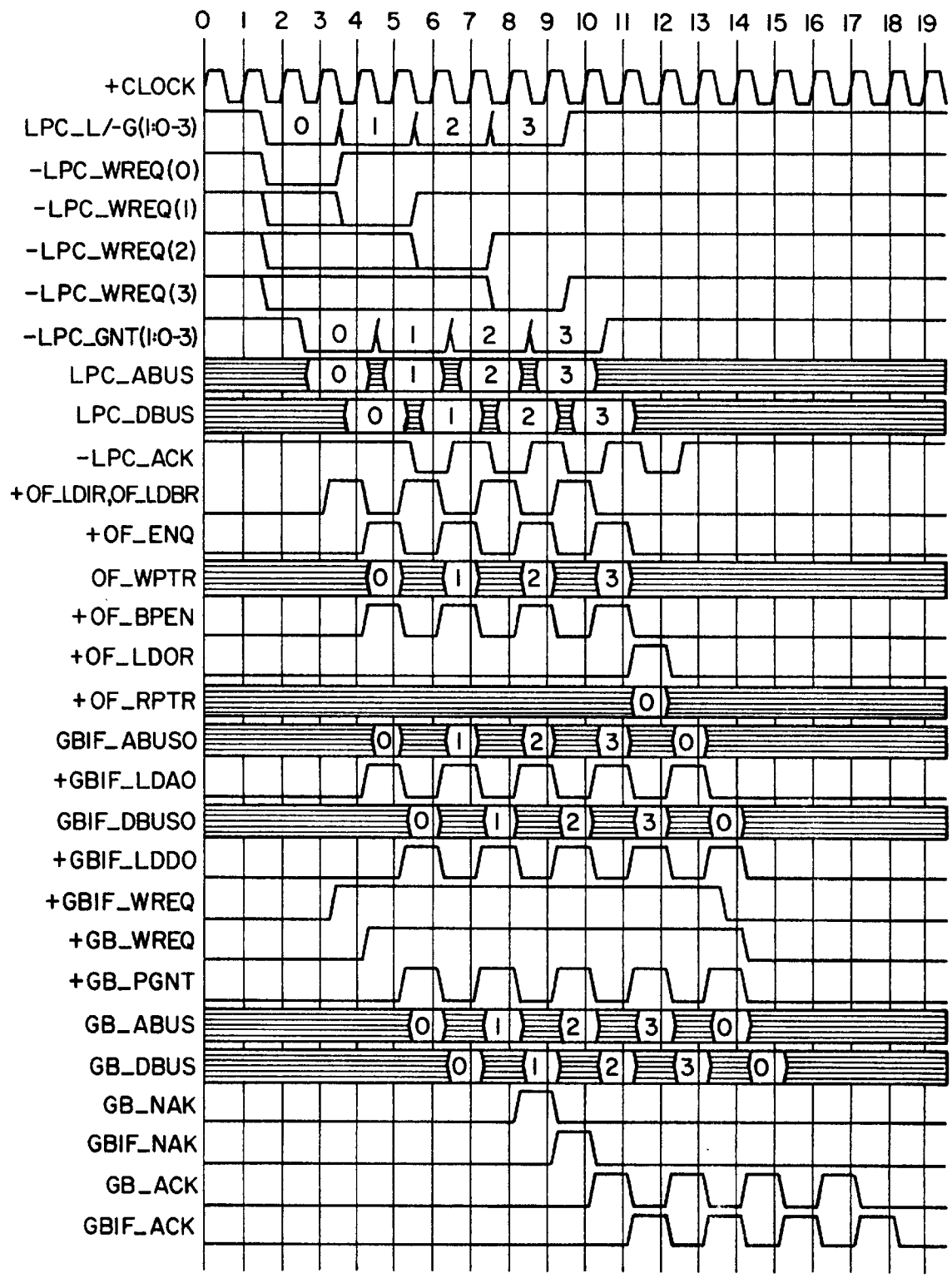
FIG. 34 is a timing diagram that shows a bus no acknowledgement (NAK) condition and a subsequent retry.

The timing sequences shown in FIG. 12 and FIG. 13 assume that all four local processors 22a issue simultaneous (or consecutive) Global Memory 26 requests on the LPC 32 and that all UBIF 34 processor 22a output queues are empty. The priority order for granting the local bus assumes that processor (0) has highest priority at the start of the timing sequence (i.e. at bus cycle 2). Furthermore, the GB 24 arbitration timing assumes that no other UBIF 34 is attempting to use the GB 24, thus the local UBIF 34 is given exclusive access to the GB 24. As illustrated by the timing diagrams, each processor 22a is given access to the LPC 32 in priority order so as to issue their corresponding Global Memory 26 request. Since all internal queues are assumed for this example to be empty at the start of the sequence, and given that no other UBIF 34 is simultaneously requesting the GB 24, all processor 22a r/w requests pass through the UBIF 34 in a single cycle (through OFBR 54a and 54b) and are latched into the external UBIF 34 TTL/ECL output registers 34C for transfer over the GB 24. Each processor's r/w request is also stored in its corresponding output queue 42 and 44, pending the receipt of an acknowledge (i.e. ACK) from the destination device. In the event of no acknowledge (i.e., NAK as in FIG. 34) the UBIF 34 output stage retries the cycle. Thus, all processor 22a r/w requests are stored in their corresponding output queues 42 and 44 until successfully accepted by the destination device, or aborted due to an error condition (i.e., a bus timeout or unrecognized GB 24 address).

Figure 35:
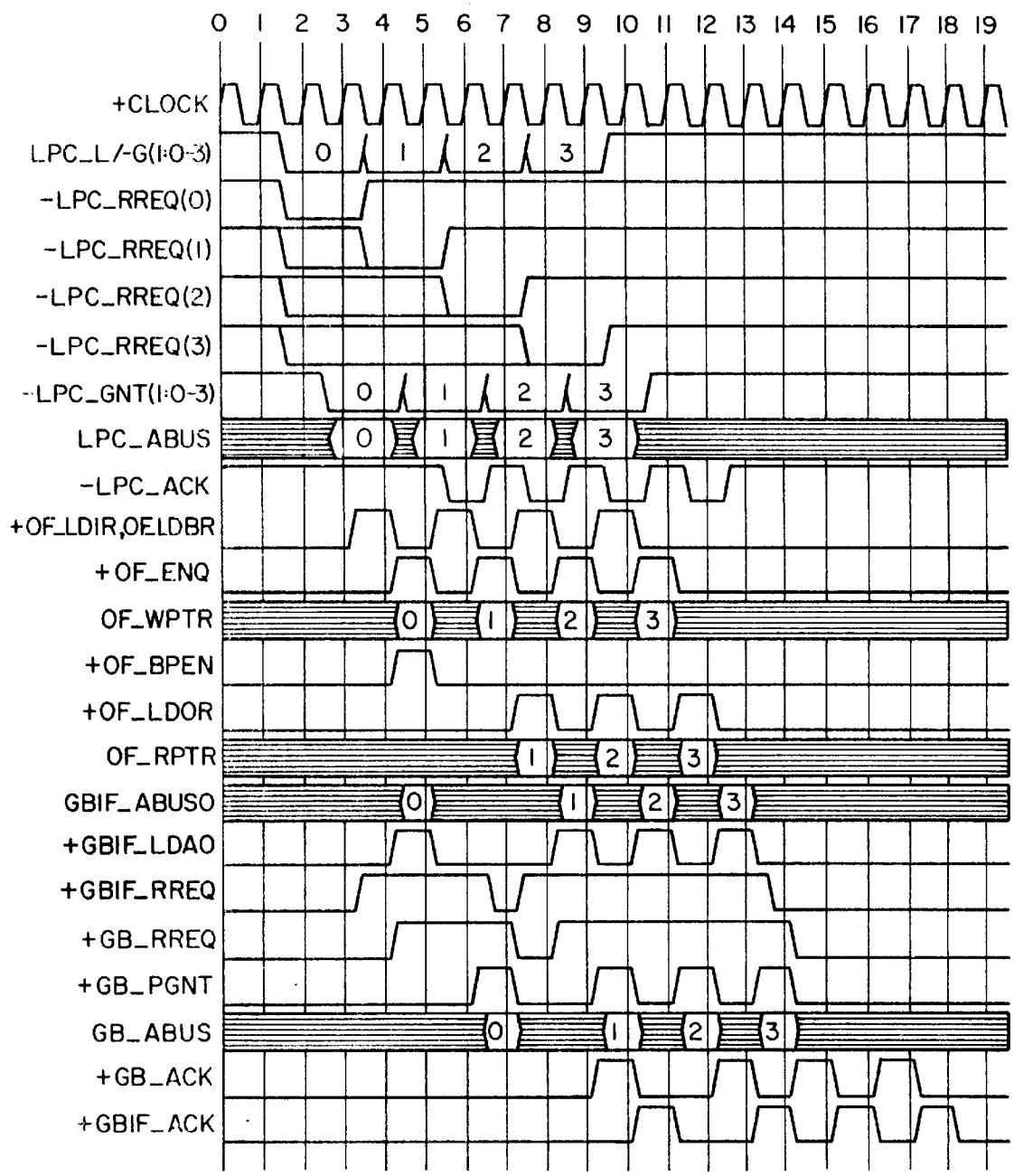
FIG. 35 is a timing diagram that illustrates a condition wherein a global bus grant is delayed.

FIG. 35 illustrates a condition in which the GB_PGNT is delayed, thus causing the first request to use the output bypass path, while the three subsequent requests come from the output queues.

Figure 20:
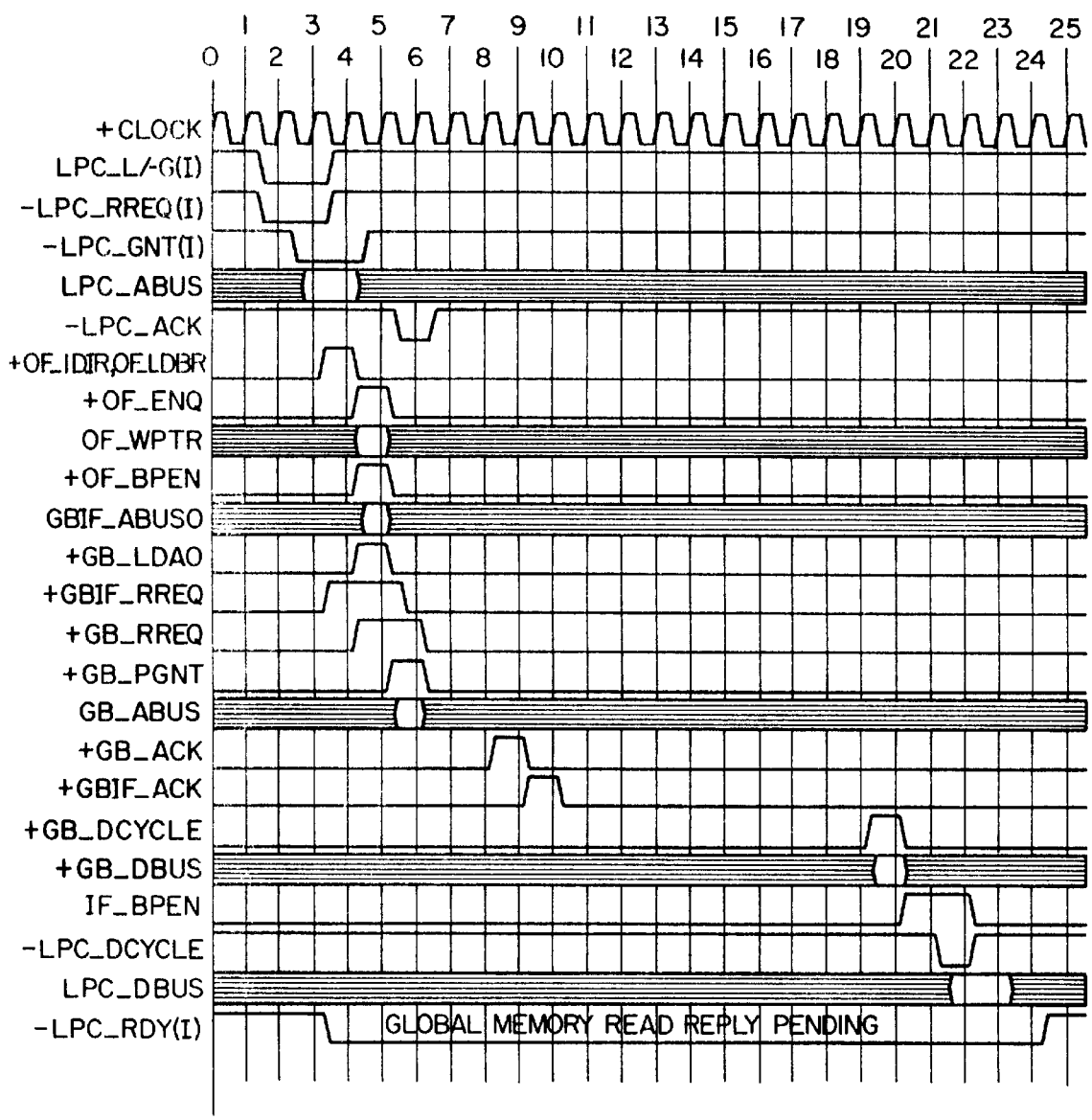
FIG. 20 is a timing diagram that illustrates a single global memory read cycle issued by a processor node.

FIG. 20 illustrates a single global memory read cycle issued by a processor node. The read request is immediately acknowledged, passes through the output bypass path on the processor UBIF 34 and appears on the GB 24 on cycle 5. The time between the read request on the GB 24 and the subsequent read reply cycle on cycle 19 is the global memory read cycle time (14 cycles). The GB 24 reply cycle then passes through the input bypass path and appears on the LPC bus on cycle 21 and 22.

Figure 36:
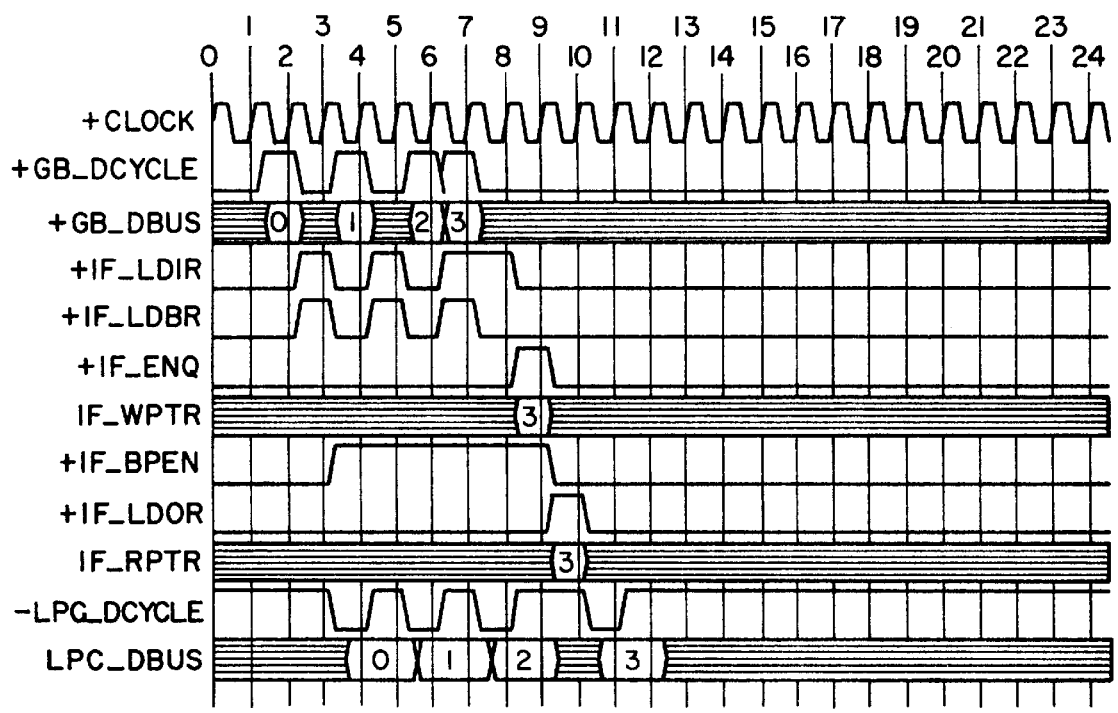
FIG. 36 is a timing diagram that illustrates four global memory reply cycles destined to four processor nodes on one processor card.

FIG. 36 illustrates four global memory reply cycles destined to four processor nodes on one processor card. The first three reply cycles (0, 1, 2) use the input bypass path, while the fourth uses the input queue, given that it appeared at the UBIF input while the input bypass register was busy.

Block Read Support

Figure 16:
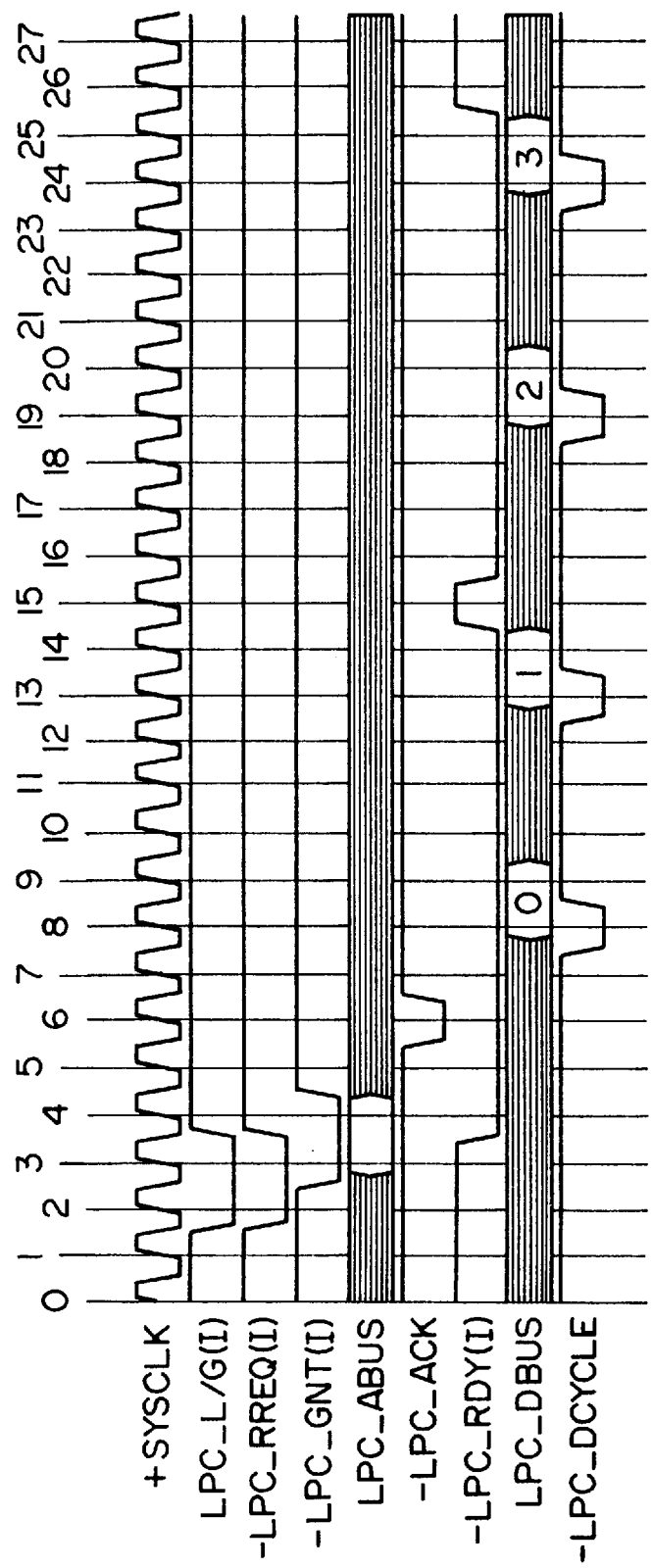
FIG. 16 is a timing diagram depicting local bus block read timing.

The UBIF 34 provides buffering and data flow control for supporting block read cycles. Processors or I/O interfaces, such as the HIPPI transmitter on the I/O processor card 28, employ block read cycles to transfer contiguous blocks of data from Global Memory 26. While these devices typically accept a single 256-bit word at a time, the UBIF 34 accepts back-to-back GB 24 reply cycles from the Global Memory 26 subsystem and buffers up to eight 256 bit words per local device. The return of data to a requesting device is controlled by the corresponding LPC bus 32 ready line, LPC_RDY(i). FIG. 16 illustrates the timing sequence on the LPC bus 32 for a block read cycle, assuming a block length of four (i.e., LPC_LEN(3:0)=2.) The timing sequence shown illustrates an example wherein the local device is able to accept two words at the maximum block read data rate, then removes LPC_RDY(i) for one cycle before accepting the next two words. It is noted that the maximum block read data bandwidth per processor is 256 MB/second, assuming 40 MHz operation and no bus contention.

Inter-Processor Communication (IPC) Support

As was noted above, the SVS 10 includes a direct inter-processor communication (IPC) mechanism, which allows processors 22a to send interrupts to a single processor 22a, or to a set of processors 22a. This IPC mechanism is supported in hardware, both in the processor 22a node and UBIF 34, and is implemented using a special bus cycle, on the GB 24 and Local Bus 32, which is tagged as an interrupt message cycle. In this regard reference is made to the definition of the ATYPE signal in the GB 24 signal definition of Appendix A. The IPC interrupt detection mechanism is implemented externally to the UBIF 34.

Figure 17:
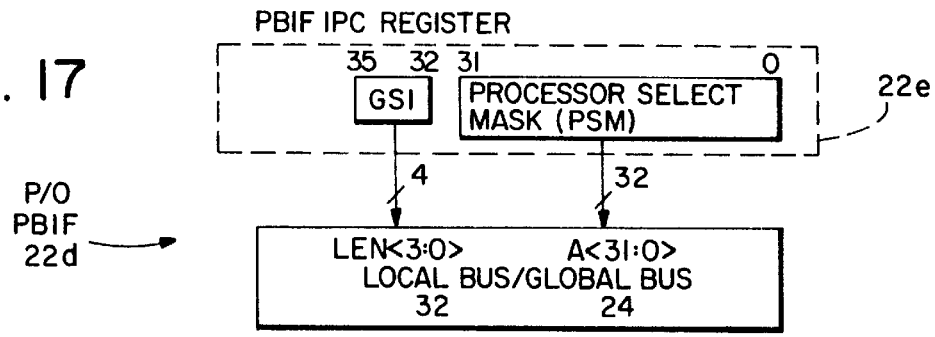
FIG. 17 shows an Interprocessor Communication (IPC) interrupt message format and circuitry.

FIG. 17 illustrates the composition of an interrupt message packet, as generated by a processor 22a node. The PBIF 22d includes a 40-bit r/w IPC register (IPCR) 22e, comprised of a four bit group select identifier (GSI), and a 32-bit processor select mask (PSM). The four bit group select field specifies a SVS 10 system unit (one of four) and processor set (i.e., computation processors 22a or I/O processors 28a) as the destination group for the interrupt message. The 32-bit PSM field specifies which processor(s) within the selected processor group are to receive the interrupt. A value of one in bit position (i) of the PSM field enables processor (i) to receive the interrupt. Thus, any system processor 22a is enabled to transmit an interrupt to any other processor or set of processors within a selected group by issuing a single IPC interrupt message cycle. The selected group may be the 32 computational processors 22a, I/O processors 28a, or the console processor within the local SVS 10 system unit or remote system unit, assuming a multi-unit configuration.

In accordance with an aspect of the invention interrupt message cycles appear as special address cycles on the LPC 32 bus and GB 24, as indicated by LB_ATYPE=0 and GB_ATYPE=0, respectively, where LEN(3:0) and A(31:0) specify the group select identifier and processor select mask, respectively. An interrupt message cycle is initiated by writing the required value to the IPC register (IPCR) 22e in the PBIF 22d (FIG. 5) and then writing any value to a Send Interrupt Register (SIR) 22f. The PBIF 22d issues an IPC interrupt cycle on the LPC 32 bus, using the current value in the IPCR 22e, which enqueues the interrupt message cycle in the UBIF-A 34a output request queues 42 and 44. The UBIF-A 34a subsequently issues a corresponding IPC interrupt cycle on the GB 24.

The PBIF 22d and UBIF-A 34a issue normal read requests to the LPC bus 32 and LPC ARB 76, respectively, to issue IPC interrupt cycles. IPC interrupt cycles destined for the local SVS 10 system unit, as determined by LEN (2:1), require no ACK/NAK handshaking and are dequeued after they are transferred to the GB 24 TTL/ECL register 34c. IPC interrupt cycles destined for a remote SVS 10 system unit use the identical ACK/NAK, retry, and abort mechanism as normal GB 24 processor 22a request cycles.

Figure 18:
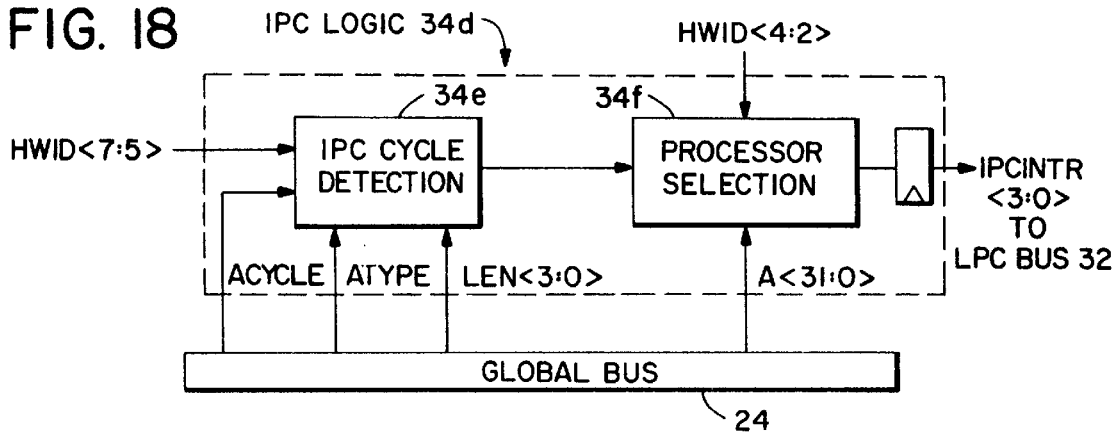
FIG. 18 is a block diagram also illustrating IPC logic.

As illustrated in FIG. 18 the IPC logic 34d of each UBIF 34 monitors the GB 24 address bus, on a cycle-by-cycle basis, for the occurrence of an interrupt message cycle, as indicated by GB_ATYPE=0. Cycle detection logic 34e, upon detecting a valid IPC cycle, causes Processor Selection logic 34f to compare the specified four bit group select identifier with the corresponding hardware identifier, HWID (4:3), to determine if it has been selected to receive an interrupt. If selected, the UBIF 34 uses HWID(2:0) to select the appropriate four bit field within the processor select mask corresponding to its local processors and issues a one-clock cycle interrupt signal, LPC_IPCINTR(3:0), to the selected local processor(s). A summary of the interrupt selection mechanism is provided below and illustrated in FIG. 18.

The state of GSI(3) selects computation processors 22a or I/O processors 28a. This field is compared with HWID(5).

GSI(2:1) selects the destination SVS 10 system unit. This field is compared with HWID(7:6). HWID(4:2) is employed to select one of the eight, four bit fields within the processor select mask field. IPCINTR(3:0) are the select processor interrupt signals, each of which is coupled to an interrupt input of an associated one of the processors 22a or 28a.

The PBIF 22d uses the interrupt signal, LPC_IPCINTR (i), to set an internal IPC interrupt bit in a processor interrupt register (PIR) 22g which causes a processor interrupt, if the processor has interrupts enabled. After the interrupt is serviced, software executed by the interrupted processor resets the IPC interrupt bit by writing a one to the corresponding bit in a clear interrupt register (CIR)22h.

I/O Processor Card 28 Support

Figure 19:
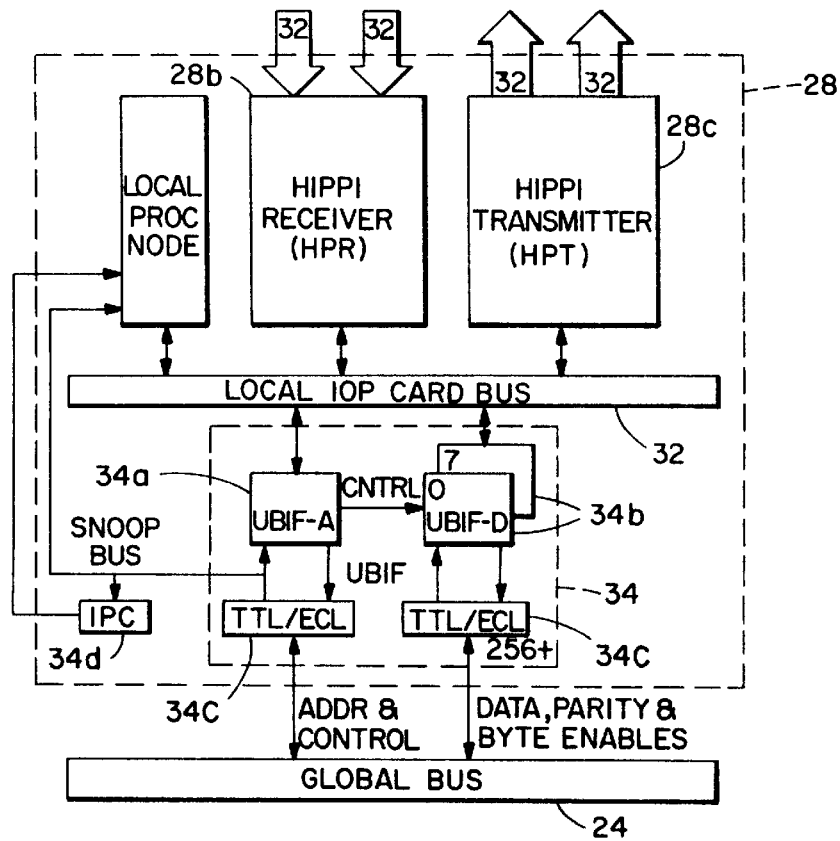
FIG. 19 is a block diagram illustrating an I/O processor card.

FIG. 19 is a block diagram of a SVS 10 I/O Processor Card 28. The I/O processor card 28 includes a processor node P0, which is identical to one of the nodes on the Processor Card 22, two HIPPI receivers 28b and two HIPPI transmitters 28c, each of which implement 100 MB/second unidirectional channels. The section 28c includes two HIPPI transmitters, whereas the HPR section 28b includes two HIPPI receiver channels. Within the HPT 28c and HPR 28d the two channels are operated independently to provide two, 100 MB/second channel. The operation of the I/O Processor Card is described in commonly assigned U.S. patent application Ser. No. 07/734,359, filed Jul. 22, 1991, entitled "High Performance I/O Processor", R. Pearson now U.S. Pat. No. 5,276,684.

Figure 21:
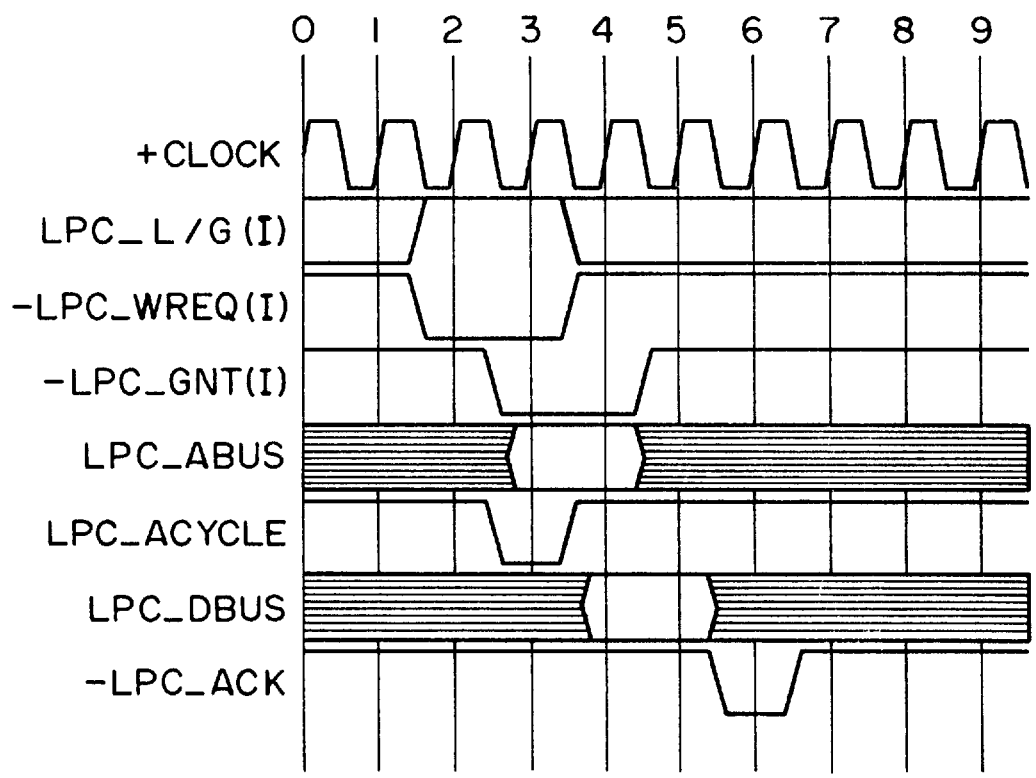
FIG. 21 is a timing diagram depicting local bus write request timing.

As with the processor card 22, the UBIF 34 of the I/O processor card 28 provides a shared interface to the GB 24. The functions provided by the UBIF 34 are identical to those described above, with the addition of support for local LPC 32 cycles between the processor node 28a and the HIPPI interfaces 28c and 28d. Using the LPC_L/-G(3:0) control lines, the local processor node 28a may request the LPC bus 32 to perform a GB 24 cycle, in which case the UBIF 34 buffers the request and performs the necessary handshaking on the GB 24. The processor node 28a may also request the local LPC bus 32 to perform a LPC bus cycle, in which case the UBIF 34 provides arbitration control for the I,PC 32 bus. Local cycles thus are issued by the local processor node (P0) and are accepted or rejected by the HIPPI interfaces 28b and 28c. The HIPPI interfaces 28b and 28c may also request the LPC bus 32 to return read data in response to a Local Processor read request. FIG. 21 illustrates the timing sequence on the LPC bus 32 for a local write request cycle. As shown, the difference between a global bus 24 request and a local bus 32 request is the value of the LPC_L/-G (1 for local, 0 for global) during LPC_RREQ or LPC_WREQ cycles.

Global Memory Card 26 Support

FIG. 3b illustrates the configuration of the UBIF-A 34a when used in conjunction with the Global Memory Card 26. Reference is also made to FIG. 26b and to the block diagrams shown in FIGS. 28, 30, 32 and 33.

Figure 22:
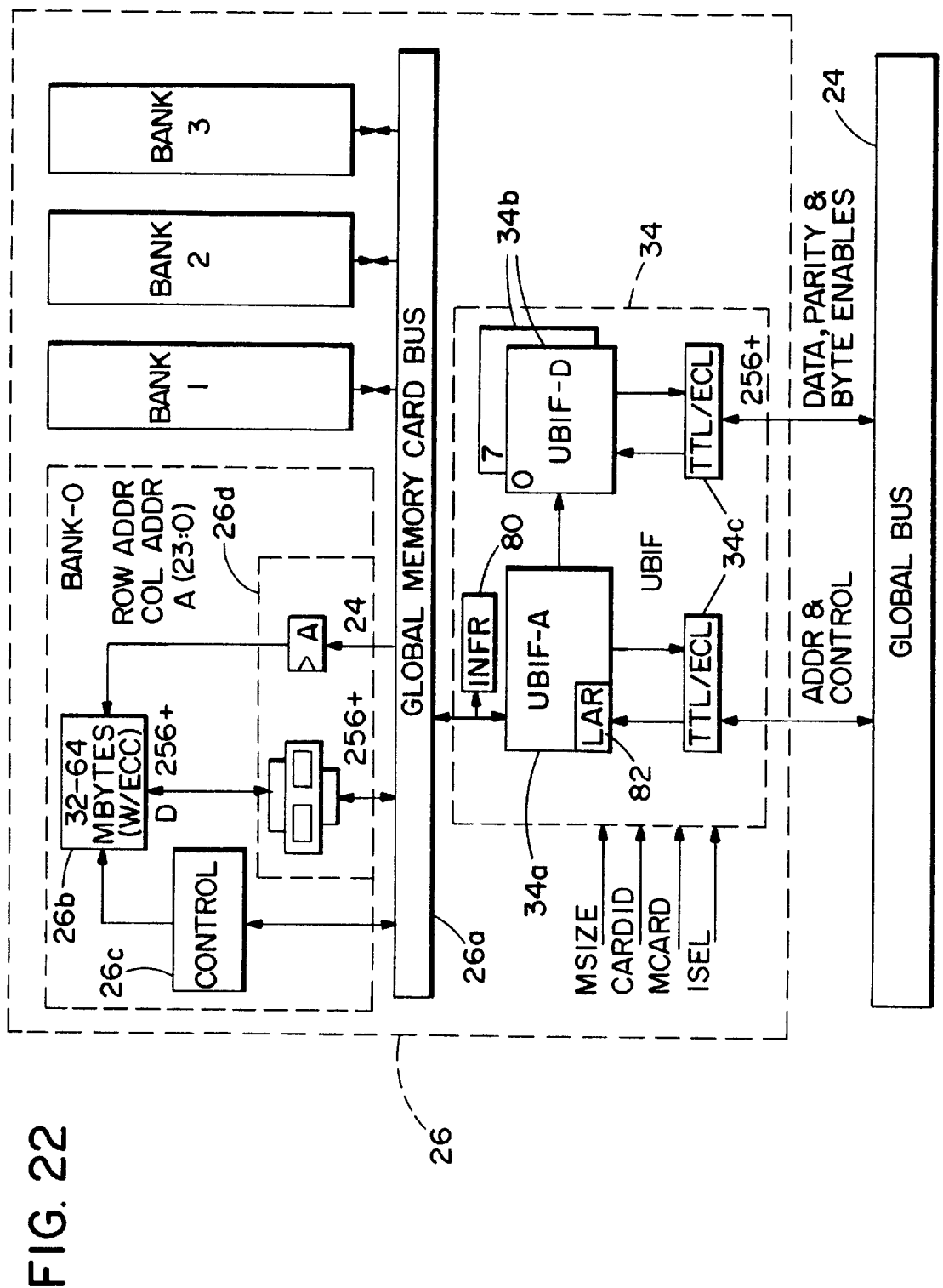
FIG. 22 illustrates a Global Memory card architecture.
Figure 23:
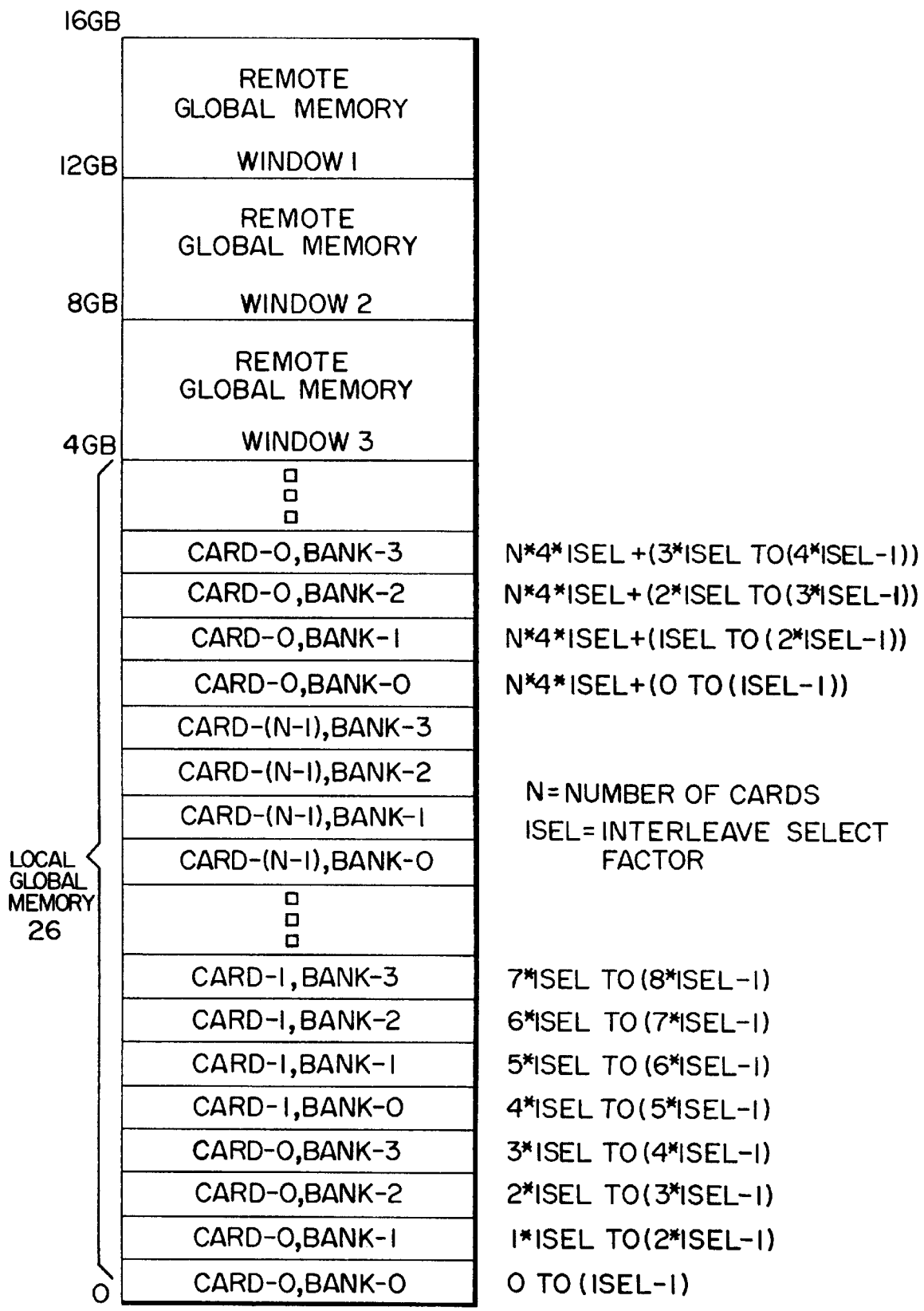
FIG. 23 shows a global bus address map.

FIG. 22 shows a block diagram of the SVS 10 Global Memory Card 26. The Global Memory Card 26 includes the four independent Memory Banks, (B0–B3) each having an array 26b of 32 MB or 64 MB of dynamic random access memory (DRAM), plus 8 MB or 16 MB of ECC memory, respectively. Each Memory Bank includes a memory array 26b, a memory controller 26c, and an interface 26d to the common Global Memory Card (GMC) bus 26a. All four banks share the common UBIF 34 for attaching to the GB 24.

Additional features provided in the UBIF 34 to support the SVS 10 Global Memory 26 include memory bank scheduling, address interleaving, memory size options, error detection and correction, and exception handling.

The UBIF 34 performs the following functions when installed on the Global Memory Card 26.

Global memory bank scheduling: The UBIF 34 input section is responsible for high-level scheduling of the four Memory Banks (B0–B3). All global read and write requests are enqueued into the corresponding memory bank queues 42, 44, and 46 for processing, each of the four eight-deep queues being associated with one of the memory banks. The input bypass path is not used when the UBIF 34 is operated on the Global Memory 26. The UBIF-A 34a uses signals GMC_RDY(3:0) and GMC_LDMAR(3:0) (Appendix C) to sequence the Global Memory banks. GMC_RDY(i) informs the UBIF-A 34a if Global Memory bank(i) is ready to accept a new request. GMC_LDMAR(i) is generated by the UBIF-A 34a to schedule a Global Memory bank operation. The memory banks (B0–B3) employ GMC_WREQ (3:0) and GMC_PGNT(3:0) to arbitrate for the data bus of the Global Memory card bus 26a to return read data.

ECC generation/correction: The UBIF-D 34b modules generate eight bit ECC codes, using P/ECC 70, for each 32-bit data slice written to Global Memory 26. The eight bit ECC is stored along with the data for subsequent error detection/checking during read operations. During read operations, the supplied eight bit ECC is used to correct, with EDC 68, single bit errors and to detect double bit errors in the supplied memory data. The UBIF 34 provides this ECC status information (ECC ERR and ERR TYPE) along with the returned data to the GB 24.

Global bus address remapping (AMAP 57): This function of the UBIF 34 involves reorganizing a given global memory address based on a number of Global Memory cards 26 installed in the system, as specified by MCARD (3:0), and by the memory interleave factor, ISEL(3:0). The UBIF 34 generates a 24-bit "flat" address to the Global Memory banks, where A(9:0) specifies the column address (CAS) and A(19:10) specifies the row address (RAS). When using 4-Mbit DRAM devices A(21:20) select the rank and side, and A(23:22) are not used. When using 16-Mbit DRAM devices (10 CAS lines, 12 RAS lines), A(21:20) are a portion of the 12-bit row address and A(23:22) select the rank and side.

In accordance with an aspect of the invention, partial writes to Global Memory 26 are accomplished by performing a decoupled read-modify-write cycle. When a partial write cycle is received by the UBIF 34, as indicated by the RMW signal, the UBIF 34 performs a read-modify-write cycle to the Global Memory 26. UBIF 34 first issues a read cycle, merges the DRAM data with the GB 24 data using the provided byte enables, recomputes ECC, and writes the data back to the selected memory bank. Upon detecting an uncorrectable ECC error in the memory data, with any byte enable disabled, the UBIF-D 34b modules write back an ECC of all ones, which is detected upon a subsequent read as an uncorrectable ECC error.

ACK/NAK reply: Given a valid card address, as determined by the supplied GB 24 address and the values of MCARD(3:0) and ISEL(2:0), the UBIF 34 input section generates either ACK or NAK based on the state of the input queue 46 of the destination Global Memory 26 bank.

Address and data parity error detection: The UBIF 34 checks the validity of the received global address A(31:0), and the data D(255:0), whenever it accepts a valid read or write request. on input from the ECL/TTL registered transceivers 34c, the UBIF 34 computes parity on the given address/data and compares this with the supplied parity. The UBIF-A 34a reports bad address parity on GBAPERR on the clock cycle following the address being clocked into the input queue input register, IFIR 56a. This line is then registered externally and drives the shared GB_APERR signal, which is monitored by the console 14 for error reporting. For Global Memory 26 writes, each UBIF-D 34b computes parity on its associated 32-bit data slice and compares the computed parity with the supplied parity. Each UBIF-D 34b reports bad data parity on GBDPERR on the clock cycle following the data being clocked into the IFIR 56b, the bad parity indication being driven to the GB 24 as GB_DPERR one cycle later.

Next-near computation: Next-near, GMC_NENE(3:0), is generated by saving the last address sent to the Global Memory 26 bank in the input queue next-near register (IFNR) 80. The input queue/dequeue pointer is automatically incremented after issuing a LDMAR in order to meet Global Memory 26 timing relative to the NENE signal.

Read-lock/write-unlock processing: An occurrence of a read lock cycle when operating in a Memory Mode 0 causes the destination Global Memory bank to perform a normal read cycle. The UBIF 34 then locks the affected memory locations (32-bytes wide) until the corresponding write-unlock cycle is received. Upon accepting a read-lock at the IFIR 56, the input stage controller saves the read-lock address and the processor identifier (PID) in a lock address register LAR 82. Single word r/w requests and block-read requests are checked against the current LAR and NAKed upon an address match. only r/w requests from the same processor that issued the active read-lock cycle are accepted, as determined by matching the given PID with the saved PID in the LAR 82.

In a Memory Mode 0, read-lock/write-unlock cycles operate as described above. However, when operating in a Memory Mode 1, read-lock cycles return the requested data and also write-back all 1's (256-bits) at the specified memory address. Write-unlock cycles function as normal write cycles in memory mode 1.

Global Bus Address Map

Table 1 illustrates the SVS 10 global address map. The global address space is 128 GB, organized as 4 GigaWords× 32 bytes/word. All global addresses are aligned on 32-byte boundaries. Byte enables are employed to support partial writes to Global Memory 26 whenever any of the eight 32-bit words making up the 256-bit wide data word on the GB 24 contain partially valid data, as indicated by GB_RMW.

TABLE 1

| DRAM Tech | Num of Cards | Bank Interleaving | Address Ranges | Total Memory |
|---|---|---|---|---|
| 4 Mbit | 1 | 4 | 0 to 256 MB | 256 MBytes |
| 4 Mbit | 2 | 8 | 0 to 512 MB | 512 MBytes |
| 4 Mbit | 3 | 8 + 4 | 0 to 512 MB, 2 GB to 2.256 GB | 768 MBytes |
| 4 Mbit | 4 | 16 | 0 to 1 GB | 1024 MBytes |
| 16 Mbit | 1 | 4 | 0 to 1 GB | 1 GByte |
| 16 Mbit | 2 | 8 | 0 to 2 GB | 2 GBytes |
| 16 Mbit | 3 | 8 + 4 | 0 to 3 GB | 3 Gbytes |
| 16 Mbit | 4 | 16 | 0 to 4 GB | 4 Gbytes |

The UBIF 34 implementation described thus far limits the global address range to 32 GB, although the SVS 10 GB 24 address bus supports 128 GB. The UBIF 34 supported address space is divided into four 8-GB regions. The first region (i.e., from 0 to 8 GB) contains the SVS 10 Global Memory cards 26, while the remaining three regions allow access to remote SVS 10 systems units. Each of these 8 GB mapping windows allows access to the corresponding Global Memory 26 card in the remote SVS 10 system unit.

Each SVS 10 backplane supports up to four memory cards, each containing 256 MB (with 4 Mbit DRAMs) or 1 GB (with 16 Mbit DRAMs). For the purpose of address decoding, the UBIF 34 assumes that each Global Memory card 26 contains two GBYTES of total DRAM. For a system with three memory cards 26, there are two different interleave factors. The first two cards are interleaved eight ways across the bottom 4 GB address range, while the third card resides in the 4–8 GB address range and is only interleaved across its own four memory banks.

Global Bus Address Remapping

Incoming addresses to a Global Memory card 26 are remapped based on the number of Global Memory cards 26, as specified by MCARD(3:0), and the interleave factor, as specified by ISEL(2:0). MCARD(3:0) are four bussed-through, open-collector, bidirectional signals on the UBIF-A 34a which indicate the presence or absence of each Global Memory card 26. Each MCARD signal is unique to each backplane memory card slot. Each Global Memory card 26 drives a unique MCARD line, as determined by which slot the card is installed within. By monitoring the values on MCARD(3:0), the UBIF-A 34a determines the total number of Global Memory 26 cards to determine the card-to-card interleave mode. The UBIF-A 34a also monitors CARDID (3:0) to determine the address range. The mapping from CARDID(3:0) to MCARD(3:0) is illustrated in Table 2.

TABLE 2

| SLOT | CARDID(3:0) | MCARD(3:0) |
|---|---|---|
| MEM-0 | 1100 | 0001 |
| MEM-1 | 1101 | 0010 |
| MEM-2 | 1010 | 0100 |
| MEM-3 | 1011 | 1000 |

Tables 3 and 4 illustrate the address remapping functions supported by the UBIF-A 34a, given one to four memory cards and various interleave factors. N-CARDS indicates a number of memory cards that are installed.

TABLE 3

| N_CARDS | ISEL | MA(23:20) | MA(9) | MA(8:7) | MA(6:5) | MA(4:3) | MA(2:1) |
|---|---|---|---|---|---|---|---|
| 1 | 0 | A(25:22) | A(9) | A(8:7) | A(6:5) | A(4:3) | A(21:20) |
| 1 | 1 | A(25:22) | A(9) | A(8:7) | A(6:5) | A(21:20) | A(2:1) |
| 1 | 2 | A(25:22) | A(9) | A(8:7) | A(21:20) | A(4:3) | A(2:1) |
| 1 | 3 | A(25:22) | A(9) | A(21:20) | A(6:5) | A(4:3) | A(2:1) |
| 2 | 0 | A(26:23) | A(9) | A(8:7) | A(6:5) | A(4), A(22) | A(21:20) |
| 2 | 1 | A(26:23) | A(9) | A(8:7) | A(6), A(22) | A(21:20) | A(2:1) |
| 2 | 2 | A(26:23) | A(9) | A(8), A(22) | A(21:20) | A(4:3) | A(2:1) |
| 2 | 3 | A(26:23) | A(22) | A(21:20) | A(6:5) | A(4:3) | A(2:1) |
| 4 | 0 | A(27:24) | A(9) | A(8:7) | A(6:5) | A(23:22) | A(21:20) |
| 4 | 1 | A(27:24) | A(9) | A(8:7) | A(23:22) | A(21:20) | A(2:1) |
| 4 | 2 | A(27:24) | A(9) | A(23:22) | A(21:20) | A(4:3) | A(2:1) |

TABLE 4

| NUM_CARDS | ISEL(1:0) | BSEL(3:0) | CARDSEL(1:0) |
|---|---|---|---|
| 1 | 00 | A(2:0) | 00 |
| 1 | 01 | A(4:3) | 00 |
| 1 | 10 | A(6:5) | 00 |
| 1 | 11 | A(8:7) | 00 |
| 2 | 10 | A(2:0) | 0, A(3) |
| 2 | 01 | A(4:3) | 0, A(5) |
| 2 | 10 | A(6:5) | 0, A(7) |
| 2 | 11 | A(8:7) | 0, A(9) |
| 4 | 00 | A(2:0) | A(4:3) |
| 4 | 01 | A(4:3) | A(6:5) |
| 4 | 10 | A(6:5) | A(8:7) |

Address Interleaving Options

The UBIF-A 34a address decoding logic supports various memory bank interleave factors, as specified by a 2-bit mode select in the UBIF-A 34a module, ISEL(1:0). ISEL(1:0)=00, 01, 10, 11 select interleave factors of 2, 8, 32 and 128 (256-bit) words, respectively, when there are 1, 2 or 3 Global Memory 26 cards installed. With four Global Memory 26 cards installed, the supported interleave factors are 2, 8, and 32 words.

Memory Bank Size Select

Each SVS 10 Global Memory 26 card includes four independent memory banks. A 2-bit size select MSIZE(1:0) selects the memory bank size and is provided directly to the Global Memory 26 banks to control RAS/CAS decoding. MSIZE(1:0) is ignored by the UBIF 34.

UBIF 34 Input Section

As was stated, the input section in the UBIF 34 provides an eight entry request queue 46 for each of the four Global Memory banks. All Global Memory 26 requests pass through the UBIF 34 input queue 46 for processing, and thus the input bypass path is not used when the UBIF 34 is operated in memory mode. Requests for each bank of the Global Memory 26 are enqueued in the order received from the GB 24, which may arrive as back-to-back GB 24 cycles for the same memory bank or different banks. The UBIF 34 continues to accept requests destined for a particular memory bank so long as the corresponding input queue 46 is not full and there is no pending read-lock operation at the requested address. The UBIF 34 generates ACK when accepting a Global Memory 26 request, and generates NAK to reject a request, indicating to the requester that it should retry the operation.

The UBIF-A 34a employs the four way round-robin arbitration technique to dispatch requests to the four Global Memory 26 banks. The UBIF-A 34a also informs each Global Memory 26 bank, through its corresponding GMC_NENE(i) signal, whenever there occurs a subsequent request having a common ROW address with a previously supplied request address. This is an optimization feature enabling the Global Memory 26 bank to perform the subsequent memory cycle in a fewer number of cycles, in that the memory bank is not required to cycle RAS and incur the associated RAS pre-charge time.

For read-modify-write cycles (FIG. 25b), as indicated by a Global Memory 26 write request with the RMW flag set, the UBIF 34 first issues a read request to the indicated memory bank. The returned memory data is passed through the error detection/correction logic as explained below, which corrects single bit errors. The corrected data is merged, via signal line 68a and MUX 64a, with the supplied write data, as specified by the supplied byte enables, and written back to the Global Memory 26 bank along with the newly computed ECC. In the event of a double-bit error in the returned memory data, a ones pattern is supplied as the computed ECC which indicates an uncorrectable ECC error whenever that particular memory location is read.

UBIF 34 Output Section

The output section in the UBIF 34 provides the output queues 44 for Global Memory 26 reply data, the bypass path, and error detection/correction logic 68. The Global Memory 26 banks employ GMC_MREQ(3:0) to request a memory reply cycle on the GB 24. The UBIF-A 34a issues GMC_MGNT(i) in response to GMC_MREQ(i), according to a four state round-robin arbitration technique. If all output queues 44 are empty and an GMC_MREQ(i) is issued, the UBIF-A 34a employs the output bypass path to pass the reply data, along with data parity and the supplied MID(7:0), MTAG(7:0), and ECC error status, to the TTL/ECL transceivers 34c. The UBIF-A 34a also issues GB_MREQ to the GB 24 arbiter for gaining access to the GB24 as indicated by GB_MGNT.

Assuming no GB 24 contention, the UBIF 34 continues using the output bypass path to return memory reply data over the GB 24. However, as GB 24 traffic increases the UBIF 34 may not be capable of returning data over the GB 24 at a rate sufficient to keep up with Global Memory 26 reply requests. If the UBIF 34 is unable to schedule a memory reply request through the bypass path, it uses the output queues 44 to buffer replies. After entering this mode of operation the UBIF 34 cycles through all pending replies in the output queues 44 before once more employing the bypass path. A four way round-robin arbitration technique is used to process pending replies in the output queues 44. The UBIF 34 continues to issue GMC_MGNTs to the Global Memory 26 banks as long as there is sufficient room in the corresponding output queue 44 to buffer the reply data. This mechanism provides automatic flow control, which prevents output queue 44 overruns.

Given that read reply cycles do not require an acknowledge indication, since it is assumed that the requesting UBIF 34 has sufficient room in its input queue 46 to accept the entire read request, Global Memory 26 replies may use the maximum UBIF 34 bandwidth, or 640 MB/second assuming 40 MHz operation, to return read data.

Error Detection and Correction

As was stated above, the UBIF-D 34b modules generate eight bit ECC codes for each 32-bit slice written to Global Memory 26. The eight bit ECC is stored with the data for subsequent error detection/checking during read operations. During read operations, the supplied eight bit ECC is used to correct single bit errors and to detect double bit errors in the supplied memory data. Each UBIF-D 34b module reports ECCERR and ERRTYPE for Global Memory 26 read cycles. The eight ECCERR/ERRTYPE pairs are ORed together to compute composite ECCERR and ERRTYPE signals, which are returned on the GB 24 along with the read data. It should be noted the ECC generation and error detection/correction does not incur any additional cycles to perform in the UBIF 34.

Typical Global memory Read/Write Timing Sequences

Figure 24A:
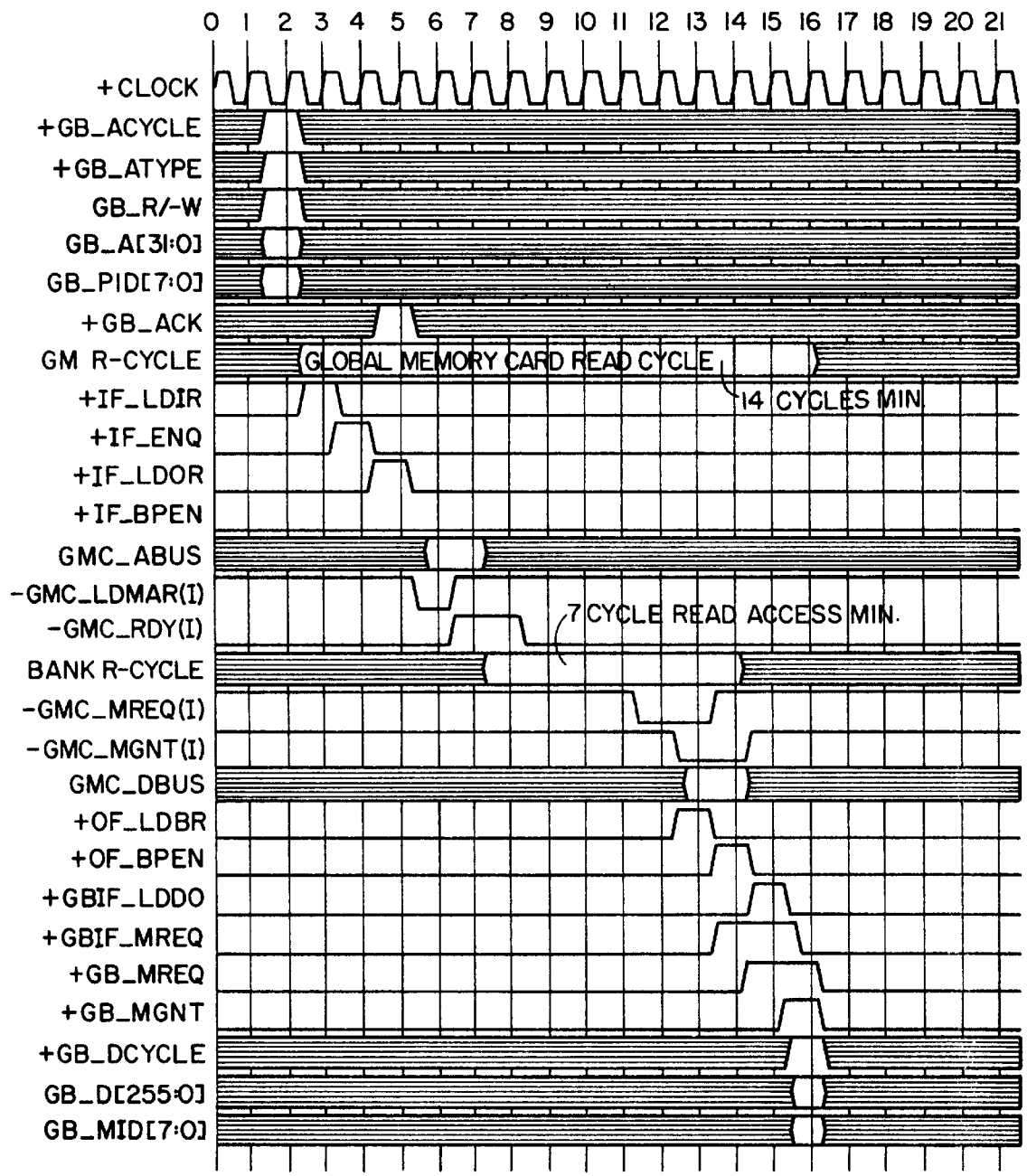
FIG. 24a is a timing diagram depicting a timing sequence for a global memory read operation.

FIG. 24a illustrates a typical timing sequence for a GM 26 read operation with respect to the GB 24. A GM 26 read request appears on the GB 24 during cycle 1 and is accepted (ACKed) by the GM 26. The request is enqueued into the appropriate input queue during cycle 3 and appears on the GMC bus 26a during cycles 5 and 6, as indicated by GMC_ABUS and GMC_LDMAR. In this example, it is assumed that the input queue for the corresponding GM 26 bank is empty and that the UBIF 34 is not required to schedule any other memory bank operation. It is further assumed that the GM 26 bank is ready to accept a request, as indicated by a valid GMC_RDY(i) during cycle 4, and that no memory refresh cycle is pending at the memory bank. Therefore, the GM 26 bank performs the given memory read operation and requests the GMC data bus, by asserting GMC_MREQ(i), to return the read data. The returned data appears on the GMC data bus during GMC_MGNT(i) (cycles 12 and 13) and is latched into the OFBR 54 in the UBIF-D 34b modules at the end of cycle 13. OFBR 54 is used in that it is assumed that the four output queues 44 are empty and that there is no pending reply data in the external TTL/ECL register 34c. The memory reply data is corrected (if necessary) by the UBIF-D 34b modules during cycle 14 and is latched into the external TTL/ECL register 34c at the end of cycle 14, along with the results of error detection and correction (as indicated by ECCERR and ECCTYPE) and the computed data parity. The GM 26 read reply cycle appears on the GB 24 during cycle 15, along with MID(7:0) which reflects the supplied PID(7:0), assuming that the GB arbiter 36 issued an immediate GB data bus memory grant (GB_MGNT) in response to the GM_MREQ.

Figure 24B:
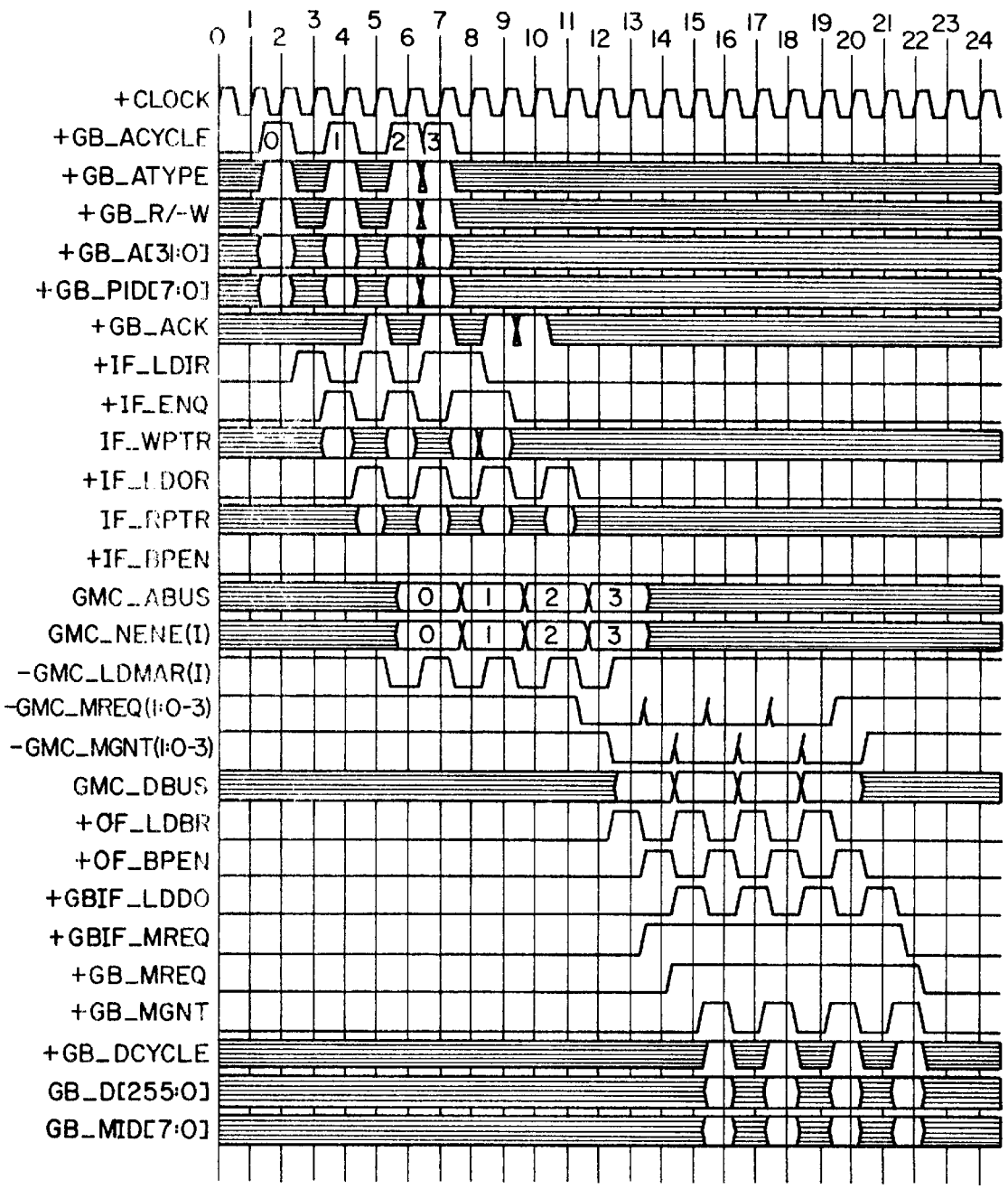
FIG. 24b is a timing diagram illustrating four global memory read requests directed to one global memory card, each being addressed to a different memory bank.

FIG. 24b illustrates four global memory read requests arriving at a single GM 26 card, each destined to a different memory bank. That is, the request in cycles 1, 3, 5, 6 is destined to memory bank 0, 1, 2, 3, respectively. The first three requests are shown spaced at every other GB 24 cycle, while the fourth request appears immediately after the third request. This illustrates that a single GM 26 card accepts back-to-back global memory requests as long as the corresponding input queue is not full, at which time the requests are NAKed by the UBIF 34.

As can be seen from the timing diagram, all four requests are accepted (ACKed) and enqueued into their corresponding input queues, as determined by the supplied global address, interleave factor, and number of installed global memory cards. These requests then appear on the GMC bus 26a as consecutive cycles as determined by the input queue output control round robin arbiter. Assuming no GM 26 refresh cycles are pending, each of the GM 26 cards performs the indicated memory read operation and requests the GMC data bus in order to return the read data. Thus, memory banks 0, 1, 2, 3 request the GMC bus 26a at cycle 11, 13, 15, and 17, respectively, and are granted the GMC data bus at cycle 12, 14, 16, and 18 by the GMC data bus arbiter of the UBIF 34. Further assuming that all four output queues are empty, and that the GB .24 bus arbiter 36 issues immediate GB data bus grants to the GM 26 card, all four read reply cycles flow through the OBFR 54, where error detection and correction is performed, along with data parity computation, and appear on the GB 24 data bus at the maximum reply data rate of 640 MB/sec. Thus, another GM 26 may also be return read reply data during the alternate GB 24 data bus cycles, thereby achieving the 1.28 GB/sec. total bandwidth on the GB 24.

Figure 25A:
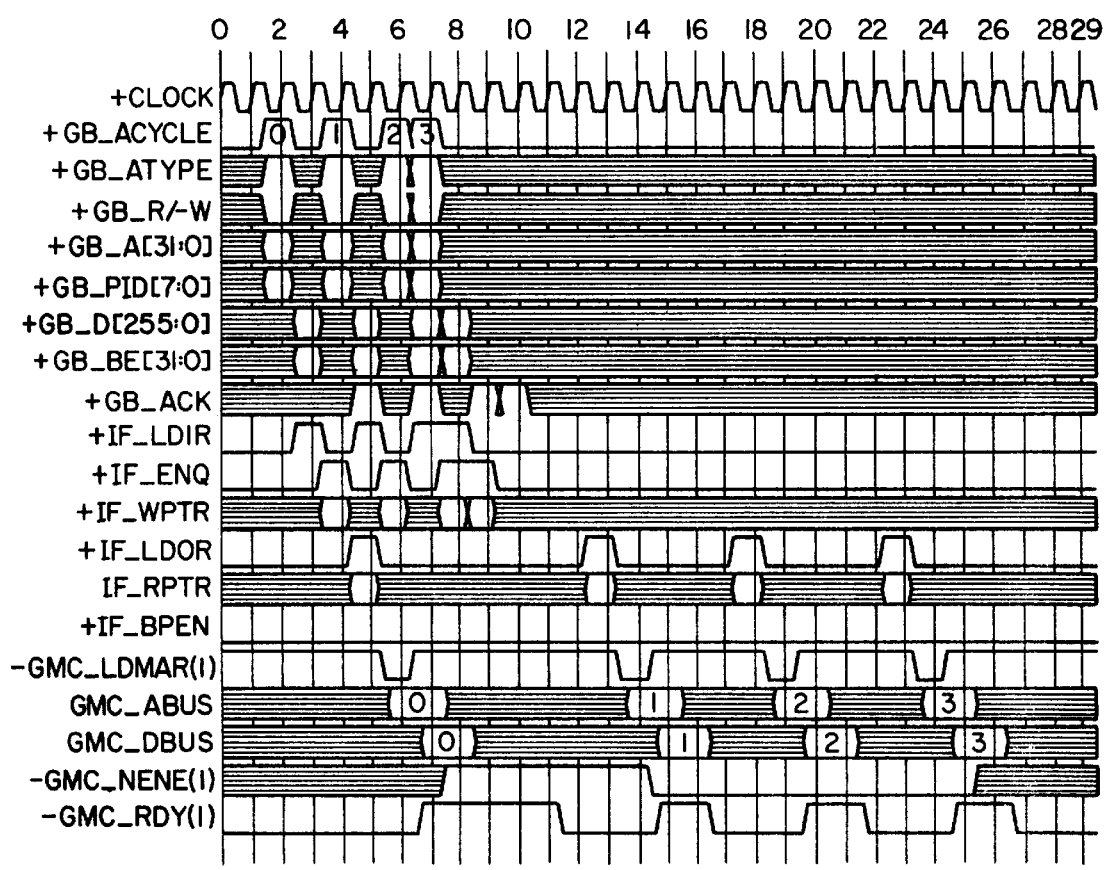
FIG. 25a illustrates four global memory write cycles directed to a single global memory bank.

FIG. 25a illustrates four GM 26 write cycles destined to a single GM 26 bank. As with the previous example, the GB 24 requests are shown spaced out to illustrate that requests to a single bank, or to different banks, are accepted at the maximum GB 24 data bus bandwidth of 1.28 GB/sec. (i.e., back-to-back cycles), so long as there is room in the corresponding UBIF 34 input queue to buffer the request. In this example, it is assumed that the corresponding input queue is empty at the start of the timing sequence. Thus, all four GM 26 write requests are accepted (ACKed). The first write request appears on the GMC bus 26a at cycle 5 (address during cycles 5 and 6, data during cycles 6 and 7), causing the GM 26 bank to become busy, as indicated by GMC_RDY(i) being negated at cycle 6. The GM 26 bank then asserts GMC_RDY(i) at cycle 11, indicating that it is ready to accept another request, causing the UBIF 34 to issue the subsequent write request at cycle 13. It is noted, however, that in this case write requests 1, 2, and 3 are destined to the same ROW address of the global memory bank, as indicated by GMC_NENE(1), thus causing the global memory bank to return GMC_RDY(i) within two cycles from the start of the write cycle, instead of five cycles. It should also be noted that the UBIF 34 may schedule cycles to a given global memory bank at every fourth clock cycle, assuming GMC_RDY(i) is negated for a single clock cycle after GMC_LDMAR(i).

FIG. 25b illustrates four global memory read-modify-write operations, as indicted by GM_RMW active, each destined to a different GM 26 bank. As with the previous examples, the requests are spaced out on the GB 24 for illustrative purposes. It is also assumed that the UBIF 34 input and output queues are empty at the start of the timing sequence.

Figure 33:
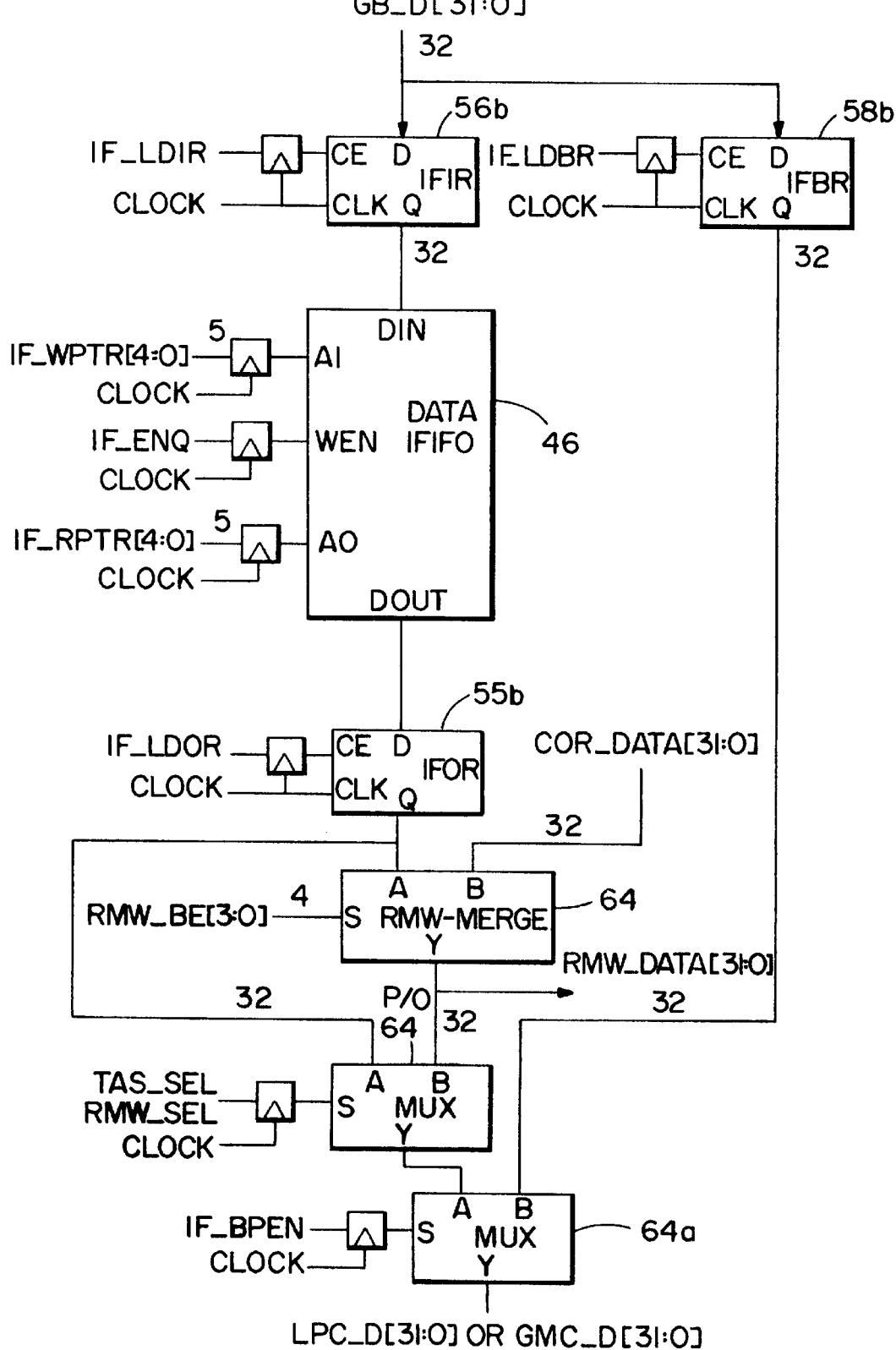
FIG. 33 is a block diagram showing in greater detail the UBIF-D input circuitry.

As was described previously, read-modify-write operations are used to perform partial write cycles to the GM 26, where any combination of data bytes within a GB data word may be updated using a single GB 24 write cycle operation. As seen in FIG. 33, the data bytes to be updated at the GM 26 are indicated by their corresponding byte enable bit GB_BE(31:0) being set. For a given UBIF 34b module, each of which has a 32-bit data path, the four associated byte enables (RMW_BE[3:0]) are applied to the RMW_MERGE MUX 64. The UBIF 34 performs partial write cycles by first performing a GM 26 read operation, updating the selected bytes, recomputing ECC, and storing the combined data back to the GM 26 bank. Therefore, in this example, the first read-modify-write cycle starts in cycle 5 where the UBIF 34 issues a read request to bank 0 (R0), which causes the GM 26 bank to perform the indicated read operation and return data to the UBIF 34 during cycles 12 and 13. The UBIF 34 also schedules the read request to GM 26 banks 1, 2, 3 during cycles 7, 9, 11, respectively. UBIF 34 performs the modify operation internally in the UBIF-D 34b modules by first taking the supplied GM 26 data and performing any necessary error correction, as determined by the supplied read data and ECC. This occurs during the cycle that immediately follows the corresponding GMC data bus grant. The UBIF 34 also reads the supplied write data from the corresponding input queue, as indicated by IF_LDOR, along with the supplied byte enables (BEs), and performs the merge operation through the RMW_MERGE MUX 64. As a result, only those bytes that are enabled are replaced with the supplied write data. A new ECC is computed for the merged data and a global memory write operation is scheduled to perform the write back operation to the GM 26 bank. The UBIF-A 34a controls the eight UBIF-D 34b modules using the RMW_SEL signal, the assertion of which causes the merge operation and the storage of the merged data back into the GM 26 memory bank(s).

As can be seen, the invention provides an interface circuit that operates with a number of different bus agents, for example, data processors, I/O devices, or memory banks, that function as a source or sink for data. The interface circuit provides address and data buffering for each agent coupled to the local bus, local and global bus arbitration and sequencing, and error detection and correction capabilities.

It should be realized that the teaching of the invention is not to be construed to be limited to only the presently preferred embodiment. For example, the UBIF 34 could be provided with more or less than the four input and output queues. Also, arbitration techniques other than a round robin technique could be employed. Thus, while the invention has been particularly shown and described with respect to a preferred embodiment thereof, it will be understood by those skilled in the art that changes in form and details may be made therein without departing from the scope and spirit of the invention.

APPENDIX A
Global Address Bus Signal Definition

The address bus consists of GB_ACYCLE, GB_ATYPE, GB_A(31:0), GB_LEN(3:0), GB_PID(7:0), GB_PTAGE(7:0), GB_R/-W, GB_LOCK AND GB_RMW. This bus is used by master devices (e.g. processor cards) to initiate global memory r/w cycles. Access to the SVS global bus is gained by issuing a GB_RREQ or GB_WRFQ to the global bus master arbiter and receiving a GB_PGNT. A description of each address bus field is provided below:

GB_ACYCLE identifies a valid global bus address cycle. This signal is driven by the current global address bus master to validate the global address bus. Slave devices should validate r/w requests with GB_ACYCLE.

GB_ATYPE specifies a valid address cycle or IPC interrupt cycle. If GB_ATYPE is 1, the address bus specifies a valid global memory r/w request. If GB_ATYPE is 0, the address bus specifies and IPC interrupt cycle, and global bus slave devices should interpret GB_LEN(3:0) as the group select identifier GSI(3:0), and GB_A(31:0) as the processor select mask PSM(31:0). During IPC interrupt cycles, GB_R/-W, GB_LOCK and GB_RMW are not defined, and GB_AP(3:0) specifies parity for GB_A(31:0). GSM (2:1) selects the destination system unit. GSM(0) selects computation processors or I/O processors. HWID(4:2) is used to select one of the eight, four bit fields specified by the processor select mask.

GB_A(31:0) specifies the 32-byte block address during global bus r/w request cycles, thus providing a physical address range of 128 GB. During IPC interrupt cycles (GB_ATYPE=0), GB_A(31:0) specifies the processor select mask.

GB_AP(3:0) is the address parity bus. GB_AP(0) provides parity for GB_A(7:0), GB_AP(1) provides parity for GB_A(15:8), etc. Odd parity is used.

GB_LEN(3:0) indicates the block length during global bus read request cycles. Typically, processors issue single-word read request cycles (i.e. GB_LEN(3:0)=0); however, block-read cycles are supported by indicating a non-zero block length during global bus read request cycles. The corresponding block address indicates a valid starting block address for correct operation, and reply data is returned in proper order. The block length is specified in powers of two, where GB_LEN(3:0)=0,1,2, . . . , 16 indicates block lengths of 1,2,4 . . . , $2^{16}$, respectively. During IPC interrupt cycles (GB-ATYPE=0), GB_LEN(3:0) specifies the group select identifier.

GB_PID(7:0) indicates the requesting processor identifier (PID) during global bus r/w request cycles. On a read request cycle, the PID is saved by address consumers (i.e., global memory cards) and later returned along with the corresponding reply data as GB_MID(7:0) to uniquely identify the destination processor. On a write request cycle, the PID is used by global memory cards to complete a decoupled, read-lock/write-unlock cycle by a given processor, thus preventing any other processor from performing any memory r/w operation to the locked global memory location.

GB_PTAG(7:0) is used by processors to uniquely tag multiple outstanding read requests. Like GB_PID(7:0), GB_PTAG(7:0) is saved by address consumers and later returned along with the corresponding reply data as GB_MTAG(7:0). Since read requests to different memory banks can return in arbitrary order, GB_PTAG(7:0) may optionally be used by processors to re-organize data when issuing multiple outstanding read requests.

GB_R/-W specifies a read (1) or write (0) cycle during valid global bus address cycles.

GB_LOCK conditions the current global bus r/w cycle. When inactive, it indicates a normal r/w cycle. When active, it indicates a decoupled, atomic r/w cycle. In global memory mode 0, a global bus read-lock cycle requests data from global memory and causes the affected global memory location to be locked until a subsequent write-unlock cycle is performed by the same processor that issued the lock-read cycle. This prevents any other processor from performing any memory r/w operation to the locked global memory location, thus supporting atomic global memory operations (e.g., test-and-set, compare-and-swap, fetch-and-add, etc.). In global memory mode 1, a read-lock cycle causes an atomic test-and-set operation at the global memory. The global memory returns the data at the specified address and then writes all ones to the entire 256-bit word.

GB_RMW identifies a partial global memory write cycle, which performs a read-modify-write operation at the global memory bank. RMW should be active whenever any of the eight 32-bit data slices contains partially written data.

Global Data Bus Signal Definition

The data bus consists of GB_DCYCLE, GB_D(255:0), GB_DP(31:0), GB_BE(31:0), GB_MID(7:0), GB_MTAG(7:0), GB_ECCERR, and GB_ERRTYPE. This bus is used by master devices to transfer write data or by slave devices (e.g., memory cards) to return read data. Access to the data bus is gained by issuing a GB_WREQ to the global bus master arbiter and receiving a GB_PGNT (processor write operation), or by issuing an GB_MREQ to the global bus slave arbiter and receiving an GB_MGNT (memory reply operation). Master devices drive the data bus one clock cycle after receiving a valid GB_PGNT, while slave devices drive the data bus upon receiving an GB_MGNT.

GB_DCYCLE identifies a valid global bus data cycle. This signal is driven by the global bus arbiter to validate global memory reply cycles.

GB_D(255:0) is the data bus. Each of the thirty-two data bytes may contain valid data, as indicated by the byte enables GB_BE(31:0).

GB_DP(31:0) is the data parity bus. GB_DP(0) provides parity for GB_D(7:0). GB_DP(1) provides parity for GB_D(15:8), etc. The UBIF driving the global bus data bus computes parity, while the receiving UBIF checks for valid parity. Odd parity is used.

GB_BE(31:0) are the individual byte enables. GB_BE(0) active indicates valid data on GB_D(7:0). GB_BF(1) active indicates valid data on GB_D(15:8), etc. During global memory write operations, GB_BF(31:0) validate each of the thirty-two data bytes on GB_D(255:0) and are used by the global memory cards to condition writing to the memory array. GB_BE(31:0) are always valid during global memory reply cycles since global memory read operations always return 256-bits worth of data.

GB_MID(7:0) carries the returned processor ID during global memory reply operations indicating the destination processor for the given data. GB_MID(7:0) reflects the value presented on GB_PID(7:0) during the corresponding read cycle. GB_MID(7:0) is inactive during processor write cycles.

GB_MTAG(7:0) carries the returned processor GB_PTAG(7:0) during global memory reply operations. This field is optionally used by processors to re-organize global memory reply data when issuing multiple outstanding read requests. GB_MTAG(7:0) reflects the value presented on GB_PTAG(7:0) during the corresponding read cycle. GM_MTAG(7:0) is inactive during processor write cycles.

GB_NOCACHE inhibits buffering of the returned data. This is returned by slave devices along with reply data to indicate that the data is volatile and should not be buffered or cached.

GB_ECCERR and GB_ERRTYPE report the result of a global memory read operation. If ERRTYPE is active, then ERRTYPE indicates a corrected, single-bit error or an uncorrectable, double-bit error. The global memory card UBIF generates GB_ECCERR and GB_ERRTYPE during global memory read reply cycles.

Global Control Bus Signal Definition (GB_ACK, GB_NAK) are returned by a slave UBIF after receiving a valid global bus r/w request. (GB_ACK, GB_NAK) indicates to the master UBIF that the global bus r/w request has been successfully received by a slave UBIF, (GB⎯NAK, GB⎯ACK) indicates that the slave is currently busy and cannot accept the given r/w request. (GB_ACK, GB_NAK) active simultaneously signals bad parity detected on the address bus A(31:0). The master UBIF should retry the request after receiving a NAK condition or address parity error indication.

GB_APERR reports bad parity on the address bus GB_A(31:0), as compared to the supplied address bus parity, GB_AP(3:0). The UBIF driving the data bus generates parity, while the receiving UBIF checks and reports bad parity. GB_APERR is monitored by the console processor and is used to report global bus error conditions.

GB_DPERR reports bad parity on the data bus GB_D(255:0) for any enabled byte, as compared to the supplied data bus parity, GB_DP(31:0). The UBIF driving the data bus generates parity, while the receiving UBIF checks and reports bad parity. GB_DPERR is monitored by the console processor and is used to report global bus error conditions.

GB_BUSERR is used to signal an unrecognized global bus address cycle (i.e., no GB_ACK or GB_NAK returned). GB_BUSERR is monitored by the console processor and is used to report global bus error conditions.

GB_RESET is the master reset signal on the global bus. It is synchronized to the rising edge of the bus clock and is generated at power-on or under software control from the console processor.

Global Bus Slot-Specific Signal Definitions

The following signals are unique for each backplane slot.

GB_RREQ is the processor card global bus read request line. It provides access to the address bus, given GB_PGNT. For a single global bus cycle, GB_RREQ should be asserted and held until the corresponding GB_PGNT is returned. For multiple cycles, GB_RREQ should be held until the last GB_PGNT is received. Assuming no bus contention on the bus, the central global bus arbiter will grant back-to-back cycles to a processor card given an active GB_RREQ. GB_RREQ must be asserted very early in the clock cycle in order to meet Arbiter timing requirements, and should be deasserted very early after the GB_PGNT in order to prevent receiving a spurious GB_PGNT: an unused grant is not permitted.

GB_WREQ is the processor card global bus write request line. It provides access to the address and, one cycle later, the data bus, given GB_PGNT.

GB_PGNT is the processor card global bus grant line. This is returned by the central global bus arbiter to a single processor card during any given global bus cycle. It is used to enable the global bus address bus drivers during a current bus cycle, and conditionally enable the global bus data bus drivers, one cycle later, if GB_PGNT is issued in response to a GB_WREQ.

GB_MREQ is the memory card global bus request line. It provides access to the data bus for returning read data to processor cards.

GB_MGNT is the memory card global bus request line. This is returned by the global bus arbiter to a single memory card during any given global bus cycle. It should be used to enable the global bus data bus drivers during the current bus cycle.

GB_CARDID(3:0) is a slot specific four bit identifier that uniquely identifies each backplane slot. This four bit field is used to generate GB_PID(5:2) during global bus r/w request cycles.

GB_UNITID(1:0) is a backplane-specific 2-bit identifier that uniquely identifies each SVS system unit in a multi-system configuration. This 2-bit field is used to generate GB_PID(7:6) during global bus r/w request cycles.

Miscellaneous Global Bus Signals

GB_MCARD(3:0) are backplane signals that are used by global memory cards to determine the number of global memory cards in the system. Each memory card determines which of the four memory slots it is in from its GB_CARDID(3:0), and drives the GB_MCARD line corresponding to that slot. Each memory card also reads GB_MCARD(3:0) to determine a complete configuration of memory cards in the backplane, and thus the interleave factor to use.

Global Bus Signal Summary

| Signal Name | Width | Description |
| --- | --- | --- |
| GB ACYCLE | 1 | Address cycle indicator |
| GB ATYPE | 1 | +Address/−1message indicator |
| GB A | 32 | Address bus (32-byte block address) |
| GB AP | 4 | Address bus parity |
| GB LEN | 4 | Block length |
| GB PID | 8 | Processor request ID |
| GB PTAG | 7 | Preocessor request TAG |
| GB RW | 1 | +Read/−Write select |
| GB LOCK | 1 | Atomic cycle select |
| GB RMW | 1 | Read-modify-write signal |
| GB DCYCLE | 1 | Data cycle indicator |
| GB D | 256 | Data bus |
| GB BE | 32 | Byte Enables |
| GB DP | 32 | Data bus parity by byte |
| GB MID | 8 | Memory reply ID |
| GB MTAG | 7 | Memory reply TAG |
| GB NOCACHE | 1 | Dont't cache |
| GB ECCERR | 1 | ECC error signal |
| GB ERRTYPE | 1 | ECC error type |
| GB ACK | 1 | Bus acknoledge |
| GB NAK | 1 | Bus no-acknoledge |
| GB BUSERR | 1 | Bus error |
| GB BACKOFF | 1 | Memory back-off indicator |
| GB APERR | 1 | Address bus parity error |
| GB DPERR | 1 | Data bus parity error |
| GB RESET | 1 | Bus reset |
| | | The following signals are unique per slot |
| GB ECLK | 2 | Bus clock for ECL devices (differential) |
| GB TCLK | 2 | Bus clock for TTL devices (differential) |
| GB RREQ | 1 | Master GBIF read request |
| GB WREQ | 1 | Master GBIF write request |
| GB PGNT | 1 | Master GBIF bus grant |
| GB MREQ | 1 | Slave GBIF reply request |
| GB MGNT | 1 | Slave GBIF bus grant |
| GB CARDID | 4 | Backplane slot ID |
| GB UNITID | 2 | Backplane ID |
| | | The following signals are daisy chained |
| GB SIN | 1 | Diagnostic bus serial in |
| GB SOUT | 1 | Diagnostic bus serial out |
| GB SCANI | 1 | Serial scan-in |
| GB SCANO | 1 | Serial scan-out |
| | | The following signals are specials |
| GB MCARD | 4 | Memory card signals |

APPENDIX B
Address Bus Signal Definitions

The LPC address bus consists of LPC_ACYCLE, LPC_ATYPE, LPC_A(31:0), LPC_LPN(3:0), LPC_PID(1:0), LPC_PTAG(7:0)LPC_RW, LPC_LOCK, and LPC_RMW. This bus is shared by the four local processors and is used to initiate global memory r/w cycles. Access to the LPC address bus is gained by issuing a read request (LPC_RREQ) or write request (LPC_WREQ) to the LPC bus arbiter and by receiving a processor grant (LPC_PGNT). A description of each address bus field is provided below:

LPC_ACYCLE conditions a valid LPC bus local address cycle. This line is driven by the UBIF LPC bus abiter to validate local LPC bus addresses. It is used by local LPC bus devices, such as the IHPPI I/O interfaces on the I/O processor card to validate LPC addresses. LPC_ACYCLE is valid for one cycle during the first half of an LPC ABUS cycle, indicating that a valid LPC bus address cycle can be sampled on the following rising clock edge.

LPC_ATYPE specifies a valid LPC address bus cycle or IPC interrupt cylce. If the LPC_ATYPE=1, the LPC address bus specifies a valid r/w request. If LPC_ATYPE=0, the LPC bus identifies an IPC interrupt cycle. In this case, the UBIF interprets LPC_LEN(3:0) as the group select identifier, GSI(3:0), and LPC_A(31:0) as the processor select mask. PSM(31:0). During LPC interrupt cycles, LPC_RW, LPC_LOCK, and LPC_RMW are not defined.

LPC_A(31:0) specifies the 32-byte block address during LPC r/w request cycles, thus providing a physical address range of 128 GB. During LPC interrupt cycles (LPC_ATYPE=0), LPC_A(31:0) specifies the processor select mask.

LPC_LEN(3:0) indicates the block length during LPC read request cycles. Typically, processors issue single-word read request cycles (i.e., LPC_LEN(3:0)=0). However, block-read cycles are supported by indicating a non-zero block length during LPC read request cycles. The corresponding block address must indicate a valid starting block address for correct operation, and reply data is returned in proper order. The block length is specified in powers of two, where LPC_LEN(3:0)=0,1,2 . . . , 16 indicate block lengths of 1,2,4, . . . , 2**16 respectively. The current limitation imposed by the UBIF is a block length of eight 256-bit words (or LPC_LEN(3:0)=3) per local device. During LPC interrupt cycles (LPC_ATYPE=0), LPC_LEN(3:0) specifies the processor group select.

LPC_PID(1:0) indicates the requesting processor indentifier (PID) during LPC r/w request cycles. On a read request cycle, the PID is saved by address consumers (i.e., global memory cards) and later returned along with corresponding reply data as LPC_MID(1:0) to uniquely identify the destination processor. On a write request cycle, the PID is used by global memory cards to complete a decoupled, lock-read/lock-write cycle by a given processor, thus preventing any other processor from performing any memory r/w operation to the locked global memory bank. On the processor and IOP cards, the global bus processor identifier, LPC_PID(7:0), is composed by concatenating GB_UNITID(1:0), GB_CARDID(3:0), with the given LPC bus LPN(1:0).

LPC_PTAG(7:0) is used by processors to uniquely tag multiple outstanding read requests. Like PID, PTAG is saved by address consumers and later returned along with the corresponding reply data as LPC_MTAG(7:0). Since read requests to different memory banks can return in arbitrary order, PTAG can optionally be used by processors to re-organize data when issuing multiple outstanding read requests.

LPC_RW specified a read (1) or write (0) cycle during valid LPC request cycles.

LPC_LOCK conditions the current LPC r/w cycle. When inactive, it indicates a normal r/w cycle. When active, it indicates a decoupled, atomic r/w cycle. In global memory mode 0, read-lock cycle requests data from global memory and causes the affected global memory address to be locked until a subsequent write-unlock cycle is performed by the same processor that issued the read-lock cycle. This prevents any other from performing any r/w operation to the locked global memory address, thus supporting atomic global memory operations (e.g., test-and-set, compare-and-swap, fetch-and-add, etc.). In global memory mode 1, a read-lock cycle causes an atomic test-and-set operation at the global memory. The global memory returns the data at the specified address and then writes all 1's to the entire 256-bit word.

LPC_RMW identifies a partial global memory write cycle, which requires a read-modify-write operation at the global memory bank. LPC_RMW should be active whenever any of the eight 32-bit data slices contains partially written data.

LPC Data Bus Signal Definitions

The data bus consists of LPC_DCYCLE, LPC_D(255:0), LPC_BE(31:0), LPC_MID(7:0), LPC_MTAG (7:0) LPC_GBPERR, LPC_ECCERR and LPC_ERRTYPE. This bus is used by processors to transfer write data to the UBIF or by the UBIF to return global memory data to processors. Processors gain access to the LPC data bus by issuing a LPC_WREQ to the LPC bus master arbiter and receiving a LPC_PGNT. A description of each data bus field is provided below:

LPC_DCYCLE conditions a valid LPC bus data cycle. This line is driven by the UBIF LPC bus data arbiter to validate LPC bus reply cycles. Data consumers should validate read reply cycles with LPC_DCYCLE. LPC_DCYCLE is valid for one cycle during the first half of an LPC_DBUS cycle.

LPC_D(255:0) is the data bus. Each of the thirty-two data bytes may contain valid data, as indicated by the byte enables LPC_BE(31:0).

LPC_BE(31:0) are the individual byte enables. LPC_BE(0) active indicates valid data on LPC_D(7:0). LPC_BE(1) active indicates valid data on LPC_D(15:8), etc. During write operations, LPC_BE(31:0) validate each of the thirty-two data bytes on LPC_D(255:0). LPC_BE(31:0) are not defined during read reply cycles, since global memory read operations always return 256-bits of data.

LPC_MID(7:0) carries the returned processor ID during global memory reply operations indicating the destination processor for the given data. LPC_MID(1:0) reflects the value presented on LPC_PID(1:0) during the corresponding read cycle. LPC_MID(1:0) is inactive during processor write cycles.

LPC_MTAG(7:0) carries the returned processor TAG during global memory reply operations. This field is optionally used by processors to re-organize global memory reply data when issuing multiple outstanding read requests. LPC_MTAG(7:0) reflects the value presented on LPC_PTAG(7:0) during the corresponding read cycle. LPC_MTAG(7:0) is inactive during processor write cycles.

LPC_NOCACHE inhibits buffering of the returned data. This is returned by memory devices along with reply data to indicate that the data is volatile and should not be buffered or cached. The UBIF returns LPC_NONACHE to the destination processor along with the reply data.

LPC_ECCERR, LPC_ERRTYPE reports the result of a global memory read operation. If LPC_ERRTYPE is active, then LPC_ERRTYPE indicates a corrected, single-bit error (if 0) or an uncorrectable, double-bit error (if 1). These signals are inactive during processor write cycles.

LPC_GBPERR reports if bad parity was detected on the global bus data lines LPC_D(255:0) during the memory read reply cycle. It is only valid during UBIF to PBIF data cycles and should be ignored at all other times.

LPC Control Bus Signal Definitions

The LPC control bus consists of LPC_ACK and LPC_NAK. These shared signals are used to acknowledge a valid LPC address and to indicate whether LPC bus requests are accepted or rejected. LPC_ACK and LPC_NAK are returned two cycles after a valid LPC address bus cycle has been issued to a recognized LPC address. The UBIF always returns LPC_ACK when processors issue global memory r/w requests, as indicated by conditioning an LPC_RREQ or LPC_WREQ with an active (i.e., 0) LPC_LG indication. An invalid LPC address is indicated by the absence of both LPC_ACK and LPC_NAK, which implies that processors should abort the request. A description of each control bus signal is provided below:

LPC_ACK is returned by an address consumer to indicate that it has acknowledged a valid LPC address and that is has accepted the given r/w request. The UBIF always returns LPC_ACK when given a global address since the UBIF local bus arbiter only grants the LPC bus if there is room in the associated output queue to buffer the global bus request. However, local devices on the I/O processor card may not return LPC_ACK, either because of an unrecognized address or because they cannot accept the given request.

LPC_NAK is returned by an address consumer to indicate that is has acknowledged a valid LPC address but that is has not accepted the r/w request. The requestor should retry a NAKed cycle.

Bus Arbitration Signal Definitions

The LPC bus arbitration control signals consist of LPC_RREQ(3:0), LPC_WREQ (3:0), LPC_LG(3:0), and LPC_RDY(3:0). Each of the four local processors has a unique set of the these control signals, thus processor (i) is given LPC_RREQ(i), LPC_WREQ(i), LPC_LG(i), and LPC_RDY(i). LPC_RREQ(i), LPC_WREQ(i), and LPC_LG(i) are used to gain access of the LPC bus to issue local or global r/w requests, while LPC_RDY(i) is used by the UBIF-D chip to pace the return of global memory block read data to each local processor. These signals are described in more detail below. A description of each arbitration signal is provided below:

LPC_RREQ(3:0) are unique processor read request signals. These are used to gain access to the LPC address bus to issue a local or global read request. LPC_LG(3:0) indicates whether the request is destined for a local device (1) or a global device (0). LPC_RREQ(i) should be generated on the rising edge of LPC_CLOCK and remain asserted until LPC_PGNT(i) is received.

LPC_WREQ(3:0) are the unique processor write request signals. These are used to gain access to both the LPC address bus and LPC data bus to issue a local or global write request. LPC_LG(3:0) indicates whether the request is destined for a local device (1) of global device (0). LPC_WREQ(i) should be generated on the rising edge of LPC_CLOCK and remain asserted until LPC_PGNT(i) is received.

LPC_LG(3:0) are the unique processor+Local/−Global select signals. These are used to condition whether the current LPC_RREQ(i) or LPC_WREQ(i) is destined for local device (1) or a global device (0). The timing of $LPC_{13}$ LG(i) is identical to LPC_RREQ(i) and LPC_WREQ(i).

LPC_PGNT(3:0) are the unique processor bus grant signals. During any given LPC bus cycle, only one LPC_PGNT(i) is issued by the LPC bus arbiter. LPC_PGNT(i) is returned no sooner than one cycle after detecting a LPC_RREQ(i) or LPC_WREQ(i) and remains active for two clock cycles. LPC_PGNT(i) should be used directly to enable the LPC address bus drivers on a given processor. If a LPC_WREQ(i) was issued, then the processor should begin driving the LPC data bus one cycle after detecting LPC_PGNT(i). The LPC bus arbiter always deasserts LPC_PGNT(i) after two cycles, but may assert the same LPC_PGNT(i) one cycle later if the corresponding processor keeps LPC_RREQ(i) or LPC_WREQ(i) asserted. Thus, any given processor is granted the LPC bus at most every other LPC bus cycle.

LPC_RDY(3:0) are the unique processor ready signals. LPC_RDY(i) indicates to the UBIF that the processor is ready to accept read data. These are used primarily during block-read cycles to pace the rate at which a local processor or I/O device (e.g., the IHPPI transmitter on the I/O processor card) accepts global memory read data. The UBIF returns data to a device at a peak data rate of 320 MB/second, assuming 40 MHz and no bus contention. The local processor or I/O device interface can slow this rate by taking away LPC_RDY(i) upon receiving a data word.

Interrupt Message Support Signal Definitions

LPC_IPCINTR(3:0) are the unique LPC interrupt signals. These are generated by the UBIF whenever it detects an IMSG cycle on the global bus which selects any of the four local processors. The UBIF generates a one-clock-cycle long LPC_IPCINTR(i) signal, which should be used by the PBIF chip to set the IPC interrupt bit in the processor interrupt register. The UBIF can issue back-to-back LPC_IPCINTR(i) signals, should there be back-to-back IMSG cycles that select that select the processor (i).

GMC_A(23:0) specifies the 32-byte block address. The least significant ten bits, GMC_A(9:0) specify the column address (CAS). Assuming 4-Mbit DRAMs, GMC_A(19:10) specify the row address (RAS), while GMC_A(20) selects the side (1M or 2M SIMMs). Assuming 16-Mbit DRAMs, GMC_A(21:10) specify the row address (RAS), while GMC_A(22) selects the side (1M or 2M SIMMs). GMC_A(23) is reserved for future rank expansion with 16-Mbit DRAMs.

GMC_Len(3:0) indicates the block length during GMC read request cycles. Typically, processors issue single-word read request cycles (i.e., LEN=0). However, block-read cycles are supported by indicating a non-zero block length during GMC read request cycles. The corresponding block address indicates a valid starting block address. The block length is specified in powers of two, where LEN=0,1,2, . . . , 16 indicate block lengths of 1,2,4, . . . , 2**16 respectively.

| Local Processor Card (LPC) Bus Signal Summary | | | |
|---|---|---|---|
| Signal Name | Width | Description | Type |
| −LPC ACYCLE | 1 | Address cycle indicator | TP |
| LPC ATYPE | 1 | +Address/−lmessage select | TS |
| LPC A | 32 | Address bus (32-byte block address) | TS |
| LPC LEN | 4 | Block length | TS |
| LPC PID | 2 | Processor request ID | TS |
| LPC PTAG | 7 | Processor request TAG | TS |
| LPC RW | 1 | +Read/−Write select | TS |
| LPC LOCK | 1 | Atomic cycle select | TS |
| LPC RMW | 1 | Read-modify-write signal | TS |
| −LPC DCYCLE | 1 | Data cycle indicator | TP |
| LPC D | 256 | Data bus | TS |
| LPC BE | 32 | Byte Enables | TS |
| LPC MID | 2 | Memory reply ID | TS |
| LPC MTAG | 7 | Memory reply TAG | TS |
| LPC ECCERR | 1 | ECC error signal | TS |
| LPC ERRTYPE | 1 | ECC error type (0 = CECC, 1 = UECC) | TS |
| LPC NOCACHE | 1 | Dont't cache | TS |
| LPC GBPERR | 1 | GigaBus parity error | TS |
| −LPC ACK | 1 | Bus acknoledge | TS |
| −LPC NAK | 1 | Bus no-acknoledge | TS |
| Total | 354 | The following signals are unique per processor | |
| LPC LG | 1 | +Local/−Global indicator | TP |
| −LPC RREQ | 1 | LPC read request | TP |
| −LPC WREQ | 1 | LPC write request | TP |
| −LPC PGNT | 1 | LPC bus processor grant | TP |
| −LPC RDY | 1 | Processor ready indicator | TP |
| −LPC IPCINTR | 1 | Interrupt message interrupt | TP |
| +LPC ETCLK | 2 | ECL System clock | ECL |
| −LPC ETCLK | 2 | ECL System clock | ECL |
| Total | 344 | The following signals are daisy chained | |
| LPC SIN | 1 | Diagnostic bus serial in | TP |
| LPC SOUT | 1 | Diagnostic bus serial out | TP |
| Total | 2 | The following signals form the GigaBus snoop bus | |
| LPC GB BACKOFF | 1 | GigaBus backoff signal | TP |
| LPC GB ACYCLE | 1 | GigaBus address cycle | TP |
| LPC GB ATYPE | 1 | GigaBus +address/lmessage select | TP |
| LPC GB RW | 1 | GigaBus Read/−Write select | TP |
| LPC GB LEN | 4 | GigaBus block length | TP |
| LPC GB A | = | GigaBus address | TP |
| −LPC RESET | 1 | Synchronous system reset | TP |

APPENDIX C

GMC Address Bus Signal Definitions

The GMC address bus consists of GMC_A(23:0), GMC_LEN(3:0), GMC_PID(7:0), GMC_PTAG(7:0) GMC_RW, and GMC_RMW. This bus is shared by the four memory banks and is used by the UBIF to initiate memory r/w cycles.

A description of each address bus field is provide below:

GMC_PID(7:0) indicates the requesting processor identifer (ID) during read cycles, GMC_PID(7:0) is saved by the memory bank at the start of the a read cycle and returned with the reply data.

GMC_PTAG(7:0) is used by processors to uniquely tag multiple outstanding read requests. Like GMC_PID(7:0), GMC_PTAG(7:0) is saved by the memory bank at the start of a read cycle and return with the reply data.

GMC_RW specifies a read (1) or (0) cycle.

GMC_RMW identifies a partial global memory write cycle, which will require a read-modify on-chip, and then write the modified data back to memory.

GMC Data Bus Signal Definitions

The data bus consists of GMC_D(255:0), GMC_ECC(63:0), GMC_WENB(7:0), GMC_MID(7:0) and GMC_MTAG(1:0). This bus is shared by the four memory banks and is used by the UBIF to transfer write data and to accept read data from the memory banks. A description of each data bus field is provided below:

GMC_D(255:0) is the data bus. Each of the thirty-two data bytes may contain valid data, as indicated by the byte enables GMC_BE(0:31).

GMC_ECC(63:0) is the ECC Bus. ECC is computed by the UBIF_D modules and supplied during write cycles and used to detect/correct data errors read cycles.

GMC_WENB(7:0) enables writing into each of the eight 32-bit sections of a 256-bit word. GMC_WENB(0) enables writing to D(31:0), GMC_WENB(1) enables writing to D(63:32), etc.

GMC_MID(7:0) carries the returned processor ID during global memory reply operations indicating the destination processor for the given data. GMC_MID(7:0) reflects the value presented on GMC_PID(7:0) during the corresponding read cycle. MID is inactive during processor write cycles.

GMC_MTAG(7:0) carries the returned processor TAG during global memory reply operations. This field is optionally used by processors to re-organize global memory reply data when issuing multiple outstanding read requests. GMC_MTAG(7:0) reflects the value presented on GMC_PTAG(7:0) during the corresponding read cycle. GMC_MTAG(7:0) is inactive during processor write cycles.

GMC Control Bus Signal Definitions

GMC_REQ(3:0) are the local memory card bus request lines. Memory bank (i) issues GMC_REQ(i) no sooner than two cycles before it will have data latched in its read data register. GMC_REQ(i) is should remain assert until GMC_GNT(i) is received.

GMC_GNT(3:0) are the local memory card bus grant lines. GMC_GNT(i) is returned no sooner than two cycles after GMC_REQ(i) is issued and lasts for two clock cycles. The UBIF will always deassert GMC_GNT(i) for at lease one cycle after granting the local memory card bus to a particular memory bank.

GMC_RDY(3:0) are the individual memory bank ready lines. Each memory bank genarates its own RDY signal when it can accept a new memory request cycle from the UBIF. When GMC_RDY(i) is active the UBIF is allowed to issue GMC_LDMR(i), which loads the memory address register (and optionally the data register) on the respective bank, GMC_RDY(i) should then become deasserted while the bank is busy performing a r/w cycle.

GMC_LDMAR(3:0) are the individual memory bank address register load enables. When GMC_RDY(i) is active, the UBIF is allowed to issue GMC_LDMAR(i), which loads the memory address register (and optionally the data register) on the respective bank. GMC_LDMAR (i) is active for one clock cycle.

GMC_NENE(3:0) are the individual memory bank next-near signals. When active, GMC_NENE(i) indicates that the next ROW-address to be issued to the bank is the same as the previous ROW-address issued.

| Global Memory Card (GMC) Bus Signal Summary | | | |
|---|---|---|---|
| Signal Name | Width | Description | Dir |
| GMC A | 24 | Address bus (32-byte, RAS/CAS address) | O |
| GMC LEN | 4 | Block length | O |
| GMC PID | 8 | Processor request ID | O |
| GMC PTAG | 7 | Processor request TAG | O |
| GMC RW | 1 | +Read/–Write select | O |
| GMC RMW | 1 | Read-modify-write select | O |
| GMC D | 256 | Data bus | I/O |
| GMC ECC | 64 | ECC bits (8-bits/32-bit word) | I/O |
| GMC MID | 8 | Memory reply ID | I |
| GMC MTAG | 7 | Memory reply TAG | I |
| –GMC WENB | 8 | SIMM write enables (unique per 32-bit word) | O |
| | | The following signals are unique per memory bank | |
| –GMC REQ | 1 | Memory reply request | I |
| –GMC GNT | 1 | Memory reply grant | O |
| –GMC RDY | 1 | Memory ready indicator | I |
| –LDMAR | 1 | Load memory address | O |
| –GMC NENE | 1 | Next RAS = Previous RAS | O |
| +GMC ETCLK | 2 | ECL System clock | ECL |
| –GMC ETCLK | 2 | ECL System clock | ECL |
| –GMC RESET | 1 | Synchronous system reset | O |

Having thus described my invention, what I claim as new, and desire to secure by Letters Patent is:

1. In a data processing system including a plurality of data processors that are coupled together by bus means having at least a first plurality of signal lines for conveying address information and a second plurality of signal lines for conveying control information, a method of communicating between data processors, comprising the steps of:

for a first data processor initiating a communication with at least one second data processor, in the first data processor, setting a bit or bits in a data processor mask so as to identify the at least one second data processor to be communicated with; in the first data processor, setting a bus transaction identifier for indicating a data processor communication bus transaction; and with the first data processor, transmitting the data processor mask over the bus means using the first plurality of signal lines and the bus transaction identifier over the bus means using at least some of the second plurality of signal lines;

the method further including the steps of, receiving, from the bus means, with all other data processors coupled to the bus means, the data processor mask from the first plurality of signal lines and the bus transaction identifier from the second plurality of signal lines;

in response to the bus transaction identifier indicating a data processor communication bus transaction, decoding the received data processor mask; and interrupting the identified at least one second data processor for accomplishing communication between the first data processor and the at least one second data processor;

wherein the plurality of data processor are organized as groups of data processors with the members of each group being coupled together by a local bus means, and wherein the groups of data processors are coupled together by a global bus means, wherein the step of transmitting includes the steps of:

receiving from a local bus means, with bus interface means coupled between the local bus means and the global bus means, the data processor mask from the first plurality of signal lines and the bus transaction identifier from the second plurality of signal lines;

arbitrating, with the bus interface means, for access to the global bus means; and transmitting the received data processor mask to global bus means address signal lines and the bus transaction identifier to global lines and the bus transaction identifier to global bus means control signal lines for reception by another interface means.

2. A multiprocessor data processing system, comprising:

at least one group comprised of (n) computational data processor nodes each of which includes a data processor having private memory means coupled thereto, each of the (n) computational data processor nodes within a group being coupled together by a first local bus means;

at least one communication data processor node including a data processor having private memory means coupled thereto, the at least one communication data processor node being coupled to a data communication means of the multiprocessor data Processing system by a second local bus means;

at least one shared global memory comprised of (x) memory banks coupled together by a third local bus means; and a plurality of bus interface means individual ones of which are coupled between one of the local bus means and a global bus means; wherein each of the plurality of bus interface means includes, a plurality (y) of input queue means each having an input coupled to the global bus means for receiving and storing address information, control information, and data information therefrom for a plurality of bus transactions, each of the input queue means having an output coupled to the associated one of the local bus means; and a plurality (z) of output queue means each having an input coupled to the associated one of the local bus means for receiving and storing address information, control information, and data information therefrom for a plurality of bus transactions, each of the output queue means having an output coupled to the global bus means; wherein bypass means are provided such that said input queue means can be selectively bypassed when said input queue means is empty and said output queue means can be selectively bypassed when said output queue means is empty.

3. A multiprocessor data processing system as set forth in claim 2 wherein (n=x=y=z).

4. A multiprocessor data processing system as set forth in claim 2 wherein each of the bus interface means further comprises:

means, coupled to the local bus means, for arbitrating for access to the local bus means; and means, coupled to the global bus means, for arbitrating for access to the global bus means; wherein each of the arbitrating means operates in accordance with a round robin technique.

5. A multiprocessor data processing system as set forth in claim 2 wherein each of the data processor nodes further comprises:

means for setting a data processor mask so as to identify at least one other data processor to be communicated with;

means for setting a bus transaction identifier for indicating a data processor communication bus transaction; and means for transmitting the data processor mask to address signal lines of the local bus means and the bus transaction identifier to control signal lines of the local bus means.

6. A multiprocessor data processing system as set forth in claim 5 and further comprising:

means for receiving, from the address signal lines of each local bus means, a data processor mask, and from the control signal lines of each local bus means, a bus transaction identifier transmitted from another data processor node;

means for decoding the received data processor mask and the bus transaction identifier; and means for interrupting the identified data processor or data processors.

7. A multiprocessor data processing system as set forth in claim 2 wherein the bus interface means coupled to the third local bus means further comprises:

means for generating an error correction code for data information received from the global bus means for transmission to the third local bus means; and means for checking the error correction code for data information received from the third local bus means for transmission to the global bus means.

8. A multiprocessor data processing system as set forth in claim 2 wherein each of the bus interface means further comprises:

means for generating parity information at least for the data information and for the address information transmitted to the global bus means; and means for checking parity information at least for the data information and for the address information received from the global bus means.

9. A multiprocessor data processing system as set forth in claim 2 wherein:

each of the plurality of input queue means and the plurality of output queue means includes address queue means, data queue means, and control queue means.

10. A multiprocessor data processing system as set forth in claim 2 wherein the bus interface means coupled to the third local bus means further comprises:

means for converting a stored address into a Row Address and into a Column Address; and means for applying the Row Address and the Column Address to a selected one of the memory banks.

11. A multiprocessor data processing system as set forth in claim 10 wherein the bus interface means coupled to the third local bus means further comprises:

means, coupled to said global bus means, for storing a last received address from the global bus means;

means, coupled to said global bus means and to said storing means, for comparing a next received address to the stored address; and means, responsive to the bus interface means indicating that at least a predetermined portion of the next received address equals the stored address, for indicating to the selected memory bank that the previously applied Row Address is to be reused.

12. A multiprocessor data processing system as set forth in claim 2 wherein the bus interface means coupled to the third local bus means further comprises:

means, responsive to a signal indicating a number of memory banks installed within the system, and responsive to a signal indicating a memory interleave factor, for remapping an address received from the global bus means to correspond to memory addresses associated with the memory banks.

13. A multiprocessor data processing system as set forth in claim 2 wherein the bus interface means coupled to the third local bus means further comprises:

means for prohibiting access to a storage location within one of the memory banks except to an identified data processing means that requests that access to the storage location be prohibited.

14. A multiprocessor data processing system as set forth in claim 2 wherein:

for the bus interface means coupled to the first local bus means, each of the computational data processor nodes is coupled to an associated one of the input queue means and to an associated one of the output queue means;

for the bus interface means coupled to the second local bus means, the at least one communication data processor node is coupled to one of the input queue means and to one of the output queue means, and the communication means is coupled to another one of the input queue means and to another one of the output queue means; and for the bus interface means coupled to the third local bus means, each of the memory banks is coupled to one of the input queue means and to one of the output queue means.

* * * * *